(12) United States Patent
Noguchi et al.

(10) Patent No.: US 8,101,254 B2
(45) Date of Patent: Jan. 24, 2012

(54) RUBBER COMPOSITION, CROSSLINKED PRODUCT AND FOAM THEREOF, MOLDED PRODUCT THEREFROM, AND USE THEREOF

(75) Inventors: Yuji Noguchi, Funabashi (JP); Takashi Hakuta, Sodegaura (JP); Hiroki Ebata, Ichihara (JP); Kotaro Ichino, Sodegaura (JP); Shuichi Nonaka, Kisarazu (JP); Satoshi Hase, Toyota (JP); Kazuyoshi Kaneko, Ichihara (JP); Akinori Takehara, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 570 days.

(21) Appl. No.: 12/314,155

(22) Filed: Dec. 4, 2008

(65) Prior Publication Data

US 2009/0239014 A1 Sep. 24, 2009

Related U.S. Application Data

(60) Provisional application No. 60/996,822, filed on Dec. 6, 2007, provisional application No. 60/996,824, filed on Dec. 6, 2007.

(30) Foreign Application Priority Data

| Dec. 5, 2007 | (JP) | ................................ | 2007-314885 |
| Dec. 5, 2007 | (JP) | ................................ | 2007-314887 |
| Feb. 8, 2008 | (JP) | ................................ | 2008-028670 |
| Jul. 25, 2008 | (JP) | ................................ | 2008-192846 |
| Jul. 28, 2008 | (JP) | ................................ | 2008-194056 |

(51) Int. Cl.
*C08L 47/00* (2006.01)
*C08L 9/00* (2006.01)
*C08K 3/04* (2006.01)
*B32B 1/08* (2006.01)

(52) U.S. Cl. ....... 428/36.8; 525/232; 525/211; 524/525; 521/140

(58) Field of Classification Search .................. 428/36.8; 525/232, 211; 524/525; 521/140
See application file for complete search history.

(56) References Cited

U.S. PATENT DOCUMENTS 5,962,543 A 10/1999 Kawasaki et al.
6,635,705 B2 10/2003 Itoh et al.

FOREIGN PATENT DOCUMENTS

| JP | 10-195227 | | 7/1998 |
| JP | 2001-11248 | | 1/2001 |
| JP | 2001-11255 | | 1/2001 |
| JP | 2001-49056 | | 2/2001 |
| JP | 2002-212328 | | 7/2002 |
| JP | 2002-256095 | | 9/2002 |
| JP | 2006-143783 | | 6/2006 |
| JP | 2006143783 A | * | 6/2006 |
| JP | 2006-282827 | | 10/2006 |
| JP | 2006282827 A | * | 10/2006 |
| JP | 2008-150618 | | 7/2008 |
| JP | 2008150618 A | * | 7/2008 |
| WO | WO 98/49212 | | 11/1998 |

OTHER PUBLICATIONS

International Search Report for related International Patent Application No. PCT/JP2008/072039 mailed Mar. 10, 2009.

* cited by examiner

*Primary Examiner* — Michael M Bernshteyn
(74) *Attorney, Agent, or Firm* — Foley & Lardner LLP

(57) ABSTRACT

The present invention provides a molded product exhibiting excellent various properties by improving compatibility of an ethylene/α-olefin/non-conjugated polyene copolymer with a polyolefin resin and a rubber composition for forming the molded product. The present invention further provides a molded product which comprises a rubber composition, is inhibited from fogging and tackiness and is excellent in mechanical strength and heat aging resistance. The rubber composition of the invention comprises an ethylene/α-olefin/non-conjugated polyene copolymer (A), and a polyolefin resin (B) having Mn of not less than 10,000 and/or an ethylene/α-olefin copolymer (C) having Mn of 2500 to 5000, and satisfies the following requirements: (1) a maximum value and a minimum value of an ethylene distribution parameter P of the component (A) have a relationship of Pmax/Pmin≦1.4, and (2) the B value of the component (C) ([EX]/(2[E]×[X])) ([E] and [X] are molar fractions of ethylene and the α-olefin of 3 to 20 carbon atoms, respectively, and [EX] is a fraction of dyad sequence of ethylene/α-olefin of 3 to 20 carbon atoms) is not more than 1.05.

21 Claims, 2 Drawing Sheets

[Fig. 1]
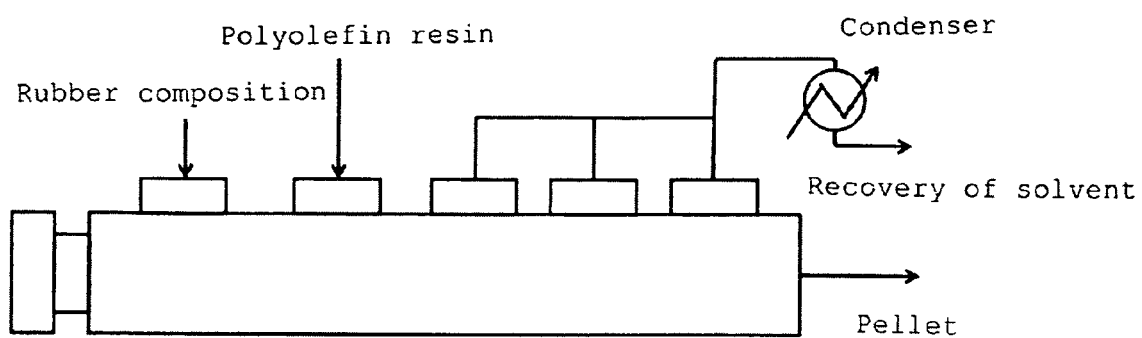
[Fig. 2]
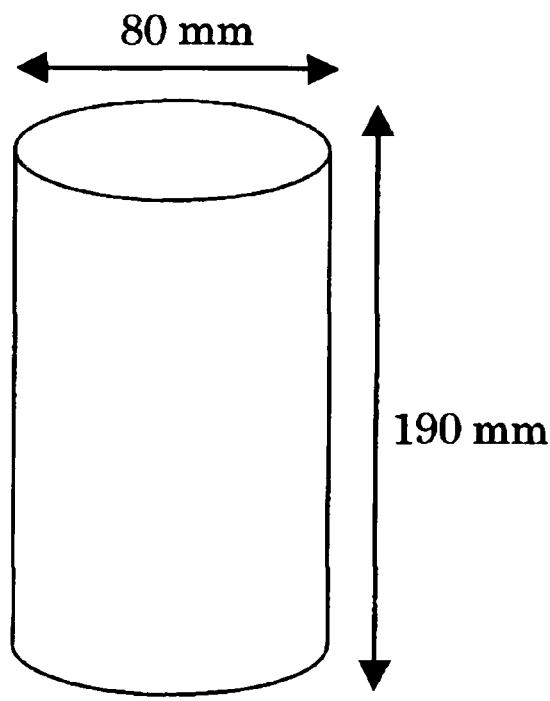

[Fig. 3]
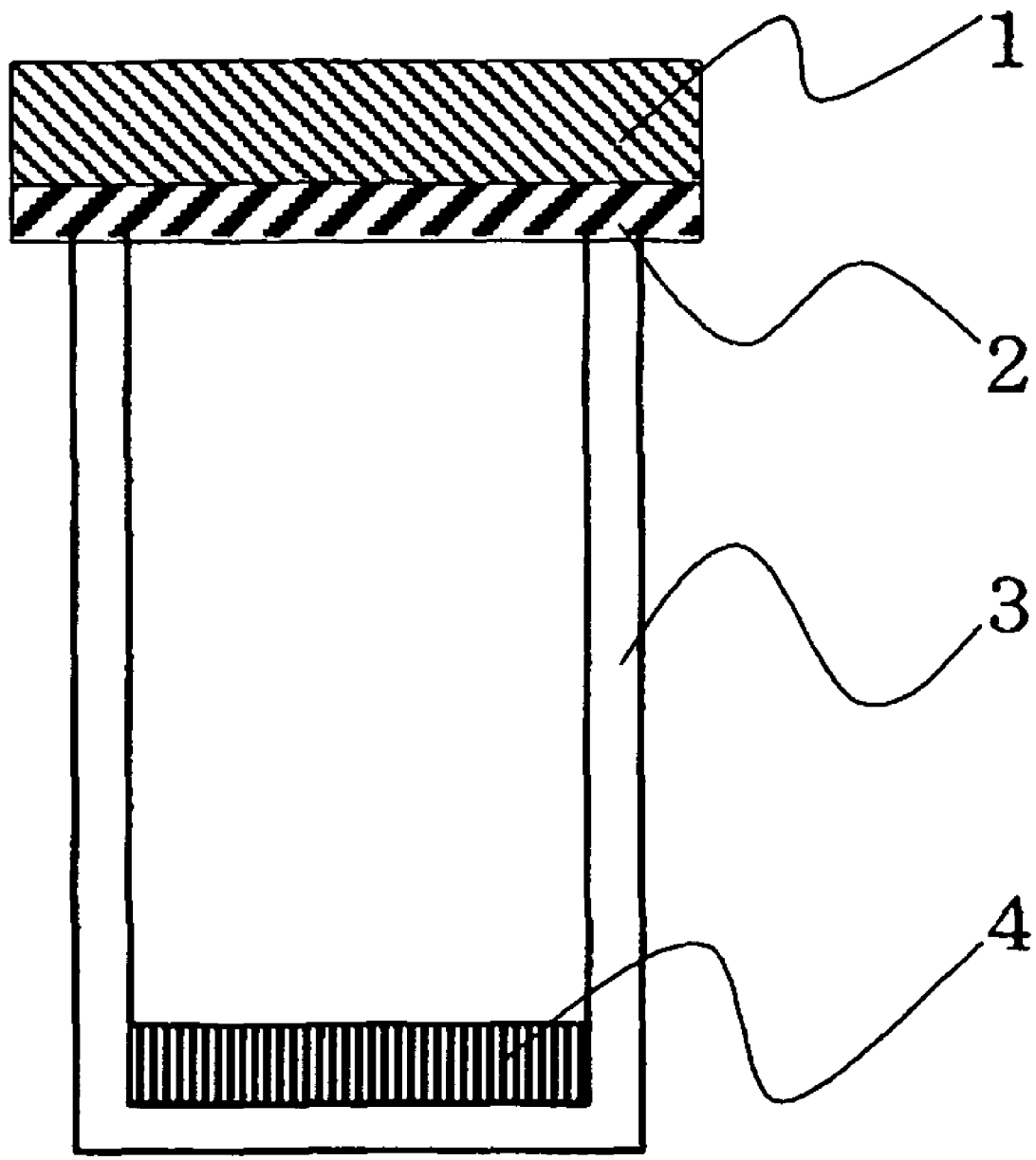

RUBBER COMPOSITION, CROSSLINKED PRODUCT AND FOAM THEREOF, MOLDED PRODUCT THEREFROM, AND USE THEREOF

TECHNICAL FIELD

The present invention relates to a rubber composition, a crosslinked product and a foamed product of the composition, a rubber molded product comprising the composition, and uses thereof. More particularly, the invention relates to a rubber composition capable of inhibiting formation of a gel-like substance, a rubber molded product which is formed from the composition and is excellent in rigidity, compression set, shape memory property, etc., a rubber composition, and a rubber molded product which is obtained by the use of the composition as a raw material, is inhibited from fogging and tackiness and is excellent in mechanical strength and heat aging resistance.

BACKGROUND ART

Ethylene/α-olefin rubbers and ethylene/α-olefin/non-conjugated diene copolymer rubbers have no unsaturated bond in the main chain, and therefore, they are excellent in weathering resistance, heat resistance and ozone resistance as compared with conjugated diene type rubbers. Taking advantage of these properties, rubber compositions containing such copolymer rubbers, crosslinked products of the compositions and foamed products of the compositions have been broadly used for parts of automobile industry, industrial rubber articles, electrically insulating materials, civil engineering and construction materials, rubber articles such as rubberized fabric, etc.

For example, a rubber composition for injection molding sponge, which contains an ethylene/α-olefin/non-conjugated polyene copolymer rubber, a crystalline polyolefin resin and a blowing agent, is known (see, for example, patent document 1).

Further, a rubber composition containing an ethylene/α-olefin/non-conjugated polyene copolymer rubber, a polyolefin resin and a blowing agent, and a rubber foamed product obtained by crosslinking and foaming a rubber composition containing an ethylene/α-olefin/non-conjugated polyene copolymer rubber and a synthetic resin are also known (see, for example, patent documents 2 and 3).

Molded products obtained from these compositions and the above-mentioned rubber foamed product are excellent in hardness, etc., but they are insufficient in compatibility of the ethylene/α-olefin/non-conjugated polyene copolymer rubber with other resins (polyolefin resin, synthetic resin, etc.), and there is yet room for improvement.

Crosslinked rubbers comprising a copolymer rubber composed of ethylene and an α-olefin of 3 to 20 carbon atoms and/or a non-conjugated polyene have been favorably applied to uses requiring environmental resistance, such as weatherstrips and water hoses for automobiles, in the past. In the compounding for such rubbers, a large amount of a softener is generally used together with a reinforcing agent and a filler. For automobiles for which lengthening of life will be required more and more in the future, weatherstrips and water hoses capable of withstanding long-term use and maintaining initial performance become necessary, and therefore, crosslinked rubbers exhibiting more excellent environmental resistance than before have been desired.

Such crosslinked rubbers, however, have problems of fogging and tackiness caused by a low-molecular weight component of the softener. The "fogging" is a phenomenon that when a crosslinked rubber is used as an interior skin material of a weatherstrip, an instrument panel or the like of an automobile, a door glass, a front glass, etc. are fogged by the low-molecular weight component evaporated from such a part, and the "tackiness" is a phenomenon that the low-molecular weight component blooms on the surface of an interior skin material of a weatherstrip, an instrument panel or the like of an automobile to cause tacky surface.

For example, there is disclosed, in a patent document 4, a rubber composition that has become excellent in weathering resistance, heat resistance and low-temperature flexibility by adding a softener (copolymer of ethylene and an α-olefin of 3 to 20 carbon atoms) having a number-average molecular weight of 400 to 2000, a pour point of not higher than −25° C. and a viscosity index of not less than 120, but problems of fogging and tackiness have not been solved yet.

Patent document 1: Japanese Patent Laid-Open Publication No. 195227/1998
Patent document 2: Japanese Patent Laid-Open Publication No. 256095/2002
Patent document 3: Japanese Patent Laid-Open Publication No. 212328/2002
Patent document 4: Japanese Patent Laid-Open Publication No. 11255/2001

DISCLOSURE OF THE INVENTION

Problem to be Solved by the Invention

It is an object of the present invention (1) to provide a rubber composition capable of inhibiting formation of a gel-like substance by improving compatibility of an ethylene/α-olefin/non-conjugated polyene copolymer with a polyolefin resin, and a molded product which is formed from the composition and is excellent in rigidity, compression set, shape memory property, etc.

It is an object of the present invention (2) to provide a rubber composition and a rubber molded product which is obtained by the use of the composition as a raw material, is inhibited from fogging and tackiness and is excellent in mechanical strength and heat aging resistance.

Means to Solve the Problem

In order to solve the above problems, the present inventors have earnestly studied, and they have accomplished the present invention.

That is to say, the rubber composition of the present invention is a rubber composition comprising an ethylene/α-olefin/non-conjugated polyene copolymer (A), and a polyolefin resin (B) and/or an ethylene/C3-C20 α-olefin copolymer (C), wherein (1) a maximum value Pmax and a minimum value Pmin of an ethylene distribution parameter P of the ethylene/α-olefin/non-conjugated polyene copolymer (A), as determined by the following measuring method (X), have a relationship of Pmax/Pmin≦1.4, measuring method (X): a test sample obtained by dissolving the ethylene/α-olefin/non-conjugated polyene copolymer (A) in cyclohexane is subjected to measurement with GPC-offline-FTIR using cyclohexane as an eluent under the conditions of a flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$)

thereof in the range of 4320±20 cm$^{-1}$ is regarded as an ethylene distribution parameter P,
and (2) the B value of the ethylene/C3-C20 α-olefin copolymer (C), which is represented by the following formula (i), is not more than 1.05, $$B \text{ value} = [EX]/(2[E] \times [X]) \quad \text{(i)}$$

wherein [E] and [X] are molar fractions of ethylene and the α-olefin of 3 to 20 carbon atoms, respectively, and [EX] is a fraction of dyad sequence of ethylene/α-olefin of 3 to 20 carbon atoms.

From the viewpoint of compatibility, the number-average molecular weight of the polyolefin resin (B) in terms of polystyrene, as measured by gel permeation chromatography (GPC), is preferably not less than 10,000. From the viewpoint of compatibility, the number-average molecular weight of the ethylene/C3-C20 α-olefin copolymer (C) is preferably in the range of 2500 to 5000.

From the viewpoint of inhibition of fogging and tackiness of the resulting molded product caused by a low-molecular weight component, it is preferable that the ethylene/α-olefin/non-conjugated polyene copolymer (A) satisfies the following requirements:

(1) the content of constituent units derived from ethylene is in the range of 50 to 90% by mol, (2) the content of constituent units derived from the non-conjugated polyene is in the range of 0.1 to 5% by mol, (3) the intrinsic viscosity [η] is in the range of 0.5 to 5.0 dl/g, and (4) the B value represented by the following formula (ii) is not more than 1.05, $$B \text{ value} = ([EX] + 2[Y])/\{2[E] \times ([X] + [Y])\} \quad \text{(ii)}$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms,
and the content of constituent units derived from ethylene in the ethylene/C3-C20 α-olefin copolymer (C) is in the range of 50 to 90% by mol.

(3) The intrinsic viscosity [η] is preferably in the range of 0.5 to 5.0 dl/g from the viewpoint of mechanical strength of the resulting rubber molded product.

The ethylene/α-olefin/non-conjugated polyene copolymer (A) and/or the ethylene/C3-C20 α-olefin copolymer (C) is preferably obtained by polymerization using a catalyst having a structure represented by the following formula (I):

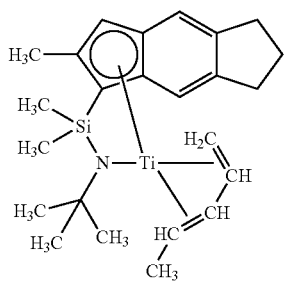

The rubber composition of the invention preferably contains the polyolefin resin (B) in an amount of 5 to 100 parts by weight and/or the ethylene/C3-C20 α-olefin copolymer (C) in an amount of 1 to 50 parts by weight, based on 100 parts by weight of the ethylene/α-olefin/non-conjugated polyene copolymer (A).

In the rubber composition of the invention, the polyolefin resin (B) preferably contains a polyethylene resin, a crystalline ethylene/α-olefin copolymer of ethylene and an α-olefin or a polypropylene resin from the viewpoint of keeping rubber elasticity.

In the rubber composition of the invention, the constituent units derived from the non-conjugated polyene of the component (A) are preferably constituent units derived from at least one non-conjugated polyene selected from the group consisting of 5-ethylidene-2-norbornene (ENB) and 5-vinyl-2-norbornene (VNB).

The rubber composition of the invention preferably further comprises a reinforcing agent from the viewpoint of hardness balance of the resulting molded product.

The reinforcing agent is preferably carbon black.

In the rubber composition of the invention, the carbon black is preferably contained in an amount of 20 to 200 parts by weight based on 100 parts by weight of the ethylene/α-olefin/non-conjugated polyene copolymer (A) from the viewpoints of reinforcing effect and cost.

It is preferable that the rubber composition of the invention is obtained by alloying the ethylene/α-olefin/non-conjugated polyene copolymer (A) with the polyolefin resin (B) by means of an extruder, because homogenous mixing is feasible.

It is preferable that the rubber composition of the invention is obtained by alloying an ethylene/α-olefin/non-conjugated polyene copolymer composition (A') that is obtained by mixing the ethylene/α-olefin/non-conjugated polyene copolymer (A) with a softener (X), with the polyolefin resin (B) by means of an extruder.

In the rubber composition of the invention, the softener (X) is preferably at least one softener selected from the group consisting of mineral oil and an ethylene/C3-C20 α-olefin copolymer having a number-average molecular weight in terms of polystyrene, as measured by gel permeation chromatography (GPC), of 2500 to 5000 from the viewpoint of compatibility. The softener (X) is more preferably an ethylene/propylene copolymer from the viewpoint of compatibility.

In the rubber composition of the invention, the softener (X) is preferably contained in an amount of 0.1 to 120 parts by weight based on 100 parts by weight of the ethylene/α-olefin/non-conjugated polyene copolymer (A).

The rubber composition of the invention preferably further comprises paraffinic oil (D), and the paraffinic oil (D) is contained in an amount of preferably 1 to 200 parts by weight, more preferably 1 to 50 parts by weight, based on 100 parts by weight of the ethylene/C3-C20 α-olefin/non-conjugated polyene copolymer (A)

The thermoplastic elastomer of the present invention is obtained by treating the above-mentioned rubber composition and a polypropylene-based resin through dynamic crosslinking in the presence of a crosslinking agent.

The crosslinked product of the present invention is obtained by crosslinking the above-mentioned rubber composition.

The foamed product of the present invention is obtained by crosslinking and foaming the above-mentioned rubber composition.

The part for automobiles, the part for ships, the part for civil engineering and construction, the medical part, the part for electric/electronic components, the part for transportation means, the sheet, the shoe, the tire sidewall, the tire tube, the covered electric wire, the electrically insulating part, the household rubber article, the part for leisure, the coating material, the adhesive or the like of the present invention is obtained by the use of the above-mentioned rubber composition.

The rubber composition of the invention preferably comprises:

100 parts by weight of an ethylene/C3-C20 α-olefin/non-conjugated polyene copolymer (A) satisfying the following requirements:

(1) the content of constituent units derived from ethylene is in the range of 50 to 90% by mol, (2) the content of constituent units derived from the non-conjugated polyene is in the range of 0.1 to 5% by mol, with the proviso that the total of the content (1) of constituent units derived from ethylene, the content of constituent units derived from the α-olefin of 3 to 20 carbon atoms and the content (2) of constituent units derived from the non-conjugated polyene is 100% by mol, (3) the intrinsic viscosity [η] is in the range of 0.5 to 5.0 dl/g, and (4) the B value represented by the following formula (ii) is not more than 1.05, $$B \text{ value}=([EX]+2[Y])/\{2[E]\times([X]+[Y])\} \quad \text{(ii)}$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms, (5) a maximum value Pmax and a minimum value Pmin of an ethylene distribution parameter P of the copolymer (A), as determined by the following measuring method (X), have a relationship of Pmax/Pmin≦1.4, measuring method (X): a test sample obtained by dissolving the copolymer (A) in cyclohexane is subjected to measurement with GPC-offline-FTIR using cyclohexane as an eluent under the conditions of an eluent flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is determined, and (6) the copolymer (A) is obtained by polymerization using a catalyst having a structure represented by the following formula (I):

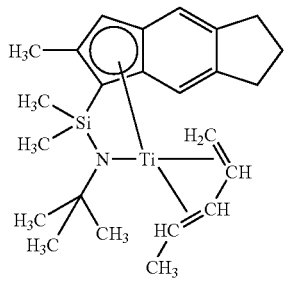

and 1 to 50 parts by weight of an ethylene/C3-C20 α-olefin copolymer (C) satisfying the following requirements:

(1) the content of constituent units derived from ethylene is in the range of 50 to 90% by mol, with the proviso that the total of the content (1) of constituent units derived from ethylene and the content of constituent units derived from the α-olefin of 3 to 20 carbon atoms is 100% by mol, (4) the B value represented by the above formula (ii) is not more than 1.05, (6) the copolymer (C) is obtained by polymerization using a catalyst having a structure represented by the above formula (I), and (7) the number-average molecular weight is in the range of 2500 to 5000.

The rubber composition of the invention preferably further comprises paraffinic oil (D), and the paraffinic oil (D) is preferably contained in an amount of 1 to 50 parts by weight based on 100 parts by weight of the ethylene/C3-C20 α-olefin/non-conjugated polyene copolymer (A).

The solution containing the component (A) and the component (C) of the present invention is obtained by dissolving an ethylene/C3-C20 α-olefin/non-conjugated polyene copolymer (A) and an ethylene/C3-C20 α-olefin copolymer (C) in an aliphatic hydrocarbon solvent, said ethylene/C3-C20 α-olefin/non-conjugated polyene copolymer (A) satisfying the following requirements:

(1) the content of constituent units derived from ethylene is in the range of 50 to 90% by mol, (2) the content of constituent units derived from the non-conjugated polyene is in the range of 0.1 to 5% by mol, with the proviso that the total of the content (1) of constituent units derived from ethylene, the content of constituent units derived from the α-olefin of 3 to 20 carbon atoms and the content (2) of constituent units derived from the non-conjugated polyene is 100% by mol, (3) the intrinsic viscosity [η] is in the range of 0.5 to 5.0 dl/g, and (4) the B value represented by the following formula (ii) is not more than 1.05, $$B \text{ value}=([EX]+2[Y])/\{2[E]\times([X]+[Y])\} \quad \text{(ii)}$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms, (5) a maximum value Pmax and a minimum value Pmin of an ethylene distribution parameter P of the copolymer (A), as determined by the following measuring method (X), have a relationship of Pmax/Pmin≦1.4, measuring method (X): a test sample obtained by dissolving the copolymer (A) in cyclohexane is subjected to measurement with GPC-offline-FTIR using cyclohexane as an eluent under the conditions of an eluent flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is determined, and (6) the copolymer (A) is obtained by polymerization using a catalyst having a structure represented by the following formula (I):

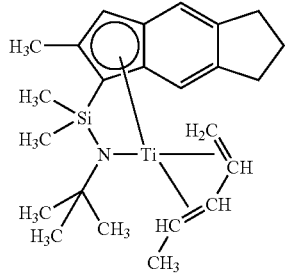

said ethylene/C3-C20 α-olefin copolymer (C) satisfying the following requirements:

(1) the content of constituent units derived from ethylene is in the range of 50 to 90% by mol, with the proviso that the total of the content (1) of constituent units derived from ethylene and the content of constituent units derived from the α-olefin of 3 to 20 carbon atoms is 100% by mol, (4) the B value represented by the above formula (ii) is not more than 1.05, (6) the copolymer (C) is obtained by polymerization using a catalyst having a structure represented by the above formula (I), and (7) the number-average molecular weight is in the range of 2500 to 5000.

The solution containing the component (A) and the component (C) of the invention preferably further comprises paraffinic oil (D).

The aliphatic hydrocarbon solvent is preferably hexane.

The rubber composition of the invention is obtained by removing the aliphatic hydrocarbon solvent from the above-mentioned solution.

The olefin-based thermoplastic elastomer of the present invention is obtained by treating the above-mentioned rubber composition and a polypropylene-based resin through dynamic crosslinking in the presence of a crosslinking agent.

The hose of the present invention has a tensile creep value (change of elongation in heating of the hose from 25° C. to 80° C. at a rate of 2° C./min under a constant load of 0.6 MPa using a viscoelasticity tester) of not more than 2.5%, preferably not more than 2%, more preferably not more than 1.5%.

The hose of the invention has a shrinkage ratio (change of length in crosslinking of an unvulcanized hose) of usually not more than 4.0%, preferably not more than 3.0%, more preferably not more than 2.5%.

The part for automobiles, the part for ships, the part for civil engineering and construction, the medical part, the part for electric/electronic components, the part for transportation means, the sheet, the shoe, the tire sidewall, the tire tube, the covered electric wire, the electrically insulating part, the household rubber article, the part for leisure, the coating material, the adhesive or the like of the present invention is obtained by the use of the above-mentioned rubber composition or its crosslinked product.

Effect of the Invention

According to the present invention (1), a rubber composition which can be improved in compatibility of the ethylene/α-olefin/non-conjugated polyene copolymer with the polyolefin resin and is capable of inhibiting formation of a gel-like substance, and various molded products which are formed from the composition and are excellent in rigidity, compression set and shape memory property can be provided.

In the present invention (2), by making the B value be not more than 1.05 using the above catalyst, compatibility of the ethylene/α-olefin/non-conjugated polyene copolymer (A) with the ethylene/α-olefin copolymer (C) can be improved, and by making the number-average molecular weight of the ethylene/C3-C20 α-olefin copolymer (C) be not less than 2500, the ethylene/C3-C20 α-olefin copolymer (C) can be made nonvolatile. Therefore, a rubber molded product formed from the rubber composition of the present invention (2) is excellent in mechanical strength (tensile strength, elongation) and heat aging resistance and is inhibited from fogging and tackiness caused by evaporation or separation of a low-molecular weight component.

BRIEF DESCRIPTION OF THE DRAWINGS

FIG. 1 is a schematic view of a twin-screw three-stage vented extruder used in Example (I) of the present invention (1).

FIG. 2 shows a shape of a beaker necessary for measuring a quantity of fogging.

FIG. 3 is a vertical sectional view showing the beaker 3 of FIG. 2 containing a rubber molded product (in the form of a disc having a diameter of 80 mm and a thickness of 2 mm) of the present invention (2) as a sample 4, an aluminum foil 2 and a cooling plate 1 maintained at 20° C., which are set on the beaker in order to measure a quantity of fogging.

DESCRIPTION OF NUMERICAL SYMBOLS

1: cooling plate maintained at 20° C.
2: aluminum foil
3: beaker of FIG. 2
4: sample

BEST MODE FOR CARRYING OUT THE INVENTION

The present invention is described in detail hereinafter.

The rubber composition of the invention comprises an ethylene/α-olefin/non-conjugated polyene copolymer (A), and a polyolefin resin (B) having a number-average molecular weight in term of polystyrene, as measured by gel permeation chromatography (GPC), of not less than 10,000 and/or an ethylene/C3-C20 α-olefin copolymer (C) having a number-average molecular weight of 2500 to 5000, and is characterized in that (1) a maximum value Pmax and a minimum value Pmin of an ethylene distribution parameter P of the ethylene/α-olefin/non-conjugated polyene copolymer (A), as determined by the following measuring method (X), have a relationship of Pmax/Pmin≦1.4 [measuring method (X): a test sample obtained by dissolving the ethylene/α-olefin/non-conjugated polyene copolymer (A) in cyclohexane is subjected to measurement with GPC-offline-FTIR using cyclohexane as an eluent under the conditions of a flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is regarded as an ethylene distribution parameter P], and (2) the B value of the ethylene/C3-C20 α-olefin copolymer (C), which is represented by the following formula (i), is not more than 1.05, $$B \text{ value} = [EX]/(2[E] \times [X]) \tag{i}$$

wherein [E] and [X] are molar fractions of ethylene and the α-olefin of 3 to 20 carbon atoms, respectively, and [EX] is a fraction of dyad sequence of ethylene/α-olefin of 3 to 20 carbon atoms.

That is to say, in the rubber composition of the invention, the following first and second embodiments are included.

The first embodiment of the invention (referred to as "present invention (1)" hereinafter) is a rubber composition comprising an ethylene/α-olefin/non-conjugated polyene copolymer (A) and a polyolefin resin (B), among the rubber compositions comprising an ethylene/α-olefin/non-conjugated polyene copolymer (A), and a polyolefin resin (B) and/or an ethylene/C3-C20 α-olefin copolymer (C).

The second embodiment of the invention (referred to as "present invention (2)" hereinafter) is a rubber composition comprising an ethylene/α-olefin/non-conjugated polyene copolymer (A) and an ethylene/C3-C20 α-olefin copolymer (C), among the rubber compositions comprising an ethylene/α-olefin/non-conjugated polyene copolymer (A), and a polyolefin resin (B) and/or an ethylene/C3-C20 α-olefin copolymer (C).

First, the present invention (1) is described in detail.
Ethylene/α-Olefin/Non-Conjugated Polyene Copolymer (A)

The ethylene/α-olefin/non-conjugated polyene copolymer (A) for use in the present invention (1) is a copolymer obtained by polymerization using a metallocene catalyst having a structure represented by the following formula (I), and a maximum value Pmax and a minimum value Pmin of an ethylene distribution parameter P of the ethylene/α-olefin/non-conjugated polyene copolymer (A), as determined by the above measuring method (X), have a relationship of Pmax/Pmin≦1.4

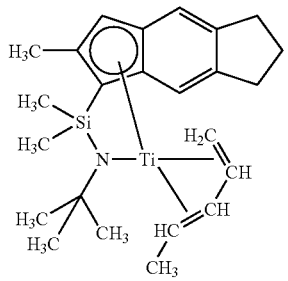

(I)

The ethylene/α-olefin/non-conjugated polyene copolymer (A) for use in the present invention (1) is a polymer in which ethylene, an α-olefin and a non-conjugated polyene are copolymerized, preferably they are copolymerized at random.

As the α-olefin, an α-olefin of 3 to 20 carbon atoms is usually used. Examples of such α-olefins include propylene, 1-butene, 1-pentene, 1-hexene, 4-methyl-1-pentene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, 1-eicosene, 9-methyl-1-decene, 11-methyl-1-dodecene and 12-ethyl-1-tetradecene. Of these, α-olefins of 3 to 10 carbon atoms are preferable, and in particular, propylene, 1-butene, 1-hexene and 1-octene are preferably used. These α-olefins may be used singly or may be used in combination of two or more kinds.

As the non-conjugated polyene, a cyclic or chain non-conjugated polyene is used. Examples of the cyclic non-conjugated polyenes include 5-ethylidene-2-norbornene, dicyclopentadiene, 5-vinyl-2-norbornene, norbornadiene and methyltetrahydroindene. Examples of the chain non-conjugated polyenes include 1,4-hexadiene, 7-methyl-1,6-octadiene, 4-ethylidene-8-methyl-1,7-nonadiene and 4-ethylidene-1,7-undecadiene. Of these, 5-ethylidene-2-norbornene, dicyclopentadiene and 5-vinyl-2-norbornene are preferably used. These cyclic or chain non-conjugated polyenes may be used singly or may be used in combination of two or more kinds.

With regard to the ethylene/α-olefin/non-conjugated polyene copolymer (A) for use in the present invention (1), a maximum value Pmax and a minimum value Pmin of its ethylene distribution parameter P, as determined by the aforesaid measuring method (X), have a relationship of Pmax/Pmin≦1.4.

The ethylene distribution parameter P is an indication of a content of the constituent units derived from ethylene in the ethylene/α-olefin/non-conjugated polyene copolymer (A) in the measured fraction, and a larger P value indicates a larger content of the constituent units derived from ethylene. It is presumed that the maximum peak (A721 cm$^{-1}$) in the range of 721±20 cm$^{-1}$ in the IR spectrum indicates a peak derived from C—H rocking vibration of the constituent units derived from ethylene and the maximum peak (A4320 cm$^{-1}$) in the range of 4320±20 cm$^{-1}$ in the IR spectrum indicates a peak derived from C—H deformation vibration common to olefin structures.

The ethylene distribution parameter P can be measured by the measuring method described in the later-described Example (1).

Because the ethylene/α-olefin/non-conjugated polyene copolymer (A) for use in the present invention (1) has a Pmax/Pmin value of the above range, a difference in content of the constituent units derived from ethylene between a high-molecular weight part and a low-molecular weight part of the copolymer (A) is small, and the copolymer (A) has excellent compatibility with the polyolefin resin (B) such as a polyethylene resin or a polypropylene resin. By preparing the copolymer (A) through polymerization using a metallocene catalyst having a structure represented by the above formula (I), the Pmax/Pmin value can be determined in the above range.

As described above, the ethylene/α-olefin/non-conjugated polyene copolymer (A) is a copolymer obtained by polymerization using a metallocene catalyst, preferably a metallocene catalyst having a structure represented by the above formula (I).

The above formula (I) represents [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium (another name: (t-butylamido)-dimethyl(η$^5$-2-methyl-s-indacene-1-yl)silane-titanium(II)1,3-pentadiene).

The metallocene catalyst of a structure represented by the formula (I) can be synthesized by the process described in National Publication of International Patent No. 522398/2001.

By the use of a compound analogous to the metallocene catalyst, the Pmax/Pmin value can be determined in the above range, and the copolymer (A) has excellent compatibility with the polyolefin resin (B), so that use of such a compound is preferable.

As the ethylene/α-olefin/non-conjugated polyene copolymer (A) for use in the present invention (1), the following one is preferable.

That is to say, the content of the constituent units which constitute the ethylene/α-olefin/non-conjugated polyene copolymer (A) and are derived from ethylene is in the range of preferably 50 to 90% by mol, more preferably 60 to 80% by mol, and the content of the constituent units derived from the α-olefin is in the range of preferably 10 to 50% by mol, more preferably 20 to 40% by mol, with the proviso that the total of the constituent units derived from ethylene and the constituent units derived from the α-olefin is 100% by mol.

Further, the content of the constituent units which constitute the ethylene/α-olefin/non-conjugated polyene copolymer (A) and are derived from the non-conjugated polyene is in the range of preferably 0.1 to 5% by mol, more preferably 0.1 to 3% by mol, in 100% by mol of the total of all the constituent units in the copolymer (A).

When the contents of the constituent units are in the above ranges, the copolymer (A) has excellent compatibility with the polyolefin resin, so that such contents are preferable.

The intrinsic viscosity [η] of the copolymer (A) for use in the present invention (1) is in the range of usually 0.5 to 5.0 dl/g, preferably 1.0 to 5.0 dl/g, more preferably 1.5 to 4.0 dl/g, still more preferably 1.5 to 3.5 dl/g. If the intrinsic viscosity is less than 0.5 dl/g, there is a tendency of deterioration of processability or shortage of strength because of too low viscosity. If the intrinsic viscosity exceeds 5.0 dl/g, processability tends to be deteriorated because of too high viscosity.

The number-average molecular weight (Mn) (in terms of polystyrene) of the copolymer (A) for use in the present invention (1), as measured by gel permeation chromatography (GPC), is in the range of usually 10,000 to 1,000,000, preferably 10,000 to 200,000. The molecular weight distribution (Mw/Mn) calculated using the weight-average molecular weight (Mw) and the number-average molecular weight (Mn) is in the range of usually 2.0 to 10.0, preferably 2.0 to 7.0, more preferably 2.0 to 5.0, still more preferably 2.0 to 4.0. When the molecular weight distribution (Mw/Mn) is in the above range, the copolymer (A) has excellent compatibility with the polyolefin resin (B), so that such a molecular weight distribution is preferable.

The polymerization process to produce the copolymer (A) is not specifically restricted as long as the polymerization is carried out using a metallocene catalyst having a structure of the above formula or a structure analogous thereto. In usual, the polymerization is carried out by a continuous process or a batch process wherein the metallocene catalyst is used as a main catalyst, a boron-based compound such as $(C_6H_5)_3CB$ $(C_6F_5)_4$ is used as a cocatalyst, an organoaluminum compound is used, an aliphatic hydrocarbon such as hexane is used as a solvent, and a reactor equipped with a stirrer is used.

As the metallocene catalyst having a structure of the above formula (I) or a structure analogous thereto, there can be mentioned a metallocene compound having a structure represented by the following formula (iii), preferably the following formula (iv), (v), (vi), (vii) or (I), most preferably the following formula (I).

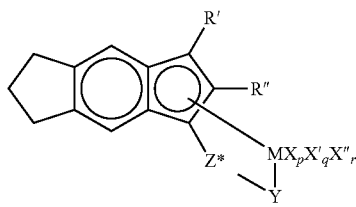

(iii)

In the formula (iii), R' is a hydrogen atom, a hydrocarbyl group, a di(hydrocarbylamino) group or a hydrocarbyleneamino group, and these groups have up to 20 carbon atoms.

R" is a hydrocarbyl group of 1 to 20 carbon atoms or a hydrogen atom.

M is titanium.

Y is —O—, —S—, —NR*—, —PR*—, —NR*$_2$ or —PR*$_2$.

Z* is —SiR*$_2$—, —CR*$_2$—, —SiR*$_2$SiR*$_2$—, —CR*$_2$CR*$_2$—, —CR*=CR*—, —CR*$_2$SiR*$_2$— or —GeR*$_2$—.

When plural R* are present, they are each independently a hydrogen atom or a group containing at least one group selected from the group consisting of a hydrocarbyl group, a hydrocarbyloxy group, a silyl group, a halogenated alkyl group and a halogenated aryl group. This R* contains 2 to 20 atoms, and two R* (R* is not a hydrogen atom) of Z* may arbitrarily form a ring, and R* of Z* and R* of Y may form a ring.

X is a monovalent anionic ligand group having up to 60 atoms other than a class of ligands that are cyclic delocalized π-bonding ligand groups.

X' is a neutral linking group having up to 20 atoms.

X" is a divalent anionic ligand group having up to 60 atoms.

p is 0, 1 or 2, q is 0 or 1, and r is 0 or 1.

However, when p is 2, q and r are each 0, M is in an oxidation state of +4 (or when Y is —NR*$_2$ or —PR*$_2$, M is an oxidation state of +3), and X is an anionic ligand selected from a halide group, a hydrocarbyl group, a hydrocarbyloxy group, a di(hydrocarbyl)amide group, a di(hydrocarbyl)phosphide group, a hydrocarbyl sulfide group, a silyl group, derivatives obtained by halogen-substitution of these groups, derivatives obtained by di(hydrocarbylamino)-substitution of these groups, derivatives obtained by hydrocarbyloxy-substitution of these groups and derivatives obtained by di(hydrocarbyl)phosphino-substitution of these groups, and has up to 30 atoms other than hydrogen atom.

When r is 1, p and q are each 0, M is in an oxidation state of +4, and X" is a dianionic ligand selected from the group consisting of a hydrocarbazyl group, an oxyhydrocarbyl group and a hydrocarbylenedioxy group and has up to 30 atoms other than hydrogen atom.

When p is 1, q and r are each 0, M is in an oxidation state of +3, and X is a stabilizing anionic ligand group selected from the group consisting of allyl, 2-(N,N-dimethylamino)phenyl, 2-(N,N-dimethylaminomethyl)phenyl and 2-(N,N-dimethylamino)benzyl.

When p and r are each 0, q is 1, M is in an oxidation state of +2, X' is a neutral conjugated diene or a neutral non-conjugated diene, which has been arbitrarily substituted by one or more hydrocarbyl groups, and this X' has up to 40 carbon atoms and forms a π-complex together with M.

In the formula (iii), any one embodiment of the following embodiments (1) to (4) is preferable.

(1) p is 2, q and r are each 0, M is in an oxidation state of +4, and X is each independently methyl, benzyl or a halide.

(2) p and q are each 0, r is 1, M is in an oxidation state of +4, and X" is a 1,4-butadienyl group which forms a metallacyclopentene ring together with M.

(3) p is 1, q and r are each 0, M is in an oxidation state of +3, and X is 2-(N,N-dimethylamino)benzyl.

(4) p and r are each 0, q is 1, M is in an oxidation state of +2, and X' is 1,4-diphenyl-1,3-butadiene or 1,3-pentadiene.

In any one of the above embodiments (1) to (4), it is more preferable that R" is a hydrogen atom or a methyl group, and it is particularly preferable that R" is a hydrogen atom.

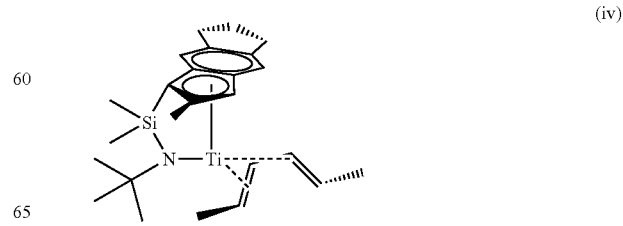

(iv)

The above formula (iv) represents (t-butylamido)dimethyl(η⁵-2-methyl-s-indacene-1-yl)silane-titanium(II)2,4-hexadiene.

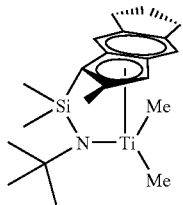

(v)

The above formula (v) represents (t-butylamido)-dimethyl(η⁵-2-methyl-s-indacene-1-yl)silane-titanium(IV)dimethyl.

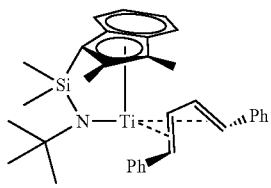

(vi)

The above formula (vi) represents (t-butylamido)-dimethyl(η⁵-2,3-dimethylindenyl)silane-titanium(II)1,4-diphenyl-1,3-butadiene.

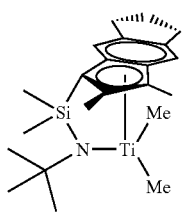

(vii)

The above formula (vii) represents (t-butylamido)-dimethyl(η⁵-2,3-dimethyl-s-indacene-1-yl)silane-titanium(IV) dimethyl.

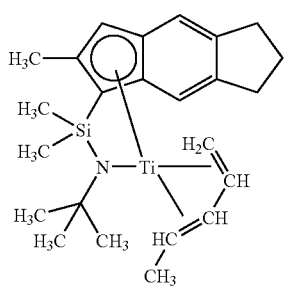

(I)

The above formula (I) represents (t-butylamido)-dimethyl(η⁵-2-methyl-s-indacene-1-yl)silane-titanium(II)1,3-pentadiene (another name: [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium).

Examples of the boron-based compounds include trimethylammonium tetrakis(pentafluorophenyl)borate, di(hydrogenated tallow alkyl)methylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl)-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, N,N-dimethylanilinum tetrakis(2,3,4,6-tetrafluorophenyl)borate, N,N-diethylanilinum tetrakis(2,3,4,6-tetrafluorophenyl)borate and N,N-dimethyl-2,4,6-trimethylanilinum tetrakis(2,3,4,6-tetrafluorophenyl)borate; dialkylammonium salts, such as di(isopropyl)ammonium tetrakis(pentafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate and dicyclohexylammonium tetrakis(pentafluorophenyl)borate; tri-substituted phosphonium salts, such as triphenylphosphonium tetrakis(pentafluorophenyl)borate, tri(o-tolyl)phosphonium tetrakis(pentafluorophenyl)borate and tri(2,6-dimethylphenyl)phosphonium tetrakis(pentafluorophenyl)borate; di-substituted oxonium salts, such as diphenyloxonium tetrakis(pentafluorophenyl)borate, di(o-tolyl)oxonium tetrakis(pentafluorophenyl)borate and di(2,6-dimethylphenyl)oxonium tetrakis(pentafluorophenyl)borate; and di-substituted sulfonium salts, such as diphenylsulfonium tetrakis(pentafluorophenyl)borate, di(o-tolyl)sulfonium tetrakis(pentafluorophenyl)borate and bis(2,6-dimethylphenyl)sulfonium tetrakis(pentafluorophenyl)borate.

As the organoaluminum compound, triisobutylaluminum (also referred to as "TIBA" hereinafter) is preferable.

The polymerization temperature is in the range of usually −20 to 200° C., preferably 0 to 150° C., more preferably 0 to 100° C., and the pressure is usually more than 0 but not more than 8 MPa (gauge pressure), preferably more than 0 but not more than 5 MPa (gauge pressure). When the reaction temperature and the pressure are in the above ranges, the catalyst exhibits excellent activity and the copolymer (A) can be favorably produced, so that such a temperature and such a pressure are preferable.

The amounts of the raw materials used in the polymerization are as follows. In usual, the amount of the α-olefin is 0.2 to 1.0 mol and the amount of the non-conjugated polyene is 0.02 to 0.10 mol, based on 1 mol of ethylene, and preferably, the amount of the α-olefin is 0.4 to 0.8 mol and the amount of the non-conjugated polyene is 0.04 to 0.08 mol, based on 1 mol of ethylene.

When ethylene is fed at a rate of 4.6 kg/hr, the metallocene catalyst is used at a rate of 0.03 to 0.11 mmol/hr, the cocatalyst is used at a rate of 0.10 to 0.46 mmol/hr, and the organoaluminum compound is used at a rate of 0.6 to 3.0 mmol/hr, though the rates vary depending upon the feed rates of the raw materials.

The polymerization time (average residence time in the case where the copolymerization is carried out by a continuous process) is in the range of usually 0.5 minutes to 5 hours, preferably 10 minutes to 3 hours, though it varies depending upon the conditions such as catalytic concentration and polymerization temperature.

In the copolymerization, a molecular weight modifier such as hydrogen can be also used.

By the use of the copolymer (A) obtained by polymerization under the above polymerization conditions, the rubber composition of the present invention (1) is excellent in compatibility of the ethylene/α-olefin/non-conjugated polyene copolymer with the polyolefin resin and is inhibited from formation of a gel-like substance. Further, a molded product formed from the composition is excellent in rigidity, compression set, shape memory property, etc.

Polyolefin Resin (B)

Although the polyolefin resin (B) for use in the present invention (1) is not specifically restricted, the number-average molecular weight in terms of polystyrene, as measured by gel permeation chromatography (GPC), is preferably not less than 10,000. Examples of such polyolefin resins include polyethylenes, such as an ethylene homopolymer, high-density polyethylene (HDPE), medium-density polyethylene (MDPE), low-density polyethylene (LDPE) and linear low-density polyethylene (LLDPE); crystalline ethylene/α-olefin copolymers of ethylene and α-olefins of 3 to 20 carbon atoms, preferably 3 to 8 carbon atoms; polypropylenes, such as a propylene homopolymer, a propylene block copolymer and a propylene random copolymer; and crystalline homopolymers or copolymers of α-olefins of 4 to 20 carbon atoms, preferably 4 to 8 carbon atoms, such as 1-butene, 4-methyl-1-pentene, 1-hexene, 1-heptene and 1-octene.

The number-average molecular weight (Mn) is in the range of usually 10,000 to 1,000,000, preferably 10,000 to 200,000.

The melting point of the polyolefin resin (B) is preferably not higher than 250° C. Of the above resins, preferable are polyethylene, a crystalline ethylene/α-olefin copolymer and polypropylene.

As the polyolefin resin (B) for use in the present invention (1), a resin produced by a process hitherto publicly known may be used, or a commercially available one may be used.

In the rubber composition of the present invention (1), the polyolefin resin (B) is contained in an amount of usually 5 to 100 parts by weight, preferably 10 to 80 parts by weight, more preferably 15 to 50 parts by weight, particularly preferably 15 to 25 parts by weight, based on 100 parts by weight of the ethylene/α-olefin/non-conjugated polyene copolymer (A). When the polyolefin resin (B) is used in such an amount, rubber elasticity can be maintained.

In particular, polyethylene and the crystalline ethylene/α-olefin copolymer among the above polyolefin resins (B) contribute to allowing a reinforcing agent and a filler to increase product hardness as high as carbon black, and besides, they decrease compound viscosity at the processing temperature. Therefore, they are used as compounding agents having an effect of enhancing processability.

Reinforcing Agent

In the rubber composition of the present invention (1), a reinforcing agent may be contained in addition to the ethylene/α-olefin/non-conjugated copolymer (A) and the polyolefin resin (B). When the reinforcing agent is contained, balance between processability of the rubber composition and hardness of a molded product obtained from the rubber composition is excellent, so that use of the reinforcing agent is preferable.

Examples of the reinforcing agents include carbon black, finely powdered silicic acid and silica. Of these, carbon black is preferable from the viewpoints of reinforcing effect and cost.

As the carbon black, commercially available various ones can be used without any restriction. Specifically, FEF carbon black (available from Asahi Carbon Co., Ltd., trade name: Asahi #60G) is employable.

Examples of silica include fumed silica and precipitated silica. The silica may have been surface-treated with reactive silane, such as hexamethyldisilazane, chlorosilane or alkoxysilane, low-molecular siloxane, or the like. The specific surface area (BET method) of such silica is preferably not less than 50 $m^2/g$, more preferably 100 to 400 $m^2/g$.

The type and the amount of the reinforcing agent added can be appropriately selected according to the use purpose.

The amount of the reinforcing agent added is in the range of usually not more than 300 parts by weight, preferably not more than 200 parts by weight, based on 100 parts by weight of the ethylene/α-olefin/non-conjugated polyene copolymer (A). In the case where carbon black is used as the reinforcing agent, the amount of the carbon black added is in the range of usually 20 to 200 parts by weight, preferably 50 to 200 parts by weight, more preferably 60 to 180 parts by weight, based on 100 parts by weight of the ethylene/α-olefin/non-conjugated polyene copolymer (A). When carbon black is used in such an amount, a molded product obtained from the rubber composition is excellent in balance of hardness, so that such an amount is preferable.

Softener

In the rubber composition of the present invention (1), a softener may be further contained. The purpose and the effect of the softener vary depending upon the stage of the preparation process of the rubber composition where the softener is added. Therefore, there are softeners of various types. The softener is described in the later-described process for preparing a rubber composition.

Other Additives

In the rubber composition of the present invention (1), other additives may be further contained. Examples of the other additives include blowing agent, filler, vulcanizing agent, vulcanization accelerator, vulcanization acceleration assistant, blowing assistant, processing aid, anti-aging agent, heat stabilizer, weathering stabilizer, antistatic agent, colorant, lubricant and thickening agent.

In the case where the rubber composition of the present invention (1) is crosslinked or foamed to form a foamed product, any of physical blowing and chemical blowing may be used, and in the case of the chemical blowing, the following blowing agent is usually used.

Examples of the blowing agents include: inorganic blowing agents, such as sodium bicarbonate, sodium carbonate, ammonium bicarbonate, ammonium carbonate and ammonium nitrite;

nitroso compounds, such as N,N'-dimethyl-N,N'-dinitrosoterephthalamide and N,N'-dinitrosopentamethylenetetramine;

azo compounds, such as azodicarbonamide, azobisisobutylonitrile, azobiscyclohexylnitrile, azodiaminobenzene and barium azodicarboxylate;

sulfonylhydrazide compounds, such as benzenesulfonylhydrazide, toluenesulfonylhydrazide, p,p'-oxybis(benzenesulfonylhydrazide) (OBSH) and diphenylsulfone-3,3'-disulfonylhydrazide; and azide compounds, such as calcium azide, 4,4'-diphenyldisulfonyl azide and p-toluenesulfonyl azide.

In the case where the blowing agent is contained in the rubber composition of the present invention (1), the amount of the blowing agent is in the range of usually 0.01 to 20 parts by weight, preferably 0.1 to 10 parts by weight, based on 100 parts by weight of the ethylene/α-olefin/non-conjugated polyene copolymer (A). When the blowing agent is used in such an amount, the rubber composition has excellent foaming property, so that such an amount is preferable.

Examples of the fillers include inorganic fillers, such as light calcium carbonate, heavy calcium carbonate, calcium oxide, talc and clay. The type and the amount of the inorganic filler can be appropriately selected according to the use purpose.

The amount of the inorganic filler added is in the range of usually not more than 300 parts by weight, preferably not more than 200 parts by weight, more preferably 50 to 150 parts by weight, based on 100 parts by weight of the ethylene/α-olefin/non-conjugated polyene copolymer (A).

Examples of the vulcanizing agents include sulfur, a sulfur compound and an organic peroxide.

Examples of sulfur include powdered sulfur, precipitated sulfur, colloidal sulfur, surface-treated sulfur and insoluble sulfur.

Examples of the sulfur compounds include sulfur chloride, sulfur dichloride and high-molecular polysulfides. Further, sulfur compounds which release active sulfur at the vulcanization temperature to carry out vulcanization, such as morpholine disulfide, alkylphenol disulfide, tetramethylthiuram disulfide and dipentamethylenethiuram tetrasulfide, are also employable.

Examples of the organic peroxides include dicumyl peroxide, di-t-butyl peroxide, di-t-butylperoxy-3,3,5-trimethylcyclohexane, t-butyl hydroperoxide, t-butylcumyl peroxide, benzoyl peroxide, 2,5-dimethyl-2,5-di(t-butylperoxy)hexyne-3,2,5-dimethyl-2,5-di(benzoylperoxy)hexane, 2,5-dimethyl-2,5-mono(t-butylperoxy)hexane and α,α'-bis(t-butylperoxy-m-isopropyl)benzene.

In the case where the rubber composition is crosslinked, the vulcanizing agent is used in an amount of usually 0.05 to 10 parts by weight, preferably 0.1 to 5 parts by weight, more preferably 0.3 to 3 parts by weight, based on 100 parts by weight of the ethylene/α-olefin/non-conjugated polyene copolymer (A).

Examples of other vulcanizing agents include N-cyclohexyl-2-benzothiazyl sulfenamide and dithiodimorpholine.

When sulfur or the sulfur compound is used as the vulcanizing agent, it is preferable to use a vulcanization accelerator in combination.

Examples of the vulcanization accelerators include:

thiazole type compounds, such as N-cyclohexyl-2-benzothiazole sulfenamide, N-oxydiethylene-2-benzothiazole sulfenamide, N,N'-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide;

guanidine compounds, such as diphenylguanidine, triphenylguanidine, diorthonitrileguanidine, orthonitrile biguanide and diphenylguanidine phthalate;

aldehydeamine and aldehyde-ammonia type compounds, such as acetaldehyde-aniline reaction product, butylaldehyde-aniline condensate, hexamethylenetetramine and acetaldehyde ammonia;

imidazoline type compounds, such as 2-mercaptoimidazoline;

thiourea type compounds, such as thiocarbanilide, diethylthiourea, dibutylthiourea, trimethylthiourea and diorthotolylthiourea;

thiuram type compounds, such as tetramethylthiuram monosulfide, tetramethylthiuram disulfide, tetraethylthiuram disulfide, tetrabutylthiuram disulfide and pentamethylenethiuram tetrasulfide;

dithiocarbamic acid salt type compounds, such as zinc dimethyldithiocarbamate, zinc diethyldithiocarbamate, zinc dibutyldithiocarbamate, zinc ethylphenyldithiocarbamate, zinc butylphenyldithiocarbamate, sodium dimethyldithiocarbamate, selenium dimethyldithiocarbamate and tellurium dimethyldithiocarbamate;

xanthate type compounds, such as zinc dibutylxanthate; and compounds, such as zinc oxide (zinc white).

Although the vulcanization accelerators may be used singly, they are preferably used in combination of two or more kinds. In the present invention (1), the vulcanization accelerator is used in an amount of usually 0.1 to 20 parts by weight, preferably 0.5 to 15 parts by weight, more preferably 1 to 10 parts by weight, based on 100 parts by weight of the ethylene/α-olefin/non-conjugated polyene copolymer (A).

As the vulcanization acceleration assistant, stearic acid or the like is employable.

Process for Preparing Rubber Composition

The process for preparing the rubber composition of the present invention (1) is not specifically restricted, but for example, the following processes are employable.

(1) A process comprising alloying the copolymer (A) with the polyolefin resin (B) by means of an extruder in the presence of a solvent to obtain the rubber composition.

In this preparation process, the solvent used in the preparation of the copolymer (A) may be used as the solvent, or a solvent may be separately added to the copolymer (A) produced.

In this preparation process, a solvent is present, so that the copolymer (A) and the polyolefin resin (B) can be homogeneously mixed as compared with the case where the copolymer (A) is alloyed with the polyolefin resin (B) in the absence of a solvent.

In the present invention (1), the term "alloying" means that the components (A) and (B) are kneaded by an extruder in the presence of a solvent and if necessary the solvent is removed.

In the above preparation process, various extruders hitherto publicly known are employable.

(2) A process comprising alloying a copolymer composition (A') obtained by mixing the copolymer (A) with a softener (X), with the polyolefin resin (B) by means of an extruder to obtain the rubber composition.

The above preparation process is characterized in that before alloying of the copolymer (A) with the polyolefin resin (B), the copolymer (A) is mixed with a softener (X) to prepare an ethylene/α-olefin/non-conjugated polyene copolymer composition (A'). The softener (X) is also referred to as a "pre-addition softener". When the copolymer (A) and the softener (X) are mixed, a solvent may be present or may not be present. From the viewpoint of compatibility, a solvent is preferably present.

The softener (X) is added for the purpose of controlling viscosity of the copolymer (A). By the use of the softener (X), viscosity decreases as compared with the case of using the copolymer (A) only.

The softener (X) is not specifically restricted provided that it can control viscosity of the copolymer (A). However, usually used are mineral oil, an ethylene/C3-C20 α-olefin copolymer, naphthenic oil and aroma oil. Of these, mineral oil and an ethylene/C3-C20 α-olefin copolymer having a number-average molecular weight (Mn) in terms of polystyrene, as measured by gel permeation chromatography (GPC), of 2500 to 5000 are preferable from the viewpoint of compatibility with the copolymer (A). The softener (X) may be used singly or in combination of two or more kinds.

The ethylene/C3-C20 α-olefin copolymer is a copolymer of low-molecular weight and is usually liquid. This ethylene/propylene copolymer may be prepared by the use of a vanadium catalyst such as $VO(OEt)Cl_2$ or may be prepared by the use of a metallocene catalyst. From the viewpoint of compatibility with the copolymer (A), however, it is preferable to prepare the copolymer by the use of a metallocene catalyst. From the viewpoint of compatibility with the copolymer (A), it is more preferable to prepare the copolymer by the use of a metallocene catalyst having a structure represented by the aforesaid formula (I).

In the case where the softener (X) is contained in the rubber composition of the present invention (1), the softener (X) is used in an amount of usually 0.1 to 200 parts by weight, preferably 0.1 to 150 parts by weight, more preferably 1 to 100 parts by weight, based on 100 parts by weight of the ethylene/α-olefin/non-conjugated polyene copolymer (A).

(3) A process comprising adding a reinforcing agent such as carbon black to a composition containing the copolymer (A) and the polyolefin resin (B) and mixing them.

In the case where the reinforcing agent such as carbon black is contained in the rubber composition of the present invention (I), the reinforcing agent such as carbon black is preferably added after a composition comprising the copolymer (A) and the polyolefin resin (B) is obtained. The rubber composition comprising the copolymer (A) and the polyolefin resin (B) is usually obtained by the aforesaid preparation process (1) or (2). In this preparation process, the copolymer (A), the polyolefin resin (B) and the reinforcing agent such as carbon black can be more homogeneously mixed as compared with the case where the copolymer (A), the polyolefin resin (B) and the reinforcing agent such as carbon black are mixed at the same time.

For adding the reinforcing agent such as carbon black to the rubber composition containing the copolymer (A) and the polyolefin resin (B) and mixing them, a kneading method using a Banbury mixer or an open roll is employable.

Also in the case where the aforesaid other additives are contained in the rubber composition, it is preferable that the other additives are added to the rubber composition comprising the copolymer (A) and the polyolefin resin (B) and they were mixed, similarly to the preparation process (3). By such addition and mixing, the copolymer (A), the polyolefin resin (B) and the other additives can be more homogeneously mixed.

In the case where the carbon black and other additives are added to the rubber composition containing the copolymer (A) and the polyolefin resin (B), it is preferable to add a softener (Y) at the same time. The softener (Y) is also referred to as a "post-addition softener".

The softener (Y) is added for the purpose of homogeneously mixing the rubber composition containing the copolymer (A) and the polyolefin resin (B) with the components newly added.

Although the softener (Y) is not specifically restricted, mineral oil is usually used.

In the case where the softener (Y) is contained in the rubber composition of the present invention (1), the softener (Y) is used in an amount of usually not less than 30 parts by weight, preferably 50 to 150 parts by weight, more preferably 60 to 120 parts by weight, based on 100 parts by weight of the ethylene/α-olefin/non-conjugated polyene copolymer (A).

The rubber composition of the present invention (1) obtained as above is excellent in compatibility of the ethylene/α-olefin/non-conjugated polyene copolymer (A) with the polyolefin resin (B), and can inhibit formation of a gel-like substance as compared with conventional rubber compositions.

Crosslinked Product and Foamed Product

The molded product formed from the rubber composition is excellent in rigidity, compression set and shape memory property.

The crosslinked product of the present invention (1) is obtained by crosslinking the rubber composition, and the foamed product of the present invention (1) is obtained by crosslinking and foaming the rubber composition.

The crosslinked product of the present invention (1) is obtained by, for example, the following methods.

(I) A method wherein the rubber composition containing the aforesaid vulcanizing agent is used, and the composition is preformed to give a desired shape and then vulcanized (crosslinked).

(II) A method wherein the rubber composition containing no vulcanizing agent is preformed to give a desired shape and then irradiated with electron rays to crosslink it.

(III) A method wherein the rubber composition containing an organic peroxide is used, and the composition is preformed to give a desired shape and then vulcanized (crosslinked).

In the methods (I), (II) and (III), preforming can be carried out by the use of an extruder, an injection molding machine or the like.

The vulcanization in the method (I) is carried out by heating the rubber composition containing a vulcanizing agent (the composition may contain a vulcanization accelerator) at usually 140 to 300° C., preferably 150 to 270° C., more preferably 150 to 250° C., for usually 0.5 to 30 minutes, preferably 0.5 to 20 minutes, more preferably 0.5 to 15 minutes.

The irradiation with electron rays in the method (II) is carried out by irradiating the composition with electron rays having energy of 0.1 to 10 MeV so that the absorbed dose will become usually 0.5 to 35 Mrad, preferably 0.5 to 20 Mrad, more preferably 1 to 10 Mrad.

The crosslinking in the method (III) is carried out by heating the rubber composition containing an organic peroxide (the composition may contain a crosslinking assistant) at usually 150 to 190° C., preferably 160 to 180° C., for usually 3 to 30 minutes, preferably 5 to 25 minutes, more preferably 5 to 20 minutes.

The foamed product of the present invention (1) is obtained by, for example, heating and chemically foaming the rubber composition containing a vulcanizing agent and a blowing agent to perform crosslinking and foaming.

In the chemical foaming, the rubber composition containing a vulcanizing agent and a blowing agent is heated, whereby the blowing agent is decomposed to generate a carbonic acid gas or a nitrogen gas, so that a foamed product having a bubble structure is obtained.

The molded product formed from the rubber composition is excellent in rigidity, compression set and shape memory property. On this account, the molded product can be applied to the following uses.

Uses

The rubber molded product obtained by the use of the rubber composition of the present invention (1) or its crosslinked product as a raw material is favorably used in the fields where weathering resistance, heat aging resistance, bleed resistance and low-temperature flexibility are required. Specifically, the rubber molded product is favorably used for parts for automobiles, parts for ships, parts for civil engineering and construction, medical parts, parts for electric/electronic equipments, parts for transportation means, parts for leisure, hoses (radiator hose, heater hose, etc.), rubber vibration insulators, sheets, various belts, various packings, sealing materials, potting materials, coating materials, adhesives, etc.

Examples of the parts for automobiles include glass run channel, weatherstrip sponge, door opening trim, seal member, grommet, gasket of automobile engine, and sealing material for electrical equipment or oil filter; potting material for igniter HIC or automobile hybrid IC; coating material for automobile body, automobile window glass or engine control board; and adhesive for gasket of oil pan or timing belt cover, molding, head lamp lens, sunroof seal or mirror. Examples of the weatherstrip sponges include door weatherstrip, trunk weatherstrip, luggage weatherstrip, roof side rail weatherstrip, slide door weatherstrip, ventilator weatherstrip, sliding roof weatherstrip, front window weatherstrip, rear window weatherstrip, quarter window weatherstrip, lock pillar weatherstrip, door glass outer weatherstrip and door glass inner weatherstrip.

Examples of the parts for ships include sealing material for wiring connection branch box, electric system part or electric wire; and adhesive for electric wire or glass.

Examples of the parts for civil engineering and construction include construction sealant, which is used for butt joint of glass screen method for commercial building, joint between glass and sash, interior joint in toilet, lavatory or showcase, joint around bathtub, outer wall expansion joint for prefabricated house, or sizing board joint; sealing material for double glazing; civil engineering sealant used for road repairs; paint or adhesive for metal, glass, stone, slate, concrete or tile; and adhesive sheet, waterproof sheet or vibration insulator sheet.

Examples of the medical parts include medical rubber stopper, syringe gasket and rubber stopper for vacuum blood collection tube.

Examples of the parts for electric/electronic equipments include sealing material, potting material, coating material or adhesive material for heavy electric current part, weak electric current part, or circuit or substrate of electric/electronic equipment; maintenance material for electric wire covering; insulating seal for electric wire joint part; OA equipment roll; vibration absorbing material; grommet; and gel encapsulation material for condenser.

Examples of the parts for transportation means include parts for automobiles, ships, airplanes and railroad vehicles.

Examples of the parts for leisure include swimming materials, such as swimming cap, diving mask and earplug; and gel buffer members, such as sporting shoes and baseball glove.

Examples of the rubber vibration insulators include rubber vibration insulators for automobiles (engine mount, liquid seal engine mount, dumper pulley, chain dumper, carburetor mount, torsional dumper, strut mount, rubber bush, bumper rubber, helper rubber, spring sheet, shock absorber, air spring, body mount, bumper guard, muffler support, rubber coupling, center bearing support, crutch rubber, deaf mount, suspension bush, slide bush, cushion strut bar, stopper, handle dumper, radiator support or muffler hanger), rubber vibration insulators for railroads (slab mat, balas mat or railway mat), and rubber vibration insulators for industrial machinery (expansion joint, flexible joint, bush or mount).

Examples of the sheets include roofing sheet and waterstop sheet.

Examples of various belts include transmission belts (V-belt, flat belt, synchronous belt or timing belt) and carrier belts (light carrier belt, cylindrical belt, rough top belt, flanged carrier belt, U-shaped guide carrier belt or V-shaped guide carrier belt).

The sealing materials are favorably used as seals for, for example, refrigerator, freezer, washing machine, gas meter, microwave oven, steam iron and earth leakage breaker. The sealing materials mean materials used for sealing. Further, materials which are used for the purpose of making joints or contact parts watertight or airtight in various industries such as mechanical, electrical and chemical industries are also the sealing materials in a broad sense.

The potting materials are favorably used for potting, for example, transformer high-tension circuit, printed board, high-voltage transformer with variable resistor, electrically insulating part, semi-conductive part, conductive part, solar battery or flyback transformer for television.

The coating materials are favorably used for coating, for example, various circuit elements of high-voltage thick-film resistor, hybrid IC, etc.; HIC and electrically insulating part; semi-conductive part; conductive part; module; printed circuit; ceramic board; buffer material for diode, transistor, bonding wire or the like; semiconductor element; or optical fiber for optical communication.

The adhesives are favorably used for bonding, for example, cathode-ray tube wedge, neck, electrically insulating part, semi-conductive part or conductive part.

In addition, the rubber composition of the present invention (1) or its crosslinked product is favorably used for automobile cup seals (master cylinder piston cup, wheel cylinder piston cup, constant-velocity joint boot, pin boot, dust cover, piston seal, packing, O-ring, diaphragm, dam windshield, door mirror bracket, seal head lamp or seal cowl top), industrial seals (condenser packing, O-ring or packing), foamed products (hose protection sponge, cushion sponge, heat insulating sponge or insulation pipe), covered electric wire, electric wire joint, electrically insulating part, semi-conductive rubber part, OA machine rolls (charged roll, transfer roll, developing roll or paper feeding roll), industrial rolls (iron manufacturing roll, paper manufacturing roll or printing electric wire roll), anode cap, plug cap, ignition cable, lamp socket cover, terminal cover, wiper blade, various tubes (vacuum tube or tire tube), air spring, shoe sole, shoe heel, tire sidewall, fabric coating, etc.

Next, the present invention (2) is described in detail.

The rubber composition of the present invention (2) preferably comprises 100 parts by weight of an ethylene/C3-C20 α-olefin/non-conjugated polyene copolymer (A) satisfying the following requirements (1) to (6) at the same time (with the proviso that the total of constituent units derived from ethylene, constituent units derived from the α-olefin of 3 to 20 carbon atoms and constituent units derived from the non-conjugated polyene is 100% by mol) and 1 to 50 parts by weight of an ethylene/C3-C20 α-olefin copolymer (C) satisfying the following requirements (1), (4), (6) and (7) at the same time (with the proviso that the total of constituent units derived from ethylene and constituent units derived from the α-olefin of 3 to 20 carbon atoms is 100% by mol).

(1) The content of constituent units derived from ethylene is in the range of 50 to 90% by mol.

(2) The content of constituent units derived from the non-conjugated polyene is in the range of 0.1 to 5% by mol.

(3) The intrinsic viscosity [η] is in the range of 0.5 to 5.0 dl/g.

(4) The B value represented by the following formula (ii) is not more than 1.05, $$B \text{ value} = ([EX] + 2[Y])/\{2[E] \times ([X] + [Y])\} \quad \text{(ii)}$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms.

(5) A maximum value Pmax and a minimum value Pmin of an ethylene distribution parameter P of the copolymer (A), as determined by the following measuring method (X), have a relationship of Pmax/Pmin≦1.4, measuring method (X): a test sample obtained by dissolving the copolymer (A) in cyclohexane is subjected to measurement with GPC-offline-FTIR using cyclohexane as an eluent under the conditions of an eluent flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is regarded as an ethylene distribution parameter P.

(6) The copolymer is obtained by polymerization using a catalyst having a structure represented by the following formula (I):

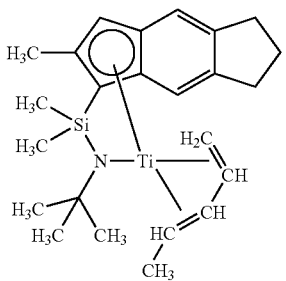

(I)

(7) The number-average molecular weight is in the range of 2500 to 5000.

Ethylene/α-Olefin/Non-Conjugated Polyene Copolymer (A)

Examples of the α-olefins of 3 to 20 carbon atoms to constitute the ethylene/C3-C20 α-olefin/non-conjugated polyene copolymer (A) for use in the present invention (2) include propylene, 1-butene, 1-pentene, 1-hexene, 4-methyl-1-pentene, 1-heptene, 1-octene, 1-decene, 1-dodecene, 1-tetradecene, 1-hexadecene and 1-eicosene. Of these, α-olefins of 3 to 8 carbon atoms, such as propylene, 1-butene, 1-hexene and 1-octene, are preferable from the viewpoint of mechanical strength. These α-olefins may be used singly or may be used in combination of two or more kinds.

Examples of the non-conjugated polyenes include cyclic dienes, such as 5-ethylidene-2-norbornene (ENB), 5-propylidene-5-norbornene, dicyclopentadiene, 5-vinyl-2-norbornene (VNB), 5-methylene-2-norbornene, 5-isopropylidene-2-norbornene and norbornadiene; chain non-conjugated dienes, such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene and 7-methyl-1,6-octadiene; and trienes, such as 2,3-diisopropylidene-5-norbornene and 4-ethylidene-8-methyl-1,7-nonadiene. Of these, ENB and VNB are particularly preferable. These non-conjugated polyenes may be used singly or may be used in combination of two or more kinds. When the rubber composition is crosslinked by sulfur, ENB, 1,4-hexadiene and dicylopentadiene having excellent mechanical strength are preferable, and when the rubber composition is crosslinked by an organic peroxide, VNB and 5-methylene-2-norbornene having excellent crosslink efficiency and heat aging resistance are preferable.

The copolymer (A) for use in the present invention (2) preferably satisfies the following requirements (1) to (5) at the same time, and more preferably satisfies the following requirements (1) to (6) at the same time. The total of constituent units derived from ethylene, constituent units derived from the α-olefin of 3 to 20 carbon atoms and constituent units derived from the non-conjugated polyene is 100% by mol.

(1) The content of constituent units derived from ethylene is in the range of 50 to 90% by mol.

(2) The content of constituent units derived from the non-conjugated polyene is in the range of 0.1 to 5% by mol.

(3) The intrinsic viscosity [η] is in the range of 0.5 to 5.0 dl/g.

(4) The B value represented by the following formula (ii) is not more than 1.05, $$B \text{ value} = ([EX]+2[Y])/\{2[E]\times([X]+[Y])\} \quad (ii)$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms.

(5) A maximum value Pmax and a minimum value Pmin of an ethylene distribution parameter P of the copolymer (A), as determined by the following measuring method (X), have a relationship of Pmax/Pmin≦1.4, measuring method (X): a test sample obtained by dissolving the copolymer (A) in cyclohexane is subjected to measurement with GPC-offline-FTIR using cyclohexane as an eluent under the conditions of an eluent flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is regarded as an ethylene distribution parameter P.

(6) The copolymer (A) is obtained by polymerization using a catalyst having a structure represented by the following formula (I):

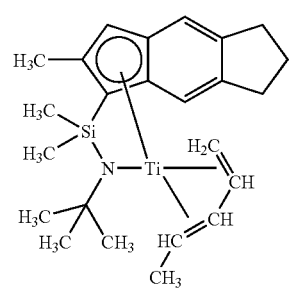

(I)

Requirement (1)

The requirement (1) is that the content of constituent units derived from ethylene is in the range of 50 to 90% by mol. Although the content of constituent units derived from ethylene is in the range of usually 50 to 90% by mol, it is in the range of preferably 50 to 85% by mol, more preferably 50 to 80% by mol. However, the total of the constituent units derived from ethylene and the constituent units derived from the α-olefin of 3 to 20 carbon atoms is 100% by mol. When the content of the constituent units derived from ethylene is in the above range, fogging and tackiness of the resulting rubber molded product caused by a low-molecular weight component are inhibited, so that such a content is preferable.

Requirement (2)

The requirement (2) is that the content of constituent units derived from the non-conjugated polyene is in the range of 0.1 to 5% by mol. Although the content of constituent units derived from the non-conjugated polyene is in the range of usually 0.1 to 5% by mol, it is in the range of preferably 0.5 to 4.5% by mol, more preferably 1.0 to 4% by mol. When the content of the constituent units derived from the non-conjugated polyene is in the above range, the resulting rubber molded product is excellent in heat aging resistance, so that such a content is preferable. The total of all the constituent units in the copolymer (A) is 100% by mol.

Requirement (3)

The requirement (3) is that the intrinsic viscosity [η] is in the range of 0.5 to 5.0 dl/g. The intrinsic viscosity [η] is in the range of usually 0.5 to 5.0 dl/g, preferably 1.0 to 5.0 dl/g, more preferably 1.5 to 4.0 dl/g, still more preferably 1.5 to 3.5 dl/g. When the intrinsic viscosity [η] is in the above range, the resulting rubber molded product is excellent in mechanical strength, so that such an intrinsic viscosity is preferable.

Requirement (4)

The requirement (4) is that the B value represented by the following formula (ii) is not more than 1.05, $$B \text{ value} = ([EX]+2[Y])/\{2[E]\times([X]+[Y])\} \quad (ii)$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms.

Although the B value is usually not more than 1.05, it is preferably 0.8 to 1.05, more preferably 0.9 to 1.05. When the B value is in the above range, compatibility of the copolymer (A) with the component (C) is enhanced, so that such a value is preferable. By preparing the copolymer (A) through polymerization using a catalyst having a structure represented by the aforesaid formula (I) or a catalyst having a structure analogous thereto, the B value can be determined in the above range.

Requirement (5)

The requirement (5) is that a maximum value Pmax and a minimum value Pmin of an ethylene distribution parameter P of the copolymer (A), as determined by the following measuring method (X), have a relationship of Pmax/Pmin≦1.4, measuring method (X): a test sample obtained by dissolving the copolymer (A) in cyclohexane is subjected to measurement with GPC-offline-FTIR using cyclohexane as an eluent under the conditions of an eluent flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is regarded as an ethylene distribution parameter P. It is presumed that the maximum peak (A721 cm$^{-1}$) in the range of 721±20 cm$^{-1}$ in the IR spectrum indicates a peak derived from C—H rocking vibration of the constituent units derived from ethylene and the maximum peak (A4320 cm$^{-1}$) in the range of 4320±20 cm$^{-1}$ in the IR spectrum indicates a peak derived from C—H deformation vibration common to olefin structures.

When the Pmax/Pmin is in the above range, fogging and tackiness of the resulting rubber molded product caused by a low-molecular weight component are inhibited and the molded product is excellent in mechanical strength, so that such a range is preferable. By preparing the copolymer (A) through polymerization using the metallocene catalyst having a structure represented by the above formula (I) or a catalyst having a structure analogous thereto, the Pmax/Pmin value can be determined in the above range.

Requirement (6)

The requirement (6) is that the copolymer (A) is obtained by polymerization using a catalyst having a structure represented by the following formula (I). The catalyst having a structure represented by the following formula (I) is [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium (another name: (t-butylamido)-dimethyl(η$^5$-2-methyl-s-indacene-1-yl)silane-titanium(II)1,3-pentadiene).

The process for the synthesis of this catalyst is described in International Publication No. 98/49212 Pamphlet.

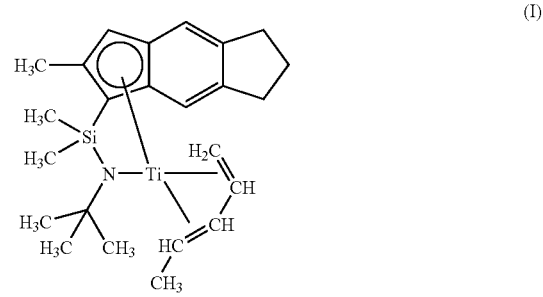

(I)

The copolymer (A) or the later-described ethylene/C3-C20 α-olefin copolymer (C) is synthesized by the use of a metallocene catalyst having a structure represented by preferably the following formula (iii), particularly preferably the following formula (iv), (v), (vi), (vii) or (I), most preferably the following formula (I).

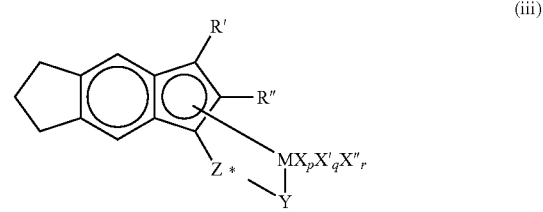

(iii)

In the formula (iii), R' is a hydrogen atom, a hydrocarbyl group, a di(hydrocarbylamino) group or a hydrocarbyleneamino group, and these groups have up to 20 carbon atoms.

R" is a hydrocarbyl group of 1 to 20 carbon atoms or a hydrogen atom.

M is titanium.

Y is —O—, —S—, —NR*—, —PR*—, —NR*$_2$ or —PR*$_2$.

Z* and R* are the same as those previously described.

X is a monovalent anionic ligand group having up to 60 atoms other than a class of ligands that are cyclic delocalized π-bonding ligand groups.

X' is a neutral linking group having up to 20 atoms.

X" is a divalent anionic ligand group having up to 60 atoms.

p is 0, 1 or 2, q is 0 or 1, and r is 0 or 1.

However, when p is 2, q and r are each 0, M is in an oxidation state of +4 (or when Y is —NR*$_2$ or —PR*$_2$, M is an oxidation state of +3), and X is an anionic ligand selected from a halide group, a hydrocarbyl group, a hydrocarbyloxy group, a di(hydrocarbyl)amide group, a di(hydrocarbyl) phosphide group, a hydrocarbyl sulfide group, a silyl group, derivatives obtained by halogen-substitution of these groups, derivatives obtained by di(hydrocarbylamino)-substitution of these groups, derivatives obtained by hydrocarbyloxy-substitution of these groups and derivatives obtained by di(hydrocarbyl)phosphino-substitution of these groups, and has up to 30 atoms other than hydrogen atom.

When r is 1, p and q are each 0, M is in an oxidation state of +4, and X" is a dianionic ligand selected from the group consisting of a hydrocarbazyl group, an oxyhydrocarbyl group and a hydrocarbylenedioxy group and has up to 30 atoms other than hydrogen atom.

When p is 1, q and r are each 0, M is in an oxidation state of +3, and X is a stabilizing anionic ligand group selected from the group consisting of allyl, 2-(N,N-dimethylamino) phenyl, 2-(N,N-dimethylaminomethyl)phenyl and 2-(N,N-dimethylamino)benzyl.

When p and r are each 0, q is 1, M is in an oxidation state of +2, X' is a neutral conjugated diene or a neutral non-conjugated diene, which has been arbitrarily substituted by one or more hydrocarbyl groups, and this X' has up to 40 carbon atoms and forms a π-complex together with M.

In the formula (iii), any one embodiment of the following embodiments (1) to (4) is preferable.

(1) p is 2, q and r are each 0, M is in an oxidation state of +4, and X is each independently methyl, benzyl or a halide.

(2) p and q are each 0, r is 1, M is in an oxidation state of +4, and X" is a 1,4-butadienyl group which forms a metallacyclopentene ring together with M.

(3) p is 1, q and r are each 0, M is in an oxidation state of +3, and X is 2-(N,N-dimethylamino)benzyl.

(4) p and r are each 0, q is 1, M is in an oxidation state of +2, and X' is 1,4-diphenyl-1,3-butadiene or 1,3-pentadiene.

In the above embodiments (1) to (4), it is more preferable that R" is a hydrogen atom or a methyl group, and it is particularly preferable that R" is a hydrogen atom.

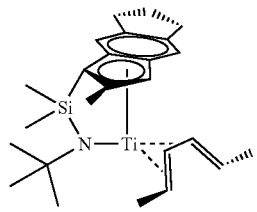

(iv)

The above formula (iv) represents (t-butylamido)dimethyl ($\eta^5$-2-methyl-s-indacene-1-yl)silane-titanium(II)2,4-hexadiene.

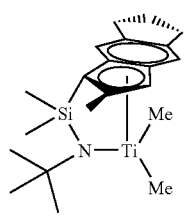

(v)

The above formula (v) represents (t-butylamido)-dimethyl ($\eta^5$-2-methyl-s-indacene-1-yl)silane-titanium(IV)dimethyl.

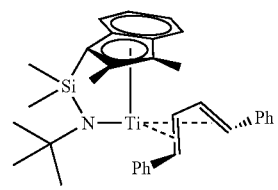

(vi)

The above formula (vi) represents (t-butylamido)-dimethyl($\eta^5$-2,3-dimethylindenyl)silane-titanium(II)1,4-diphenyl-1,3-butadiene.

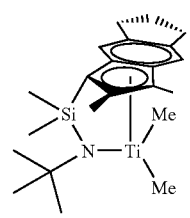

(vii)

The above formula (vii) represents (t-butylamido)-dimethyl($\eta^5$-2,3-dimethyl-s-indacene-1-yl)silane-titanium(IV) dimethyl.

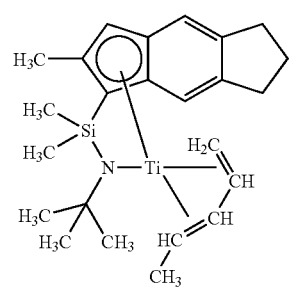

(I)

The above formula (I) represents (t-butylamido)-dimethyl ($\eta^5$-2-methyl-s-indacene-1-yl)silane-titanium(II)1,3-pentadiene (another name: [N-(1,1-dimethylethyl)-1,1-dimethyl-1-[(1,2,3,3A,8A-$\eta$)-1,5,6,7-tetrahydro-2-methyl-S-indacene-1-yl]silaneaminate(2-)-κN][(1,2,3,4-$\eta$)-1,3-pentadiene]-titanium).

For preparing the copolymer (A) or the later-described ethylene/C3-C20 α-olefin copolymer (C), there can be mentioned a continuous process or a batch process wherein the above catalyst is used, a boron-based compound is used as a cocatalyst, an organoaluminum compound is used, an aliphatic hydrocarbon such as hexane is used as a solvent, and a reactor equipped with a stirrer is used.

Examples of the boron-based compounds include trimethylammonium tetrakis(pentafluorophenyl)borate, di(hydrogenated tallow alkyl)methylammonium tetrakis(pentafluorophenyl)borate, triethylammonium tetrakis (pentafluorophenyl)borate, tripropylammonium tetrakis (pentafluorophenyl)borate, tri(n-butyl)ammonium tetrakis (pentafluorophenyl)borate, tri(sec-butyl)ammonium tetrakis (pentafluorophenyl)borate, N,N-dimethylanilinium tetrakis (pentafluorophenyl)borate, N,N-dimethylanilinium n-butyltris(pentafluorophenyl)borate, N,N-dimethylanilinium benzyltris(pentafluorophenyl)borate, N,N-dimethylanilinium tetrakis(4-(t-butyldimethylsilyl))-2,3,5,6-tetrafluorophenyl)borate, N,N-dimethylanilinium tetrakis(4-(triisopropylsilyl)-2,3,5,6-tetrafluorophenyl)borate, N,N-dimethylanilinium pentafluorophenoxytris(pentafluorophenyl)borate, N,N-diethylanilinium tetrakis(pentafluorophenyl)borate, N,N-dimethyl-2,4,6-trimethylanilinium tetrakis(pentafluorophenyl)borate, trimethylammonium tetrakis(2,3,4,6-tetrafluorophenyl)borate, triethylammonium tetrakis(2,3,4,6-tetrafluorophenyl)borate, tripropylammonium tetrakis(2,3,4,6-tetrafluorophenyl)borate, N,N-dimethylanilinum tetrakis(2,3,4,6-tetrafluorophenyl)borate, N,N-diethylanilinum tetrakis(2,3,4,6-tetrafluorophenyl)borate and N,N-dimethyl-2,4,6-trimethylanilinum tetrakis(2,3,4,6-tetrafluorophenyl)borate; dialkylammonium salts such as di(isopropyl)ammonium tetrakis(pentafluorophenyl)borate, tri(n-butyl)ammonium tetrakis(2,3,4,6-tetrafluorophenyl)borate, dimethyl(t-butyl)ammonium tetrakis(2,3,4,6-tetrafluorophenyl)borate and dicyclohexylammonium tetrakis(pentafluorophenyl)borate; tri-substituted phosphonium salts, such as triphenylphosphonium tetrakis(pentafluorophenyl)borate, tri(o-tolyl)phosphonium tetrakis(pentafluorophenyl)borate and tri(2,6-dimethylphenyl)phosphonium tetrakis(pentafluorophenyl)borate; di-substituted oxonium salts, such as diphenyloxonium tetrakis(pentafluorophenyl)borate, di(o-tolyl)oxonium tetrakis(pentafluorophenyl)borate and di(2,6-dimethylphenyl)oxonium tetrakis(pentafluorophenyl)borate; and di-substituted sulfonium salts, such as diphenylsulfonium tetrakis(pentafluorophenyl)borate, di(o-tolyl)sulfonium tetrakis(pentafluorophenyl)borate and bis(2,6-dimethylphenyl)sulfonium tetrakis(pentafluorophenyl)borate.

As the organoaluminum compound, triisobutylaluminum (also referred to as "TIBA" hereinafter) is preferably employed.

The polymerization reaction to prepare the copolymer (A) or the ethylene/α-olefin copolymer (C) is carried out in the presence of the above catalyst at a polymerization temperature of usually −20 to 200° C., preferably 0 to 150° C., more preferably 0 to 100° C., and a pressure of usually more than 0 but not more than 8 MPa (gauge pressure), preferably more than 0 but not more than 5 Mpa (gauge pressure). The polymerization time (average residence time in the case where the copolymerization is carried out by a continuous process) is in the range of usually 0.5 minutes to 5 hours, preferably 10 minutes to 3 hours, though it varies depending upon the conditions such as catalytic concentration and polymerization temperature.

In the copolymerization, a molecular weight modifier such as hydrogen can be also used.

In the case of the copolymer (A), the α-olefin of 3 to 20 carbon atoms is used in an amount of usually 20 to 400 parts by weight, preferably 25 to 300 parts by weight, and the non-conjugated polyene is used in an amount of usually 10 to 400 parts by weight, preferably 15 to 300 parts by weight, based on 100 parts by weight of ethylene. In the case of the ethylene/α-olefin copolymer (C), the α-olefin of 3 to 20 carbon atoms is used in an amount of usually 25 to 200 parts by weight, preferably 30 to 150 parts by weight, based on 100 parts by weight of ethylene. In the case of the copolymer (A), the weight ratio of the catalyst to ethylene is preferably in the range of $1.0 \times 10^{-6}$ to $3.0 \times 10^{-5}$, and in the case of the ethylene/α-olefin copolymer (C), the weight ratio of the catalyst to ethylene is preferably in the range of $1.0 \times 10^{-6}$ to $5.0 \times 10^{-6}$.

By the use of the above catalyst, the resulting rubber molded product is inhibited from fogging and tackiness caused by a low-molecular weight component, so that use of such a catalyst is preferable.

Ethylene/C3-C20 α-Olefin Copolymer (C)

The ethylene/C3-C20 α-olefin copolymer (C) for use in the present invention (2) preferably satisfies all of the requirements (1), (4) and (7) at the same time and more preferably satisfies all of the requirements (1), (4), (5) and (7) at the same time. The total of constituent units derived from ethylene and constituent units derived from the α-olefin of 3 to 20 carbon atoms is 100% by mol. This ethylene/C3-C20 α-olefin copolymer (C) preferably further satisfies the following requirements (8) to (10) in addition to the requirements (1), (4), (6) and (7).

Requirement (1)

The requirement (1) is that the content of constituent units derived from ethylene is in the range of preferably 50 to 85% by mol, more preferably 50 to 80% by mol, as previously described. When the content of the constituent units derived from ethylene is in the above range, fogging and tackiness of the resulting rubber molded product caused by a low-molecular weight component are inhibited, so that such a content is preferable.

Requirement (4)

The requirement (4) is that the B value is in the range of preferably 0.8 to 1.05, more preferably 0.9 to 1.05, as previously described. When the B value is in the above range, compatibility of the copolymer (A) with the component (C) is enhanced, so that such a value is preferable.

Requirement (6)

The requirement (6) is that the polymerization is carried out under the given conditions using the catalyst represented by the aforesaid formula (I) as a main catalyst and a boron-based compound such as $(C_6H_5)_3CB(C_6F_5)_4$ as a cocatalyst and using an organoaluminum compound, as previously described.

Requirement (7)

The requirement (7) is that the number-average molecular weight (Mn) is in the range of 2500 to 5000. The number-average molecular weight is in the range of preferably 2500 to 4500, more preferably 2500 to 4000. When the number-average molecular weight is in the above range, fogging and tackiness of the resulting rubber molded product caused by a low-molecular weight component are inhibited, so that such a number-average molecular weight is preferable.

Requirement (8)

The requirement (8) is that the pour point is not lower than −25° C. The pour point is in the range of preferably −25 to 20° C., more preferably −15 to 20° C. When the pour point is in the above range, fogging and tackiness of the resulting rubber molded product caused by a low-molecular weight component are inhibited, so that such a pour point is preferable.

Requirement (9)

The requirement (9) is that the viscosity index is not less than 120. The viscosity index is in the range of preferably 120 to 5000, more preferably 150 to 5000. When the viscosity index is in the above range, fogging and tackiness of the resulting rubber molded product caused by a low-molecular weight component are inhibited, so that such a viscosity index is preferable.

Requirement (10)

The requirement (10) is that the flash point is not lower than 240° C. The flash point is preferably not lower than 245° C., more preferably not lower than 250° C. When the flash point is in the above range, generation of lampblack can be inhibited in the high-temperature molding, and the copolymer (C) is excellent from the viewpoints of safety, environment and heat aging resistance.

The ethylene/C3-C20 α-olefin copolymer (C) is a liquid copolymer of ethylene and an α-olefin of 3 to 20 carbon atoms, preferably 3 to 12 carbon atoms, more preferably 3 to 8 carbon atoms. As the α-olefin of 3 to 20 carbon atoms, the same α-olefin as used for the aforesaid ethylene/C3-C20 α-olefin/non-conjugated polyene copolymer (A) is employable.

Since the ethylene/α-olefin copolymer (C) has a low pour point and a high viscosity index, a rubber composition containing the ethylene/α-olefin copolymer (C) is excellent in weathering resistance, heat resistance and low-temperature flexibility as compared with general mineral oil type softeners. Further, the ethylene/α-olefin copolymer (C) has composition close to that of the copolymer composed of ethylene, an α-olefin of 3 to 20 carbon atoms and a non-conjugated polyene, and therefore, the copolymer (C) has excellent compatibility, rarely causes bleeding even if it is added in a large amount, and does not cause tackiness and staining.

The content of the ethylene/α-olefin copolymer (C) is in the range of 1 to 200 parts by weight, preferably 5 to 150 parts by weight, more preferably 5 to 100 parts by weight, based on 100 parts by weight of the copolymer (A). When the content of the ethylene/α-olefin copolymer (C) is in the above range, fogging and tackiness of the resulting rubber molded product caused by a low-molecular weight component are inhibited, so that such a content is preferable.

Paraffinic Oil (D)

The rubber composition of the present invention (2) preferably further contains paraffinic oil. As the paraffinic oil, commercially available one is employable, and examples thereof include "Diana Process Oil" (available from Idemitsu Kosan Co., Ltd.), "JOMO Process P Series" (available from Japan Energy Corporation), "Sunper" and "Sunsen" (available from Japan Sun oil Company, Ltd.), "Shell Flex Series" and "Risella" (available from Shell Co.), and "Fukol Process P Series" (available from Fuji Kosan Co., Ltd.). Of these, preferable are "PW-100" and "PW-380" grades of "Diana Process Oil".

The content of the paraffinic oil (D) is in the range of preferably 1 to 200 parts by weight, more preferably 5 to 150 parts by weight, based on 100 parts by weight of the copolymer (A). When the content of the paraffinic oil (D) is in the above range, fogging and tackiness of the resulting rubber molded product caused by a low-molecular weight component are inhibited, so that such a content is preferable.

Other Additives

To the rubber composition of the present invention (2), other additives can be appropriately added according to the purpose. Examples of the other additives include reinforcing agent, inorganic filler, anti-aging agent (stabilizer), processing aid, activator, blowing agent and blowing assistant. If necessary, other mineral oil type softeners may be used in combination.

Reinforcing Agent and Inorganic Filler

In order to enhance mechanical properties of the rubber composition of the present invention (2), such as tensile strength, tear strength and abrasion resistance, it is preferable to add a reinforcing agent to the rubber composition. Specifically, carbon black of "Shiest" series, such as SRF, GPF, FEF, MAF, HAF, ISAF, SAF, FT and MT (available from Tokai Carbon Co, Ltd.), reinforcing agents obtained by surface-treating these carbon black with a silane coupling agent or the like, silica, activated calcium carbonate, finely powdered talc, finely powdered silicic acid, etc. can be employed. As the inorganic fillers, light calcium carbonate, heavy calcium carbonate, talc, clay, etc. can be employed. Of these, "Shiest HAF" carbon black is preferable.

The amount of the reinforcing agent and/or the inorganic filler added is in the range of usually 1 to 500 parts by weight, preferably 1 to 400 parts by weight, more preferably 1 to 300 parts by weight, based on 100 parts by weight of the copolymer (A). When the amount of the reinforcing agent and/or the inorganic filler added is in the above range, mechanical strength of the resulting rubber molded product is excellent, so that such an amount is preferable.

Anti-Aging Agent (Stabilizer)

By using the anti-aging agent in the rubber composition of the present invention (2), it becomes possible to lengthen the product life, and this is the same as in usual rubber compositions. As such an anti-aging agent, a hitherto known anti-aging agent, such as an amine type anti-aging agent, a phenol type anti-aging agent or a sulfur type anti-aging agent, is employable.

Examples of the anti-aging agents include aromatic secondary amine type anti-aging agents, such as phenylbutylamine and N,N-di-2-naphthyl-p-phenylenediamine; phenol type anti-aging agents, such as dibutylhydroxytoluene and tetrakis[methylene(3,5-di-t-butyl-4-hydroxy)hydrocinnamate]methane; thioether type anti-aging agents, such as bis[2-methyl-4-(3-n-alkylthiopropionyloxy)-5-t-butylphenyl]sulfide; dithiocarbamic acid salt type anti-aging agents, such as nickel dibutyldithiocarbamate; and sulfur type anti-aging agents, such as 2-mercaptobenzoylimidazole, zinc salt of 2-mercaptobenzimidazole, dilauryl thiodipropionate and distearyl thiodipropionate.

These anti-aging agents can be used singly or in combination of two or more kinds, and the amount of such an anti-aging agent added is in the range of usually 0.01 to 10 parts by weight, preferably 0.01 to 7.0 parts by weight, more preferably 0.01 to 5.0 parts by weight, based on 100 parts by weight of the copolymer (A). When the amount of the anti-aging agent added is in the above range, heat aging resistance of the resulting rubber molded product is excellent, so that such an amount is preferable.

Processing Aid

As the processing aids, compounds generally added to rubbers as processing aids can be widely used. Examples of such compounds include ricinolic acid, stearic acid, palmitic acid, lauric acid, barium stearate, zinc stearate, calcium stearate and esters thereof. Of these, stearic acid is preferable.

The processing aid can be appropriately added in an amount of not more than 30 parts by weight, preferably not more than 25 parts by weight, more preferably not more than 20 parts by weight, based on 100 parts by weight of the copolymer (A). When the amount of the processing aid added is in the above range, processabilities, such as kneading processability, extrusion processability and injection moldability, are excellent, so that such an amount is preferable.

Activator

Examples of the activators which are used in the present invention (2) when needed include glycols, such as polyethylene glycol and diethylene glycol; and amines, such as di-n-butylamine and triethanolamine.

The amount of the activator added is in the range of 0.2 to 10 parts by weight, preferably 0.3 to 5 parts by weight, more preferably 0.5 to 4 parts by weight, based on 100 parts by weight of the copolymer (A).

Blowing Agent

Examples of the blowing agents which are used in the present invention (2) when needed include inorganic blowing agents, such as sodium bicarbonate and sodium carbonate; and organic blowing agents, specifically, nitroso compounds, such as N,N'-dinitrosopentamethylenetetramine and N,N'-dinitrosoterephthalamide; azo compounds, such as azodicarbonamide and azobisbutylonitrile; hydrazide compounds, such as benzenesulfonylhydrazide and p,p'-oxybis(benzenesulfonylhydrazide); and azide compounds, such as calcium azide and 4,4'-diphenyldisulfonyl azide.

The amount of the blowing agent added is in the range of 0.2 to 35 parts by weight, preferably 0.5 to 30 parts by weight, more preferably 1 to 25 parts by weight, based on 100 parts by weight of the copolymer (A).

In addition, additives usually used for rubbers can be arbitrarily added within limits not detrimental to the object of the present invention (2).

Solution Containing Component (A) and Component (C)

The solution containing the copolymer (A) and the ethylene/α-olefin copolymer (C) of the present invention (2) is obtained by dissolving the component (A) and the component (C) in an aliphatic hydrocarbon solvent. Such a solution containing the component (A) and the component (C) may be prepared by dissolving the component (A) and the component (C) in aliphatic hydrocarbon solvents which are the same or different, respectively, to obtain a solution (A) and a solution (C) and then mixing them, or may be prepared by dissolving the component (A) and the component (C) in an aliphatic hydrocarbon solvent. In the case where the component (D) is added, the solution may be prepared by dissolving the component (D) in the solution (A) or the solution (C) and then mixing them, or may be prepared by dissolving the component (D) in the solution containing the component (A) and the component (C), or may be prepared by dissolving the component (D) in an aliphatic hydrocarbon solvent which is the same as or different from the solvent for the component (A) or the component (C) to obtain a solution (D) and mixing the solution (D) with the solution containing the component (A) and the component (C).

The solvents used are not specifically restricted, provided that they can dissolve the components (A), (C) and (D) and they are compatible with each other. Examples of such solvents include hexane, heptane and decane. Of these, hexane is preferable.

The order of addition of the components (A), (C) and (D) is not specifically restricted either, and it is enough that the components (A), (C) and (D) are finally dissolved in one to three kinds of aliphatic hydrocarbon solvents.

In the solution containing the components (A) and (C) of the present invention (2), the concentrations of the components (A), (C) and (D) are as follows. The component (A) is contained in an amount of 1 to 60 parts by weight, preferably 1 to 55 parts by weight, more preferably 1 to 50 parts by weight, the component (C) is contained in an amount of 0.01 to 30 parts by weight, preferably 0.01 to 28 parts by weight, more preferably 0.01 to 25 parts by weight, and the component (D) is contained in an amount of 0.01 to 30 parts by weight, preferably 0.01 to 28 parts by weight, more preferably 0.01 to 25 parts by weight, with the proviso that the total of the components (A), (C) and (D) is 100 parts by weight. When the concentrations of the components are in the above ranges, fogging and tackiness of the resulting rubber molded product caused by a low-molecular weight component are inhibited, so that such concentrations are preferable.

Examples of methods to prepare the rubber composition include a method of removing the solvent from the solution containing the component (A) and (C) of the present invention (2) and a method of kneading the components (A), (C) and (D) or the components (A) and (C). The former method is preferable because compatibility of the components with each other can be enhanced.

By preparing such a solution containing the component (A) and the component (C), the components are homogeneously mixed with each other, and therefore, the rubber composition obtained by removing the solvent from the solution containing the component (A) and the component (C) is enhanced in compatibility, and the resulting rubber molded product can be inhibited from occurrence of fog and tackiness.

Crosslinked Product and Rubber Molded Product

The crosslinked product of the present invention (2) is a crosslinked product of the rubber composition, and for crosslinking the rubber composition, the following two methods can be given as examples. That is to say, there can be mentioned (a) a method wherein the rubber composition to which a crosslinking agent has been added is preformed to give a desired shape by various performing means using heating modes or heating baths, such as extruder, calender roll, press, injection molding machine, transfer molding machine, hot air, glass bead fluidized bed, UHF (ultra high frequency electromagnetic wave), steam and LCM (molten salt bath), and simultaneously with the preforming, heating is carried out, or the resulting preform is introduced into a vulcanization bath, followed by heating, and (b) a method wherein the rubber composition of the present invention (2) is preformed by the above method and irradiated with electron rays.

In the case of the method (a), the following vulcanizing agent is preferably used as the crosslinking agent, and if necessary, the following vulcanization accelerator and/or the following vulcanization assistant can be used in combination. The heating is carried out at a temperature of generally 140 to 300° C., preferably 150 to 270° C., more preferably 150 to 250° C., for a heating time of usually 0.5 to 30 minutes, preferably 0.5 to 20 minutes, more preferably 0.5 to 15 minutes.

Vulcanizing Agent

As the vulcanizing agent, a sulfur-based compound, an organic peroxide, a phenolic resin, an oxime compound or the like is employable. Examples of the sulfur-based compounds include sulfur, sulfur chloride, sulfur dichloride, morpholine disulfide, alkylphenol disulfide, tetramethylthiuram disulfide and selenium dithiocarbamate. Of sulfur and the sulfur compounds, sulfur and tetramethylthiuram disulfide are preferable. The sulfur-based compound can be added in an amount of usually 0.1 to 10 parts by weight, preferably 0.1 to 7 parts by weight, more preferably 0.1 to 5 parts by weight, based on 100 parts by weight of the copolymer (A). When the amount of the sulfur-based compound added is in the above range, mechanical strength and heat aging resistance of the resulting molded product are excellent, so that such an amount is preferable.

Examples of the organic peroxides include dicumyl peroxide, 2,5-dimethyl-2,5-di(t-butylperoxy)hexane, 2,5-dimethyl-2,5-di(benzoylperoxy)hexane, 2,5-dimethyl-2,5-di(t-butylperoxy)hexyne-3, di-t-butyl peroxide, di-t-butylperoxy-3,3,5-trimethylcyclohexane and t-dibutyl hydroperoxide. Of these, dicumyl peroxide, di-t-butyl peroxide and di-t-butylperoxy-3,3,5-trimethylcyclohexane are preferable.

The amount of the organic peroxide added is in the range of usually 0.001 to 0.05 mol, preferably 0.002 to 0.02 mol, more preferably 0.005 to 0.015 mol, based on 100 g of the copolymer (A). When the amount of the organic peroxide added is in the above range, mechanical strength and heat aging resistance of the resulting molded product are excellent, so that such an amount is preferable.

Vulcanization Accelerator

When the sulfur-based compound is used as the vulcanizing agent, it is preferable to use a vulcanization accelerator in combination. Examples of the vulcanization accelerators include thiazole type vulcanization accelerators, such as N-cyclohexyl-2-benzothiazole sulfenamide, N-oxydiethylene-2-benzothiazole sulfenamide, N,N'-diisopropyl-2-benzothiazole sulfenamide, 2-mercaptobenzothiazole, 2-(2,4-dinitrophenyl)mercaptobenzothiazole, 2-(2,6-diethyl-4-morpholinothio)benzothiazole and dibenzothiazyl disulfide; guanidine type vulcanization accelerators, such as diphenylguanidine, triphenylguanidine and diorthotolylguanidine; aldehyde-amine type vulcanization accelerators, such as acetaldehyde-aniline condensate and butylaldehyde-aniline condensate; imidazoline type vulcanization accelerators, such as 2-mercaptoimidazoline; thiourea type vulcanization accelerators, such as diethylthiourea and dibutylthiourea; thiuram type vulcanization accelerators, such as tetramethylthiuram monosulfide and tetramethylthiuram disulfide; dithioic acid salt type vulcanization accelerators, such as zinc dimethyldithiocarbamate, zinc diethyldithiocarbamate and tellurium diethyldithiocarbamate; xanthate type vulcanization accelerators, such as zinc dibutylxanthate; and others, such as zinc white (zinc oxide). Of these, 2-mercaptobenzothiazole and tetramethylthiuram disulfide are preferable.

The amount of the vulcanization accelerator added is in the range of usually 0.1 to 20 parts by weight, preferably 0.2 to 15 parts by weight, more preferably 0.5 to 10 parts by weight, based on 100 parts by weight of the copolymer (A). When the amount of the vulcanization accelerator added is in the above range, mechanical strength and heat aging resistance of the resulting molded product are excellent, so that such an amount is preferable.

Vulcanization Assistant

When the organic peroxide is used as the vulcanizing agent, it is preferable to use a vulcanization assistant in combination. Examples of the vulcanization assistants include sulfur; quinonedioxime type vulcanization assistants, such as p-quinonedioxime; acrylic type vulcanization assistants, such as ethylene glycol dimethacrylate and trimethylolpropane trimethacrylate; allyl type vulcanization assistants, such as diallyl phthalate and triallyl isocyanurate; maleimide type vulcanization assistants; and divinylbenzene.

The amount of the vulcanization assistant added is in the range of usually 0.5 to 2 mol, preferably 0.5 to 1.5 mol, based on 1 mol of the organic peroxide used, more preferably equimolar amount to the organic peroxide.

In the molding/vulcanization process, a mold may be used or may not be used. If a mold is not used, the rubber composition is usually continuously molded and vulcanized.

In the case of the method (b) wherein the rubber composition of the present invention (2) is preformed by the above preforming and then crosslinked by irradiation with electron rays, the preformed rubber composition is irradiated with electron rays having energy of 0.1 to 10 MeV so that the absorbed dose will become usually 0.5 to 35 Mrad, preferably 0.5 to 20 Mrad, more preferably 1 to 10 Mrad.

Uses

The rubber molded product obtained by the use of the rubber composition of the present invention (2) or its crosslinked product as a raw material is favorably used in the fields where weathering resistance, heat aging resistance, bleed resistance and low-temperature flexibility are required. Specifically, the rubber molded product is favorably used for parts for automobiles, parts for ships, parts for civil engineering and construction, medical parts, parts for electric/electronic equipments, parts for transportation means, parts for leisure, hoses (radiator hose, heater hose, etc.), rubber vibration insulators, sheets, various belts, various packings, sealing materials, potting materials, coating materials, adhesives, etc.

Examples of the parts for automobiles include glass run channel, weatherstrip sponge, door opening trim, seal member, grommet, gasket of automobile engine, and sealing material for electrical equipment or oil filter; potting material for igniter HIC or automobile hybrid IC; coating material for automobile body, automobile window glass or engine control board; and adhesive for gasket of oil pan or timing belt cover, molding, head lamp lens, sunroof seal or mirror. Examples of the weatherstrip sponges include door weatherstrip, trunk weatherstrip, luggage weatherstrip, roof side rail weatherstrip, slide door weatherstrip, ventilator weatherstrip, sliding roof weatherstrip, front window weatherstrip, rear window weatherstrip, quarter window weatherstrip, lock pillar weatherstrip, door glass outer weatherstrip and door glass inner weatherstrip.

Examples of the parts for ships include sealing material for wiring connection branch box, electric system part or electric wire; and adhesive for electric wire or glass.

Examples of the parts for civil engineering and construction include construction sealant, which is used for butt joint of glass screen method for commercial building, joint between glass and sash, interior joint in toilet, lavatory or showcase, joint around bathtub, outer wall expansion joint for prefabricated house, or sizing board joint; sealing material for double glazing; civil engineering sealant used for road repairs; paint or adhesive for metal, glass, stone, slate, concrete or tile; and adhesive sheet, waterproof sheet or vibration insulator sheet.

Examples of the medical parts include medical rubber stopper, syringe gasket and rubber stopper for vacuum blood collection tube.

Examples of the parts for electric/electronic equipments include sealing material, potting material, coating material or adhesive material for heavy electric current part, weak electric current part, or circuit or substrate of electric/electronic equipment; maintenance material for electric wire covering; insulating seal for electric wire joint part; OA equipment roll; vibration absorbing material; grommet; and gel encapsulation material for condenser.

Examples of the parts for transportation means include parts for automobiles, ships, airplanes and railroad vehicles.

Examples of the parts for leisure include swimming materials, such as swimming cap, diving mask and earplug; and gel buffer members, such as sporting shoes and baseball glove.

Examples of the rubber vibration insulators include rubber vibration insulators for automobiles (engine mount, liquid seal engine mount, dumper pulley, chain dumper, carburetor mount, torsional dumper, strut mount, rubber bush, bumper rubber, helper rubber, spring sheet, shock absorber, air spring, body mount, bumper guard, muffler support, rubber coupling, center bearing support, crutch rubber, deaf mount, suspension bush, slide bush, cushion strut bar, stopper, handle dumper, radiator support or muffler hanger), rubber vibration insulators for railroads (slab mat, balas mat or railway mat), and rubber vibration insulators for industrial machinery (expansion joint, flexible joint, bush or mount).

Examples of the sheets include roofing sheet and waterstop sheet.

Examples of various belts include transmission belts (V-belt, flat belt, synchronous belt or timing belt) and carrier belts (light carrier belt, cylindrical belt, rough top belt, flanged carrier belt, U-shaped guide carrier belt or V-shaped guide carrier belt).

The sealing materials are favorably used as seals for, for example, refrigerator, freezer, washing machine, gas meter, microwave oven, steam iron and earth leakage breaker. The sealing materials mean materials used for sealing. Further, materials which are used for the purpose of making joints or contact parts watertight or airtight in various industries such as mechanical, electrical and chemical industries are also the sealing materials in a broad sense.

The potting materials are favorably used for potting, for example, transformer high-tension circuit, printed board, high-voltage transformer with variable resistor, electrically insulating part, semi-conductive part, conductive part, solar battery or flyback transformer for television.

The coating materials are favorably used for coating, for example, various circuit elements of high-voltage thick-film resistor, hybrid IC, etc.; HIC and electrically insulating part; semi-conductive part; conductive part; module; printed circuit; ceramic board; buffer material for diode, transistor, bonding wire or the like; semiconductor element; or optical fiber for optical communication.

The adhesives are favorably used for bonding, for example, cathode-ray tube wedge, neck, electrically insulating part, semi-conductive part or conductive part.

In addition, the rubber composition of the present invention (2) or its crosslinked product is favorably used for automobile cup seals (master cylinder piston cup, wheel cylinder piston cup, constant-velocity joint boot, pin boot, dust cover, piston seal, packing, O-ring, diaphragm, dam windshield, door mirror bracket, seal head lamp or seal cowl top), industrial seals (condenser packing, O-ring or packing), foamed products (hose protection sponge, cushion sponge, heat insulating sponge or insulation pipe), covered electric wire, electric wire joint, electrically insulating part, semi-conductive rubber part, OA machine rolls (charged roll, transfer roll, developing roll or paper feeding roll), industrial rolls (iron manufacturing roll, paper manufacturing roll or printing electric wire roll), anode cap, plug cap, ignition cable, lamp socket cover, terminal cover, wiper blade, various tubes (vacuum tube or tire tube), air spring, shoe sole, shoe heel, tire sidewall, fabric coating, etc.

EXAMPLES I

The present invention (1) is further described with reference to the following Examples I, but it should be construed that the present invention (1) is in no way limited to those examples.

Properties described hereinafter and their test methods are as follows.

(1) Composition of Ethylene/α-Olefin/Non-Conjugated Polyene Copolymer

A $^1$H-NMR spectrum of the copolymer was measured by the use of an ECX400P type nuclear magnetic resonance device manufactured by JEOL Ltd. under the conditions of a measuring temperature of 120° C., a measuring solvent of ODCB-$d_4$ and a number of integration times of 512.

(2) Intrinsic Viscosity [η] of Ethylene/α-Olefin/Non-Conjugated Polyene Copolymer Intrinsic viscosity of the copolymer was measured by the use of a fully automatic intrinsic viscometer manufactured by Rigo Co., Ltd. under the conditions of a temperature of 135° C. and a measuring solvent of decalin.

(3) Ethylene Distribution Parameter P of Ethylene/α-Olefin/Non-Conjugated Polyene Copolymer In 10 ml of cyclohexane which was an eluent, 0.02 g of the ethylene/α-olefin/non-conjugated polyene copolymer was dissolved, then the solution was filtered through a filter of 0.45 μm, and GPC-offline-FTIR measurement was carried out.

The measurement was carried out using cyclohexane as an eluent under the conditions of a flow rate of 1.0 ml/min and a temperature of 60° C., and in this measurement, a gel permeation chromatograph Alliance GPC2000 type (manufactured by Waters corporation) was used as an apparatus, two of Gel GMHHR-H manufactured by Tosoh Corporation were used as columns, a differential refractometer RI-8020 manufactured by Tosoh Corporation was used as a detector, and LC-Transform series 300 manufactured by Lab Connection Inc. was used as a FTIR device.

Calculation of a molecular weight was carried out in terms of polyisobutylene, and the detector and the FTIR measuring device were connected in parallel to the pipes at the exits of the columns so that the flow rates would become almost equal to each other. When the maximum peak intensity in the range of $721\pm20$ cm$^{-1}$ in a chart obtained as a result of the FTIR measurement is represented by $A721$ cm$^{-1}$ and the maximum peak intensity in the range of $4320\pm20$ cm$^{-1}$ in the chart is represented by $A4320$ cm$^{-1}$, the ethylene distribution parameter P is represented by:

$$P = A721\text{ cm}^{-1}/A4320\text{ cm}^{-1}$$

However, the maximum peak intensity in the range of $721\pm20$ cm$^{-1}$ was considered an intensity from a base line that links a minimum point in the range of $782\pm20$ cm$^{-1}$ with a minimum point in the range of $690\pm20$ cm$^{-1}$, and likewise, the maximum peak intensity in the range of $4320\pm20$ cm$^{-1}$ was considered as an intensity from a base line that links a minimum point in the range of $4480\pm20$ cm$^{-1}$ with a minimum point in the range of $3500\pm20$ cm$^{-1}$.

(4) Filler Dispersibility Index FDI

A sheet of the rubber blend (I) was punched to prepare a sample. Then, dependence of storage elastic modulus G' of the sample on strain was measured by the use of a dynamic viscoelasticity tester. The measuring conditions are as follows.

Dynamic viscoelasticity tester (RDS): manufactured by Rheometrics Co.

Sample: A disc having a diameter of 25 mm was punched from a sheet of 2 mm and used as a sample.

Temperature: 100° C.
Strain: 0.01 to 10%
Frequency: 10 Hz

When the storage elastic modulus G' at a strain of 0.01% obtained as a result of the dynamic viscoelasticity measurement is represented by G' (0.01%) and the storage elastic modulus G' at a strain of 1.00% is represented by G' (1.00%), the filler dispersibility index FDI is represented by:

$$FDI = G'(1.00\%)/G'(0.01\%)$$

(5) Gel-Like Substance

The quantity of gel in the copolymer rubber has influence on appearance or properties of the resulting molded product. In 800 ml of n-decane, 16 g of the blend (I) was dissolved at 150° C. for 4 hours, then the decalin solution was filtered through a mesh of an opening of 106 μm, and evaluation was carried out based on the number of residues on the mesh to the charge weight.

The gel-like substance was evaluated by the following criteria.

AA: not more than 1
BB: not less than 2 but less than 5
CC: not less than 5 but less than 8
DD: not less than 8

(6) Specific Gravity

A specimen of 20 mm×20 mm was punched from a vulcanized molded product (III), and dirt on the surface of the specimen was wiped off with an alcohol. Then, this specimen was set at a given position of an automatic specific gravimeter (manufactured by Toyo Seiki Seisaku-sho, Ltd., M-1 type) in an atmosphere of 25° C., and from a difference between mass in air and mass in pure water, a specific gravity was determined.

(7) Hardness

A flat part of a vulcanized molded product (III) was folded to give a thickness of 12 mm, and hardness (JIS-A) of the molded product was measured in accordance with JIS K6253.

(8) Tensile Strength at Break, Tensile Elongation at Break

A vulcanized molded product (III) was subjected to a tensile test under the conditions of a measuring temperature of 23° C. and a stress rate of 500 mm/min in accordance with JIS K6251 to measure a tensile strength at break (TB) and a tensile elongation at break (EB).

(9) Compression Set (CS)

A sample was withdrawn from a vulcanized molded product (III) in accordance with the points of JIS K6250 6.5, and a compression set of the sample was measured after treatment of 70° C.×22 hr and after treatment of 90° C.×72 hr in accordance with JIS K6262 (1997).

(10) Shape Recovery Ratio and Shape Memory Ratio

A rectangular plate of 10 mm (width)×60 mm was punched from a vulcanized molded product (III) to prepare a specimen. Then, on the central part of the specimen, a marked line of 30 mm was drawn in the lengthwise direction, and the specimen was deformed by the use of a fixture so that the length of the marked line would become 60 mm, then placed in an oven at 180° C. and allowed to stand for 5 minutes. Thereafter, the specimen was taken out from the oven and cooled with water.

After one day from removal of the fixture, the marked line distance (L1) on the surface of the specimen was measured. Subsequently, this specimen was placed in an oven at 180° C. again, allowed to stand for 5 minutes, then taken out from the oven and allowed to stand for 30 minutes at room temperature. Thereafter, the marked line distance (L2) was measured. Shape recovery ratio and shape memory ratio of the specimen were calculated from the following formulas using the marked line distances (L1) and (L2).

$$\text{Shape recovery ratio [\%]} = [(L1-L2) \times 100]/[L1-30]$$

$$\text{Shape memory ratio [\%]} = [(L1-30) \times 100]/[60-30]$$

(11) Water absorption (Measured in Examples 1-3 and 1-8, and Comparative Examples 1-3, 1-5, 1-8 and 1-10)

A specimen of 20 mm×20 mm was punched from a vulcanized sponge rubber (vulcanized molded product (III)). The specimen was placed at the position of 50 mm below the surface of the water, then the pressure was reduced to 125 mmHg, and the specimen was held for 3 minutes. Then, the specimen was returned in the atmosphere, and after the lapse of 3 minutes, the weight of the specimen having absorbed water was measured, and water absorption was calculated from the following formula.

$$\text{Water absorption (\%)} = [W2-W1]/W1] \times 100$$

W1: weight (g) of specimen before immersion
W2: weight (g) of specimen after immersion

(12) Haze Value (Internal Haze (%))

Haze of a specimen having a thickness of 1 mm was measured by the use of a digital haze meter "NDH-20D" manufactured by Nippon Denshoku Industries Co., Ltd.

(13) Change of Hardness, Change of Volume, Change of Weight

After a specimen was immersed in brake oil (DOT3 equivalent product) at 150° C. for 70 hours or subjected to aging test at a given temperature for a given time in accordance with JIS K6258, change of hardness, change of volume and change of weight were measured.

(14) Volume Resistivity

Volume resistivity was evaluated in accordance with ASTM D 257.

(15) Flex Test

Flex test was carried out by the use of a de Mattia testing machine in accordance with JIS K 6301, and the number of flex times at which the length of a crack became 15 mm was measured.

(16) Gas Permeability Test

A vulcanized sheet was subjected to gas permeability test using a differential pressure gas permeability testing machine (manufactured by Toyo Seiki Seisaku-sho, Ltd.) and using 100% oxygen as a testing gas (permeation gas) under the conditions of a temperature of 23° C. and a humidity of 0% in accordance with ASTM D 1434, to measure gas permeability of the sheet.

(17) Volatile Loss (wt %)

Volatile loss of a crosslinked product was determined in the following manner. Using a thermobalance, the crosslinked product was heated from room temperature to 300° C. at a heating rate of 100° C./min in nitrogen and maintained at 300° C. for 20 minutes, and a loss in weight was determined from the TGA (thermogravimetric analysis) curve and expressed in "% by weight".

(18) Fogging (mg)

Fogging of a crosslinked product was tested in the following manner. The crosslinked product was molded to obtain a rubber molded product in the form of a disc having a diameter of 80 mm and a thickness of 2 mm, and the rubber molded product was used as a sample. The sample was placed in a beaker shown in FIG. 2, and on the beaker, an aluminum foil and a cooling plate were placed (FIG. 3). Then, the beaker was immersed in an oil bath in such a manner that the upper part (60 mm) of the beaker came out from the liquid level, followed by heating at 110° C. After 20 hours, the weight of the sample precipitated on the aluminum foil was measured, and it was regarded as a quantity of fogging.

(19) Cold Flex Test

Cold flex test was carried out by the use of a Gehman cold flex tester in accordance with JIS K 6261 (1993), and t5 (° C.), freezing temperature, etc. were measured.

(20) Modulus

Tensile test was carried out under the conditions of a measuring temperature of 23° C. and a stress rate of 500 mm/min in accordance with JIS K 6301, and a modulus at 100% elongation (M100), a modulus at 200% elongation (M200) and a modulus at 300% elongation (M300) were measured.

(21) Aging Test

A specimen was subjected to heat aging test in air or brake oil (DOT3 equivalent product) at a given temperature for a given time, and retentions of properties after aging, that is, retention of tensile strength after aging (%), retention of tensile elongation after aging (%), etc. were determined.

Preparation of Ethylene/α-Olefin/Non-Conjugated Polyene Copolymers (A)

The ethylene/α-olefin/non-conjugated polyene copolymers (A) used in the examples and the comparative examples were prepared in the following manner.

Preparation of Ethylene/α-Olefin/Non-Conjugated Polyene Copolymer (A-1)

A 300-liter SUS reactor equipped with a stirrer was used, and to the reactor were continuously fed hexane at a rate of 26.8 kg/hr, ethylene (C2) at a rate of 4.6 kg/hr, propylene (C3) at a rate of 4.0 kg/hr, 5-ethylidene-2-norbornene (ENB) at a rate of 1.2 kg/hr, hydrogen at a rate of 19 N liter/hr, [N-(1,1- dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium as a main catalyst at a rate of 0.07 mmol/hr, $(C_6H_5)_3CB(C_6F_5)_4$ as a cocatalyst at a rate of 0.28 mmol/hr and TIBA as an organoaluminum compound at a rate of 1.8 mmol/hr, with maintaining the temperature at 80° C. and adjusting the liquid level to 100 liters, whereby a polymerization solution of a terpolymer (EPDM A-1) of ethylene, propylene and 5-ethylidene-2-norbornene was prepared.

The polymerization pressure was 2.1 MPa (gauge pressure).

The resulting polymerization solution was subjected to removal of solvent by flash drying to obtain EPDM A-1. Properties of the resulting polymer are set forth together in Table 1-1.

The above-mentioned [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium was synthesized in accordance with the process described in National Publication of International Patent No. 522398/2001.

Preparation of Ethylene/α-Olefin/Non-Conjugated Polyene Copolymer (A-C1)

EPDM A-C1 was obtained in the same manner as in the preparation of the ethylene/α-olefin/non-conjugated polyene copolymer (A-1), except that $VO(OEt)Cl_2$ was used as a main catalyst, TIBA was not used, and feed rates of the raw materials and the catalysts were changed to those shown in Table 1-1.

Preparation of Ethylene/α-Olefin/Non-Conjugated Polyene Copolymer (A-C2)

EPDM A-C2 was obtained in the same manner as in the preparation of the ethylene/α-olefin/non-conjugated polyene copolymer (A-1), except that rac-dimethylsilylene-bis{1-(2-methyl-4-phenylindenyl)}zirconium dichloride was used as a main catalyst, and feed rates of the raw materials and the catalysts were changed to those shown in Table 1-1.

The copolymers (A-C1) and (A-C2) were copolymers which did not satisfy Pmax/Pmin≦1.4 that is a requirement of the copolymer (A) for use in the present invention (1), and they were used in the comparative examples.

Preparation of Ethylene/α-Olefin/Non-Conjugated Polyene Copolymers B-1, C-1, E-1, F-1, G-1, H-1, I-1, J-1 and K-1

Ethylene/α-olefin/non-conjugated polyene copolymers B-1, C-1, E-1, F-1, G-1, H-1, I-1, J-1 and K-1 were prepared in the same manner as in the preparation of the copolymer A-1 under the conditions shown in Table 1-1.

Preparation of Ethylene/α-Olefin/Non-Conjugated Polyene Copolymers B-C, C-C, E-C, F-C, G-C, H-C, I-C, J-C and K-C Ethylene/α-olefin/non-conjugated polyene copolymers B-C, C-C, E-C, F-C, G-C, H-C, I-C, J-C and K-C were prepared in the same manner as in the preparation of the copolymer A-C1 under the conditions shown in Table 1-1.

Preparation of Polyolefin Resin (B)

Preparation of Liquid Ethylene/Propylene Copolymer Rubbers (EPR-1, EPR-3)

Liquid EPR-1 and liquid EPR-3 were obtained in the same manner as in the preparation of the ethylene/α-olefin/non-conjugated polyene copolymer (A-1), except that $VO(OEt)Cl_2$ was used as a main catalyst, $Al(Et)_{1.5}Cl_{1.5}$ was used as a cocatalyst, and feed rates of the raw materials and the catalysts were changed to those shown in Table 1-1.

Preparation of Liquid Ethylene/Propylene Copolymer Rubbers (EPR-2, EPR-4)

Liquid EPR-2 and liquid EPR-4 were obtained in the same manner as in the preparation of the ethylene/α-olefin/non-conjugated polyene copolymer (A-1), except that [N-(1,1-dimethylethyl)-1,1-dimethyl-1-[(1,2,3,3A,8A-η)-1,5,6,7-tetrahydro-2-methyl-5-indacene-1-yl]silaneaminate(2-)-κN][(1,2,3,4-η)-1,3-pentadiene]-titanium was used as a main catalyst, $(C_6H_5)_3CB(C_6F_5)_4$ was used as a cocatalyst, TIBA was used as an organoaluminum compound, and feed rates of the raw materials and the catalysts were changed to those shown in Table 1-1.

TABLE 1-1

| | Conditions | | | | | | | | | Polymer properties | | | | | | |
|---|---|---|---|---|---|---|---|---|---|---|---|---|---|---|---|---|
| | Hexane kg/h | C2 kg/h | C3 kg/h | H₂ NL/h | ENB kg/h | VNB kg/h | Main catalyst mmol/h | Co-catalyst mmol/h | TIBA mmol/h | Yield kg/h | C2 mol % | C3 mol % | ENB mol % | VNB mol % | [η] dl/g | Molecular weight Mn | Pmax/Pmin |
| EPDM A-1 | 26.8 | 4.6 | 4.0 | 19 | 1.2 | — | 0.07 | 0.28 | 1.8 | 6.0 | 67.8 | 30.8 | 1.4 | — | 2.71 | 120000 | 1.4 |
| EPDM A-C1 | 39.6 | 3.3 | 9.2 | 5 | 0.3 | — | 45 | 315 | — | 4.2 | 68.0 | 30.3 | 1.2 | — | 2.8 | 130000 | 2.6 |
| EPDM A-C2 | 26.8 | 4.6 | 4.0 | 19 | 1.2 | — | 0.07 | 0.28 | 1.8 | 6.0 | 68.0 | 30.7 | 1.3 | — | 2.69 | 120000 | 1.9 |
| EPDM B-1 | 26.8 | 3.9 | 5.4 | 37 | 1.8 | — | 0.07 | 0.28 | 1.8 | 6.0 | 56.8 | 41.1 | 2.1 | — | 1.9 | 60000 | 1.4 |
| EPDM B-C | 39.6 | 3.2 | 9.4 | 11 | 0.6 | — | 45 | 315 | — | 4.2 | 66.6 | 31.1 | 2.3 | — | 1.9 | 60000 | 2.6 |
| EPDM C-1 | 26.8 | 3.9 | 5.4 | 44 | 1.1 | — | 0.07 | 0.28 | 1.8 | 6.0 | 57.2 | 41.5 | 1.3 | — | 1.98 | 50000 | 1.4 |
| EPDM C-C | 39.6 | 3.3 | 9.6 | 13 | 0.3 | — | 45 | 315 | — | 4.2 | 67.2 | 31.5 | 1.3 | — | 1.98 | 50000 | 2.6 |
| EPDM D-1 | 26.8 | 5.2 | 3.4 | 19 | 1.1 | — | 0.07 | 0.28 | 1.8 | 6.0 | 75.7 | 24.3 | 1.3 | — | 2.72 | 65000 | 1.3 |
| EPDM D-C | 39.6 | 3.8 | 6.2 | 10 | 0.3 | — | 45 | 315 | — | 4.2 | 78.5 | 20.5 | 1 | — | 2.62 | 64000 | 2.4 |
| EPDM E-1 | 26.8 | 5.2 | 3.4 | 19 | 1.1 | — | 0.07 | 0.28 | 1.8 | 6.0 | 72.2 | 26.6 | 1.3 | — | 2.13 | 68400 | 1.3 |
| EPDM E-C | 39.6 | 3.7 | 6.9 | 10 | 0.3 | — | 45 | 315 | — | 4.2 | 76.2 | 22.6 | 1.3 | — | 2.13 | 68400 | 2.4 |
| EPDM F-1 | 26.8 | 3.4 | 6.5 | 27 | 0.4 | — | 0.07 | 0.28 | 1.8 | 6.0 | 49.8 | 49.7 | 0.5 | — | 2.16 | 83000 | 1.4 |
| EPDM F-C | 39.6 | 2.9 | 12.1 | 8 | 0.1 | — | 45 | 315 | — | 4.2 | 59.8 | 39.7 | 0.5 | — | 2.16 | 83000 | 2.6 |
| EPDM G-1 | 26.8 | 4.0 | 5.2 | 27 | 1.1 | — | 0.07 | 0.28 | 1.8 | 6.0 | 59.1 | 39.6 | 1.3 | — | 2.16 | 83400 | 1.4 |
| EPDM G-C | 39.6 | 3.4 | 9.0 | 8 | 0.3 | — | 45 | 315 | — | 4.2 | 69.1 | 29.6 | 1.3 | — | 2.16 | 83400 | 2.6 |
| EPDM H-1 | 26.8 | 4.0 | 5.2 | 25 | 1.2 | — | 0.07 | 0.28 | 1.8 | 6.0 | 59.2 | 39.4 | 1.4 | — | 2.71 | 88000 | 1.4 |
| EPDM H-C | 39.6 | 3.3 | 9.1 | 7 | 0.3 | — | 45 | 315 | — | 4.2 | 68.9 | 29.9 | 1.2 | — | 2.71 | 88000 | 2.6 |
| EPDM I-1 | 27.0 | 5.1 | 3.4 | 15 | 1.2 | — | 0.07 | 0.28 | 1.8 | 6.0 | 74.8 | 23.8 | 1.4 | — | 3.35 | 110000 | 1.3 |
| EPDM I-C | 39.6 | 3.7 | 6.6 | 6 | 0.3 | — | 45 | 315 | — | 4.2 | 77.0 | 21.7 | 1.3 | — | 3.34 | 108000 | 2.4 |
| EPDM J-1 | 26.8 | 4.5 | 4.1 | 64 | 1.9 | — | 0.07 | 0.28 | 1.8 | 6.0 | 66.4 | 31.5 | 2.2 | — | 1.03 | 35000 | 1.4 |
| EPDM J-C | 39.6 | 3.5 | 8.0 | 18 | 0.6 | — | 45 | 315 | — | 4.2 | 71.2 | 26.5 | 2.3 | — | 1.05 | 37000 | 2.6 |
| EPDM K-1 | 24.8 | 3.7 | 5.0 | 11 | 3.0 | 0.1 | 0.15 | 0.6 | 1.8 | 6.0 | 56.3 | 40.0 | 3.6 | 0.1 | 3.28 | 206000 | 1.3 |
| EPDM K-C | 39.6 | 3.4 | 8.4 | 3 | 0.8 | 0.1 | 96 | 675 | — | 4.2 | 69.3 | 27.6 | 3 | 0.1 | 3.28 | 206000 | 2.4 |
| Liquid EPR-1 | 76.8 | 8.6 | 17.7 | 420 | — | — | 58 | 405 | — | 10.6 | 63.2 | 36.8 | — | — | 0.19 | 2600 | — |

TABLE 1-1-continued

| | Conditions | | | | | | | | | Polymer properties | | | | | | |
|---|---|---|---|---|---|---|---|---|---|---|---|---|---|---|---|---|
| | Hexane kg/h | C2 kg/h | C3 kg/h | H₂ NL/h | ENB kg/h | VNB kg/h | Main catalyst mmol/h | Co-catalyst mmol/h | TIBA mmol/h | Yield kg/h | C2 mol % | C3 mol % | ENB mol % | VNB mol % | [η] dl/g | Molecular weight Mn | Pmax/Pmin |
| Liquid EPR-2 | 52.0 | 12.0 | 7.7 | 1600 | — | — | 0.09 | 0.36 | 2.0 | 15.2 | 63.0 | 37.0 | — | — | 0.20 | 2500 | — |
| Liquid EPR-3 | 77.6 | 9.6 | 14.3 | 420 | — | — | 39 | 270 | — | 10.1 | 70.2 | 29.8 | — | — | 0.19 | 3200 | — |
| Liquid EPR-4 | 52.8 | 12.0 | 6.5 | 1300 | — | — | 0.06 | 0.24 | 2.0 | 14.5 | 70.0 | 30.0 | — | — | 0.20 | 3100 | — |

Example 1-1

100 Parts by weight of the ethylene/propylene/5-ethylidene-2-norbornene random copolymer (A-1) prepared as above and 10 parts by weight of a mineral oil softener (available from Idemitsu Kosan Co., Ltd., PW-380) which was a pre-addition softener were kneaded by a 4.3-liter Banbury mixer (manufactured by Kobe Steel, Ltd.) in a filling ratio of 70% for 5 minutes to obtain an ethylene/α-olefin/non-conjugated polyene copolymer composition (A'-1). Then, 110 parts by weight of the ethylene/α-olefin/non-conjugated polyene copolymer composition (A'-1), 10 parts by weight of pellets of polyethylene (PE-1) [density (JIS K 7112): 0.92 g/cm³, MFR (JIS K 7210, 190° C.): 1.3 g/10 min, Mn: 1.5×10⁴] and 10 parts by weight of pellets of polyethylene (PE-2) [density (JIS K 7112): 0.92 g/cm³, MFR (JIS K 7210, 190° C.): 2.0 g/10 min, Mn: 2.7×10⁴] were kneaded by a 4.3-liter Banbury mixer (manufactured by Kobe Steel, Ltd.) in a filling ratio of 70% for 5 minutes to obtain a blend (I-1). This blend (I-1) was subjected to analysis of gel-like substance.

130 Parts by weight of the resulting blend (I-1), 165 parts by weight of FEF carbon block (available from Asahi Carbon Co., Ltd., trade name: Asahi #60G), 82 parts by weight of a mineral oil softener (available from Idemitsu Kosan Co., Ltd., p-380) which was a post-addition softener, 1 part by weight of stearic acid and 5 parts by weight of three kinds of zinc oxides were kneaded by a 1.7-liter Banbury mixer (manufactured by Kobe Steel, Ltd., BB-4 type mixer).

In the above kneading process, the blend (I-1) was first masticated for 1 minute, then carbon black, the post-addition softener, stearic acid, three kinds of zinc oxides and pseudo gel-preventive MB were added, and they were kneaded for 2 minutes. Thereafter, the ram was raised and cleaned, and the resulting kneadate was further kneaded for 1 minute to obtain 1390 g of a rubber blend (I-1). This kneading was carried out in a filling ratio of 70%.

The rubber blend (I-1) having a thickness of 2.2 to 2.5 mm was molded in a mold by the use of a press molding machine under the conditions of 190° C. and 10 minutes to obtain a rubber blend (I-1) sheet of 2 mm (thickness)×10 cm (length)×10 cm (width).

The rubber blend (I-1) sheet was subjected to measurement of filler dispersibility index FDI.

367 Parts by weight of the resulting rubber blend (I-1) was weighed and wound around 14-inch rolls (manufactured by Nippon Roll MFG. Co., Ltd., surface temperature of front roll: 60° C., surface temperature of back roll: 60° C., rotational speed of front roll: 16 rpm, rotational speed of back roll: 18 rpm), then 0.8 part by weight of sulfur, 0.8 part by weight of 2-mercaptobenzothiazole (available from Sanshin Chemical Industry Co., Ltd., trade name: Sanceler M) as a vulcanization accelerator, 2 parts by weight of zinc dibutyldithiocarbamate (available from Sanshin Chemical Industry Co., Ltd., trade name: Sanceler BZ) as a vulcanization accelerator, 1 part by weight of dithiodimorpholine (available from Sanshin Chemical Industry Co., Ltd., trade name: Sanfel R) as a vulcanization accelerator, 7.5 parts by weight of calcium oxide (available from Inoue Calcium Corporation, trade name: Vesta C80E), 1 part by weight of tetramethylthiuram disulfide (available from Sanshin Chemical Industry Co., Ltd., trade name: Sanceler TT) as a vulcanization accelerator and 1 part by weight of N-cyclohexyl-2-benzothiazyl sulfenamide (available from Sanshin Chemical Industry Co., Ltd., trade name: Sanceler CM) as a vulcanization accelerator were added, and they were roll-milled by 14-inch open rolls (Nippon Roll MFG. Co., Ltd., roll temperature: 60° C.) for 7 minutes to obtain a rubber blend (II-1). The resulting roll was cut to give a sheet.

The resulting rubber blend (II-1) in the form of a sheet having a thickness of 2.2 to 2.5 mm was vulcanized in a mold by the use of a press molding machine under the conditions of 160° C. and 10 minutes to obtain a vulcanized molded product (III-1) of 2 mm (thickness)×15 cm (length)×15 cm (width). The resulting vulcanized molded product (III-1) was measured on specific gravity, tensile strength (TB), tensile elongation at break (EB), hardness, compression set (CS), shape memory ratio and shape recovery ratio. The results are set forth in Table 1-2.

Example 1-2

Under the compounding conditions shown in Table 1-2, the same operations and the same tests as in Example 1-1 were carried out.

However, the process for preparing the blend (I) was different from that of Example 1-1.

After the ethylene/propylene/5-ethylidene-2-norbornene random copolymer (A-1) was obtained as above, the copolymer (A-1) was mixed with 10 parts by weight of a mineral oil softener (available from Idemitsu Kosan Co., Ltd., PW-380) which was a pre-addition softener, and to the mixture, hexane was added in an amount of 7 parts by weight based on 100 parts by weight of the copolymer (A-1) to obtain a rubber composition (ethylene/α-olefin/non-conjugated polyene copolymer composition (A'-2)) containing hexane.

This rubber composition was introduced into a twin-screw three-stage vented extruder shown in FIG. 1 at a rate of 1.667 kg/hr, while to the extruder were fed pellets of polyethylene (PE-1) [density (JIS K 7112): 0.92 g/cm³, MFR (JIS K 7210, 190° C.): 1.3 g/10 min] at a rate of 0.167 kg/hr and polyethylene (PE-2) [density (JIS K 7112): 0.92 g/cm³, MFR (JIS K 7210, 190° C.): 2.0 g/10 min] at a rate of 0.167 kg/hr from the polyolefin resin feed zone of the extruder, and the ethylene/propylene/5-ethylidene-2-norbornene random copolymer and polyethylene were kneaded, followed by removing the solvent. The resulting rubber was cut into pellets at the tip of the extruder to obtain pellets of a blend (I-2) at a rate of 2.0 kg/hr.

The blending ratio by weight of polyethylene to the ethylene/propylene/5-ethylidene-2-norbornene random copolymer in the resulting blend (I-2) was 20/110.

Example 1-3

Under the compounding conditions shown in Table 1-2, the same operations and the same tests as in Example 1-1 were carried out.

In this example, however, a foamed product was obtained differently from Example 1-1.

367 Parts by weight of the same rubber blend (I-1) as in Example 1-1 were weighed and wound around 14-inch rolls (manufactured by Nippon Roll MFG. Co., Ltd., surface temperature of front roll: 60° C., surface temperature of back roll: 60° C., rotational speed of front roll: 16 rpm, rotational speed of back roll: 18 rpm), and 0.3 part by weight of a blowing agent (available from Eiwa Chemical Ind. Co., Ltd., OBSH, trade name: Neoselbon N#1000M) was added. After the blowing agent on the roll bank was absorbed by the rubber blend (I-1), 1.5 parts by weight of sulfur, 1.5 parts by weight of 2-mercaptobenzothiazole (available from Sanshin Chemical Industry Co., Ltd., trade name: Sanceler M) as a vulcanization accelerator, 2 parts by weight of zinc dibutyldithiocarbamate (available from Sanshin Chemical Industry Co., Ltd., trade name: Sanceler BZ) as a vulcanization accelerator, 0.5 part by weight of dithiodimorpholine (available from Sanshin Chemical Industry Co., Ltd., trade name: Sanfel R) as a vulcanization accelerator, 6 parts by weight of calcium oxide (available from Inoue Calcium Corporation, trade name: Vesta PP), 0.3 part by weight of tetramethylthiuram disulfide (available from Sanshin Chemical Industry Co., Ltd., trade name: Sanceler TT) as a vulcanization accelerator and 1 part by weight of 2-mercaptoimidazoline (available from Sanshin Chemical Industry Co., Ltd., trade name: Sanceler 22-C) as a vulcanization accelerator were added, and they were roll-milled by 14-inch open rolls (Nippon Roll MFG. Co., Ltd., roll temperature: 60° C.) for 7 minutes to obtain a rubber blend (II-3). The resulting roll was cut to give a ribbon.

The resulting rubber blend (II-3) in the form of a ribbon was extruded by an extruder having an extruder head temperature of 80° C. at a rate of 2.8 m/min using a type 1 die of 2 mm (length)×25 mm (width), and the extrudate was subjected to vulcanization and foaming by the use of a molding line having a microwave vulcanization bath (UHF bath) and a hot air vulcanization bath (HAV bath) which were connected in series, to obtain a vulcanized molded product (III-3). In this case, the temperature of the UHF bath was set at 180° C., and the power was controlled so that the surface temperature of the extruded material would become 190° C. at the exit of the UHF bath. As the HAV bath, a HAV vulcanization bath of 30 m was used, and the internal temperature of the bath was set at 230° C. The residence time in the vulcanization bath was 5 minutes.

Water absorption of the vulcanized molded product (III-3) was also measured.

Examples 1-4 to 1-6

Under the compounding conditions shown in Table 1-2 or 1-3, the same operations and the same tests as in Example 1-1 were carried out. The results are set forth in Table 1-2 or 1-3.

As PP described in Table 1-3, polypropylene (PP) [density (JIS K 7112): 0.91 g/cm$^3$, MFR (JIS K 7210, 230° C.): 30 g/10 min, Mn: 3.6×10$^4$] was used.

Example 1-7

Under the compounding conditions shown in Table 1-3, the same operations and the same tests as in Example 1-2 were carried out. The results are set forth in Table 1-3.

Example 1-8

Under the compounding conditions shown in Table 1-3, the same operations and the same tests as in Example 1-3 were carried out. The results are set forth in Table 1-3.

In this example, the blowing agent was used in the same amount as in Example 1-3.

However, a foamed product was obtained differently from Example 1-1.

Example 1-9

Under the compounding conditions shown in Table 1-3, the same operations and the same tests as in Example 1-1 were carried out. The results are set forth in Table 1-3.

Example 1-10

Under the compounding conditions shown in Table 1-3, the same operations and the same tests as in Example 1-1 were carried out. The results are set forth in Table 1-3.

Comparative Example 1-1

Under the compounding conditions shown in Table 1-2, the same operations and the same tests as in Example 1-1 were carried out. The results are set forth in Table 1-2.

Comparative Example 1-2

Under the compounding conditions shown in Table 1-2, the same operations and the same tests as in Example 1-2 were carried out. The results are set forth in Table 1-2.

Comparative Example 1-3

Under the compounding conditions shown in Table 1-2, the same operations and the same tests as in Example 1-3 were carried out. The results are set forth in Table 1-2.

In this example, the blowing agent was used in the same amount as in Example 1-3.

Comparative Example 1-4

Under the compounding conditions shown in Table 1-2, the same operations and the same tests as in Example 1-1 were carried out. The results are set forth in Table 1-2.

Comparative Example 1-5

Under the compounding conditions shown in Table 1-2, the same operations and the same tests as in Example 1-3 were carried out. The results are set forth in Table 1-2.

In this example, the blowing agent was used in the same amount as in Example 1-3.

Comparative Example 1-6

Under the compounding conditions shown in Table 1-3, the same operations and the same tests as in Example 1-1 were carried out. The results are set forth in Table 1-3.

Comparative Example 1-7

Under the compounding conditions shown in Table 1-3, the same operations and the same tests as in Example 1-2 were carried out. The results are set forth in Table 1-3.

Comparative Example 1-8

Under the compounding conditions shown in Table 1-3, the same operations and the same tests as in Example 1-3 were carried out. The results are set forth in Table 1-3.

In this example, the blowing agent was used in the same amount as in Example 1-3.

Comparative Example 1-9

Under the compounding conditions shown in Table 1-3, the same operations and the same tests as in Example 1-1 were carried out. The results are set forth in Table 1-3.

Comparative Example 1-10

Under the compounding conditions shown in Table 1-3, the same operations and the same tests as in Example 1-3 were carried out. The results are set forth in Table 1-3.

In this example, the blowing agent was used in the same amount as in Example 1-3.

Example 1-11

Sealing Material

Using an organic peroxide as a crosslinking agent instead of sulfur, using a crosslinking assistant instead of the vulcanization accelerator and under the compounding conditions shown in Table 1-4, a crosslinked product for sealing material was prepared in the same manner as in Example 1-1.

Example 1-12

Sealing Material

Using an organic peroxide as a crosslinking agent instead of sulfur, using a crosslinking assistant instead of the vulcanization accelerator and under the compounding conditions shown in Table 1-4, a crosslinked product for sealing material was prepared in the same manner as in Example 1-2.

Examples 1-13 and 1-14

Sealing Material

Using an organic peroxide as a crosslinking agent instead of sulfur, using a crosslinking assistant instead of the vulcanization accelerator and under the compounding conditions shown in Table 1-4, a crosslinked product for sealing material was prepared in the same manner as in Example 1-1.

Comparative Example 1-11

Using an organic peroxide as a crosslinking agent instead of sulfur, using a crosslinking assistant instead of the vulcanization accelerator and under the compounding conditions shown in Table 1-4, a crosslinked product for sealing material was prepared in the same manner as in Example 1-1.

Comparative Example 1-12

Using an organic peroxide as a crosslinking agent instead of sulfur, using a crosslinking assistant instead of the vulcanization accelerator and under the compounding conditions shown in Table 1-4, a crosslinked product for sealing material was prepared in the same manner as in Example 1-2.

Comparative Examples 1-13 and 1-14

Using an organic peroxide as a crosslinking agent instead of sulfur, using a crosslinking assistant instead of the vulcanization accelerator and under the compounding conditions shown in Table 1-4, a crosslinked product for sealing material was prepared in the same manner as in Example 1-1.

Example 1-15

Seal Article (Packing)

Using an organic peroxide as a crosslinking agent instead of sulfur, using a crosslinking assistant instead of the vulcanization accelerator and under the compounding conditions shown in Table 1-5, a crosslinked product for seal article was prepared in the same manner as in Example 1-1.

Example 1-16

Seal Article (Packing)

Using an organic peroxide as a crosslinking agent instead of sulfur, using a crosslinking assistant instead of the vulcanization accelerator and under the compounding conditions shown in Table 1-5, a crosslinked product for seal article was prepared in the same manner as in Example 1-2.

Examples 1-17 and 1-18

Seal Article (Packing)

Using an organic peroxide as a crosslinking agent instead of sulfur, using a crosslinking assistant instead of the vulcanization accelerator and under the compounding conditions shown in Table 1-5, a crosslinked product for seal article was prepared in the same manner as in Example 1-1.

Comparative Example 1-15

Seal Article (Packing)

Using an organic peroxide as a crosslinking agent instead of sulfur, using a crosslinking assistant instead of the vulcanization accelerator and under the compounding conditions shown in Table 1-5, a crosslinked product for seal article was prepared in the same manner as in Example 1-1.

Comparative Example 1-16

Seal Article (Packing)

Using an organic peroxide as a crosslinking agent instead of sulfur, using a crosslinking assistant instead of the vulcanization accelerator and under the compounding conditions shown in Table 1-5, a crosslinked product for seal article was prepared in the same manner as in Example 1-2.

Comparative Examples 1-17 and 1-18

Seal Article (Packing)

Using an organic peroxide as a crosslinking agent instead of sulfur, using a crosslinking assistant instead of the vulcanization accelerator and under the compounding conditions shown in Table 1-5, a crosslinked product for seal article was prepared in the same manner as in Example 1-1.

Example 1-19

Sheet

Under the compounding conditions shown in Table 1-6, a crosslinked product for sheet was prepared in the same manner as in Example 1-1.

Example 1-20

Sheet

Under the compounding conditions shown in Table 1-6, a crosslinked product for sheet was prepared in the same manner as in Example 1-1.

Examples 1-21 and 1-22

Sheet

Under the compounding conditions shown in Table 1-6, a crosslinked product for sheet was prepared in the same manner as in Example 1-1.

Comparative Example 1-19

Sheet

Under the compounding conditions shown in Table 1-6, a crosslinked product for sheet was prepared in the same manner as in Example 1-1.

Comparative Example 1-20

Sheet

Under the compounding conditions shown in Table 1-6, a crosslinked product for sheet was prepared in the same manner as in Example 1-1.

Comparative Examples 1-21 and 1-22

Sheet

Under the compounding conditions shown in Table 1-6, a crosslinked product for sheet was prepared in the same manner as in Example 1-1.

Example 1-23

Brake Boot

Using Kayacumyl D-40 as a crosslinking agent instead of sulfur, using a crosslinking assistant instead of the vulcanization accelerator and under the compounding conditions shown in Table 1-7, a crosslinked product for brake boot was prepared in the same manner as in Example 1-1.

Example 1-24

Brake Boot

Using Kayacumyl D-40 as a crosslinking agent instead of sulfur, using a crosslinking assistant instead of the vulcanization accelerator and under the compounding conditions shown in Table 1-7, a crosslinked product for brake boot was prepared in the same manner as in Example 1-2.

Examples 1-25 and 1-26

Brake Boot

Using Kayacumyl D-40 as a crosslinking agent instead of sulfur, using a crosslinking assistant instead of the vulcanization accelerator and under the compounding conditions shown in Table 1-7, a crosslinked product for brake boot was prepared in the same manner as in Example 1-1.

Comparative Example 1-23

Brake Boot

Using Kayacumyl D-40 as a crosslinking agent instead of sulfur, using a crosslinking assistant instead of the vulcanization accelerator and under the compounding conditions shown in Table 1-7, a crosslinked product for brake boot was prepared in the same manner as in Example 1-1.

Comparative Example 1-24

Brake Boot

Using Kayacumyl D-40 as a crosslinking agent instead of sulfur, using a crosslinking assistant instead of the vulcanization accelerator and under the compounding conditions shown in Table 1-7, a crosslinked product for brake boot was prepared in the same manner as in Example 1-2.

Comparative Examples 1-25 and 26

Brake Boot

Using Kayacumyl D-40 as a crosslinking agent instead of sulfur, using a crosslinking assistant instead of the vulcanization accelerator and under the compounding conditions shown in Table 1-7, a crosslinked product for brake boot was prepared in the same manner as in Example 1-1.

Example 1-27

Lightweight Grommet

Under the compounding conditions shown in Table 1-8, a crosslinked product for lightweight grommet was prepared in the same manner as in Example 1-1.

Example 1-28

Lightweight Grommet

Under the compounding conditions shown in Table 1-8, a crosslinked product for lightweight grommet was prepared in the same manner as in Example 1-2.

Examples 1-29 and 1-30

Lightweight Grommet

Under the compounding conditions shown in Table 1-8, a crosslinked product for lightweight grommet was prepared in the same manner as in Example 1-1.

Comparative Example 1-27

Lightweight Grommet

Under the compounding conditions shown in Table 1-8, a crosslinked product for lightweight grommet was prepared in the same manner as in Example 1-1.

Comparative Example 1-28

Lightweight Grommet

Under the compounding conditions shown in Table 1-8, a crosslinked product for lightweight grommet was prepared in the same manner as in Example 1-2.

Comparative Examples 1-29 and 1-30

Lightweight Grommet

Under the compounding conditions shown in Table 1-8, a crosslinked product for lightweight grommet was prepared in the same manner as in Example 1-1.

Example 1-31

Corner Joint

Under the compounding conditions shown in Table 1-9, a crosslinked product for corner joint was prepared in the same manner as in Example 1-1.

Example 1-32

Corner Joint

Under the compounding conditions shown in Table 1-9, a crosslinked product for corner joint was prepared in the same manner as in Example 1-2.

Examples 1-33 and 1-34

Corner Joint

Under the compounding conditions shown in Table 1-9, a crosslinked product for corner joint was prepared in the same manner as in Example 1-1.

Comparative Example 1-31

Corner Joint

Under the compounding conditions shown in Table 1-9, a crosslinked product for corner joint was prepared in the same manner as in Example 1-1.

Comparative Example 1-32

Corner Joint

Under the compounding conditions shown in Table 1-9, a crosslinked product for corner joint was prepared in the same manner as in Example 1-2.

Comparative Examples 1-33 and 1-34

Corner Joint

Under the compounding conditions shown in Table 1-9, a crosslinked product for corner joint was prepared in the same manner as in Example 1-1.

Example 1-35

Tire Sidewall

Under the compounding conditions shown in Table 1-10, a crosslinked product for tire sidewall was prepared in the same manner as in Example 1-1.

Example 1-36

Tire Sidewall

Under the compounding conditions shown in Table 1-10, a crosslinked product for tire sidewall was prepared in the same manner as in Example 1-2.

Examples 1-37 and 1-38

Tire Sidewall

Under the compounding conditions shown in Table 1-10, a crosslinked product for tire sidewall was prepared in the same manner as in Example 1-1.

Comparative Example 1-35

Under the compounding conditions shown in Table 1-10, a crosslinked product for tire sidewall was prepared in the same manner as in Example 1-1.

Comparative Example 1-36

Under the compounding conditions shown in Table 1-10, a crosslinked product for tire sidewall was prepared in the same manner as in Example 1-2.

Comparative Examples 1-37 and 1-38

Under the compounding conditions shown in Table 1-10, a crosslinked product for tire sidewall was prepared in the same manner as in Example 1-1.

Example 1-39

Tire Tube

Under the compounding conditions shown in Table 1-11, a crosslinked product for tire tube was prepared in the same manner as in Example 1-1.

Example 1-40

Tire Tube

Under the compounding conditions shown in Table 1-11, a crosslinked product for tire tube was prepared in the same manner as in Example 1-2.

Examples 1-41 and 1-42

Tire Tube

Under the compounding conditions shown in Table 1-11, a crosslinked product for tire tube was prepared in the same manner as in Example 1-1.

Comparative Example 1-39

Under the compounding conditions shown in Table 1-11, a crosslinked product for tire tube was prepared in the same manner as in Example 1-1.

Comparative Example 1-40

Under the compounding conditions shown in Table 1-11, a crosslinked product for tire tube was prepared in the same manner as in Example 1-2.

Comparative Examples 1-41 and 1-42

Under the compounding conditions shown in Table 1-11, a crosslinked product for tire tube was prepared in the same manner as in Example 1-1.

Example 1-43

Rubber Belt

Under the compounding conditions shown in Table 1-12, a crosslinked product for rubber belt was prepared in the same manner as in Example 1-1.

Example 1-44

Rubber Belt

Under the compounding conditions shown in Table 1-12, a crosslinked product for rubber belt was prepared in the same manner as in Example 1-2.

Examples 1-45 and 1-46

Rubber Belt

Under the compounding conditions shown in Table 1-12, a crosslinked product for rubber belt was prepared in the same manner as in Example 1-1.

Comparative Example 1-43

Under the compounding conditions shown in Table 1-12, a crosslinked product for rubber belt was prepared in the same manner as in Example 1-1.

Comparative Example 1-44

Under the compounding conditions shown in Table 1-12, a crosslinked product for rubber belt was prepared in the same manner as in Example 1-2.

Comparative Examples 1-45 and 1-46

Under the compounding conditions shown in Table 1-12, a crosslinked product for rubber belt was prepared in the same manner as in Example 1-1.

Example 1-47

Rubber Roll

Under the compounding conditions shown in Table 1-13, a crosslinked product for rubber roll was prepared in the same manner as in Example 1-1.

Example 1-48

Rubber Roll

Under the compounding conditions shown in Table 1-13, a crosslinked product for rubber roll was prepared in the same manner as in Example 1-2.

Examples 1-49 and 1-50

Rubber Roll

Under the compounding conditions shown in Table 1-13, a crosslinked product for rubber roll was prepared in the same manner as in Example 1-1.

Comparative Example 1-47

Under the compounding conditions shown in Table 1-13, a crosslinked product for rubber roll was prepared in the same manner as in Example 1-1.

Comparative Example 1-48

Under the compounding conditions shown in Table 1-13, a crosslinked product for rubber roll was prepared in the same manner as in Example 1-2.

Comparative Examples 1-49 and 1-50

Under the compounding conditions shown in Table 1-13, a crosslinked product for rubber roll was prepared in the same manner as in Example 1-1.

Example 1-51

Rubber Vibration Insulator

Under the compounding conditions shown in Table 1-14, a crosslinked product for rubber vibration insulator was prepared in the same manner as in Example 1-1.

Example 1-52 (rubber vibration insulator)

Under the compounding conditions shown in Table 1-14, a crosslinked product for rubber vibration insulator was prepared in the same manner as in Example 1-2.

Examples 1-53 and 1-54

Rubber Vibration Insulator

Under the compounding conditions shown in Table 1-14, a crosslinked product for rubber vibration insulator was prepared in the same manner as in Example 1-1.

Comparative Example 1-51

Under the compounding conditions shown in Table 1-14, a crosslinked product for rubber vibration insulator was prepared in the same manner as in Example 1-1.

Comparative Example 1-52

Under the compounding conditions shown in Table 1-14, a crosslinked product for rubber vibration insulator was prepared in the same manner as in Example 1-2.

Comparative Examples 1-53 and 1-54

Under the compounding conditions shown in Table 1-14, a crosslinked product for rubber vibration insulator was prepared in the same manner as in Example 1-1.

Example 1-55

(Covered) Electric Wire

Under the compounding conditions shown in Table 1-15, a crosslinked product for electric wire was prepared in the same manner as in Example 1-1.

Example 1-56

(Covered) Electric Wire

Under the compounding conditions shown in Table 1-15, a crosslinked product for electric wire was prepared in the same manner as in Example 1-2.

Examples 1-57 and 1-58

(Covered) Electric Wire

Under the compounding conditions shown in Table 1-15, a crosslinked product for electric wire was prepared in the same manner as in Example 1-1.

Comparative Example 1-55

Under the compounding conditions shown in Table 1-15, a crosslinked product for electric wire was prepared in the same manner as in Example 1-1.

Comparative Example 1-56

Under the compounding conditions shown in Table 1-15, a crosslinked product for electric wire was prepared in the same manner as in Example 1-2.

Comparative Examples 1-57 and 1-58

Under the compounding conditions shown in Table 1-15, a crosslinked product for electric wire was prepared in the same manner as in Example 1-1.

Example 1-59

Glass Run Channel

Under the compounding conditions shown in Table 1-16, a crosslinked product for glass run channel was prepared in the same manner as in Example 1-1.

Example 1-60 (glass run channel)

Under the compounding conditions shown in Table 1-16, a crosslinked product for glass run channel was prepared in the same manner as in Example 1-2.

Examples 1-61 and 1-62 (glass run channel)

Under the compounding conditions shown in Table 1-16, a crosslinked product for glass run channel was prepared in the same manner as in Example 1-1.

Comparative Example 1-59

Under the compounding conditions shown in Table 1-16, a crosslinked product for glass run channel was prepared in the same manner as in Example 1-1.

Comparative Example 1-60

Under the compounding conditions shown in Table 1-16, a crosslinked product for glass run channel was prepared in the same manner as in Example 1-2.

Comparative Examples 1-61 and 1-62

Under the compounding conditions shown in Table 1-16, a crosslinked product for glass run channel was prepared in the same manner as in Example 1-1.

Example 1-63

Weatherstrip Sponge

100 Parts by weight of EPDM (K-1) and 20 parts by weight of a mineral oil softener (available from Idemitsu Kosan Co., Ltd., PW-380) which was a pre-addition softener were kneaded by a 4.3-liter Banbury mixer (manufactured by Kobe Steel, Ltd.) in a filling ratio of 70% for 5 minutes to obtain an ethylene/α-olefin/non-conjugated polyene copolymer composition (K'-1). Then, 120 parts by weight of the ethylene/α-olefin/non-conjugated polyene copolymer composition (K'-1) and 5 parts by weight of pellets of polyethylene (PE-1) [density (JIS K 7112): 0.92 g/cm$^3$, MFR (JIS K 7210, 190° C.): 1.3 g/10 min, Mn: 1.5×10$^4$] were kneaded by a 4.3-liter Banbury mixer (manufactured by Kobe Steel, Ltd.) in a filling ratio of 70% for 5 minutes to obtain a blend (I-1).

120 Parts by weight of this oil-extended rubber were kneaded with 50 parts by weight of "Diana Process Oil PW-380" (trade name, available from Idemitsu Kosan Co., Ltd.), 85 parts by weight of carbon black "Asahi #50HG" (trade name, available from Asahi Carbon Co., Ltd.) as a reinforcing agent, 5 parts by weight of zinc oxide as a vulcanization accelerator, 1 part by weight of stearic acid as a processing aid, 1 part by weight of PEG #4000 as an activator and 4 parts by weight of Vesta 200 as a defoamer by a BB4 type Banbury mixer (manufactured by Kobe Steel, Ltd.) for 3 to 5 minutes. After cooling, the kneadate was wound around 14-inch open rolls (manufactured by Nippon Roll MFG. Co., Ltd.), and 1.5 parts by weight of sulfur as a vulcanizing agent, 1.0 part by weight of 2-mercaptobenzothiazole, 1.0 part by weight of N-cyclohexyl-2-benzothiazyl sulfenamide, 1.0 part by weight of diethylthiourea and 0.5 part by weight of tetrakis (2-ethylhexyl)thiuram disulfide as vulcanization accelerators, and 4 parts by weight of p,p'-oxybis(benzenesulfonylhydazide) as a blowing agent were dispersed to obtain a compounded rubber. The compounded rubber was subjected to vulcanization and foaming by the use of a molding line having a microwave vulcanization bath (UHF bath) and a hot air vulcanization bath (HAV bath) which were connected in series or a molding line in which a microwave vulcanization bath (UHF bath) was not combined. In this case, the extruder head temperature was set at 80° C., the temperature of the UHF bath was set at 200° C., and the power was controlled so that the temperature of the exit of the UHF bath would become 180° C. As the HAV bath, a HAV vulcanization bath of 30 m was used, and the internal temperature of the bath was set at 250° C. Property values of the thus obtained crosslinked product for weatherstrip sponge are set forth in Table 1-17.

Example 1-64

Under the compounding conditions shown in Table 1-17, a crosslinked product for weatherstrip sponge was prepared in the same manner as in Example 1-63, except that a solvent (hexane) was used in the alloying stage.

Examples 1-65 and 1-66

Under the compounding conditions shown in Table 1-17, a crosslinked product for weatherstrip sponge was prepared in the same manner as in Example 1-63.

Comparative Example 1-63

Under the compounding conditions shown in Table 1-17, a crosslinked product for weatherstrip sponge was prepared in the same manner as in Example 1-63.

Comparative Example 1-64

Under the compounding conditions shown in Table 1-17, a crosslinked product for weatherstrip sponge was prepared in the same manner as in Example 1-63, except that a solvent (hexane) was used in the alloying stage.

Comparative Examples 1-65 and 1-66

Under the compounding conditions shown in Table 1-17, a crosslinked product for weatherstrip sponge was prepared in the same manner as in Example 1-63.

TABLE 1-2

| | | Ex. 1-1 | Ex. 1-2 | Ex. 1-3 | Ex. 1-4 | Ex. 1-5 | Comp. Ex. 1-1 | Comp. Ex. 1-2 | Comp. Ex. 1-3 | Comp. Ex. 1-4 | Comp. Ex. 1-5 |
|---|---|---|---|---|---|---|---|---|---|---|---|
| | EPDM* | A-1 | A-1 | A-1 | A-1 | A-1 | A-C1 | A-C1 | A-C1 | A-C2 | A-C2 |
| | | 100 | 100 | 100 | 100 | 100 | 100 | 100 | 100 | 100 | 100 |
| Pre-addition softener | Mineral oil type softener* | 10 | 10 | 10 | | | 10 | 10 | 10 | 10 | 10 |
| | Liquid EPR-1* | | | | 10 | | | | | | |
| | Liquid EPR-2* | | | | | 10 | | | | | |
| Polyolefin resin | PE-1* | 10 | 10 | 10 | 10 | 10 | 10 | 10 | 10 | 10 | 10 |
| | PE-2* | 10 | 10 | 10 | 10 | 10 | 10 | 10 | 10 | 10 | 10 |
| | Solvent in alloying | absent | present | absent | absent | absent | absent | present | absent | absent | absent |
| Preparation of vulcanized rubber | FEF carbon black* | 165 | 165 | 165 | 165 | 165 | 165 | 165 | 165 | 165 | 165 |
| | Post-addition softener* | 82 mineral oil | 82 mineral oil | 82 mineral oil | 82 mineral oil | 82 mineral oil | 82 mineral oil | 82 mineral oil | 82 mineral oil | 82 mineral oil | 82 mineral oil |
| | Blowing agent | — | — | present | — | — | — | — | present | — | present |
| Properties of EPDM | Pmax/Pmin | 1.4 | 1.4 | 1.4 | 1.4 | 1.4 | 2.6 | 2.6 | 2.6 | 1.9 | 1.9 |
| Properties of unvulcanized rubber | Filler dispersibility index | 85 | 87 | 85 | 90 | 92 | 75 | 75 | 75 | 80 | 80 |
| | Evaluation of gel-like substance | BB | BB | BB | AA | AA | DD | DD | DD | CC | CC |
| Properties of vulcanized rubber | Specific gravity | 1.19 | 1.19 | 1.01 | 1.19 | 1.2 | 1.19 | 1.19 | 1.01 | 1.19 | 1.01 |
| | Hardness | 83 | 83 | 71 | 85 | 87 | 76 | 78 | 63 | 79 | 68 |
| | TB (MPa) | 11.2 | 11.7 | 7.53 | 12.1 | 13.5 | 9.5 | 10.1 | 6.9 | 10.5 | 7.2 |
| | EB (%) | 410 | 420 | 340 | 420 | 440 | 330 | 340 | 280 | 380 | 320 |
| | CS (70° C. × 22 h) (%) | 38 | 35 | 23 | 32 | 30 | 45 | 43 | 30 | 42 | 27 |
| | Shape memory ratio (%) | 88 | 89 | 82 | 89 | 91 | 80 | 81 | 73 | 82 | 78 |
| | Shape recovery ratio (%) | 96 | 96 | 88 | 97 | 97 | 92 | 92 | 82 | 94 | 85 |
| | Water absorption (%) | — | — | 23 | — | — | — | — | 18 | — | 20 |

*The unit of each value is "part(s) by weight".

TABLE 1-3

|  |  | Ex. 1-6 | Ex. 1-7 | Ex. 1-8 | Ex. 1-9 | Ex. 1-10 | Comp. Ex. 1-6 | Comp. Ex. 1-7 | Comp. Ex. 1-8 | Comp. Ex. 1-9 | Comp. Ex. 1-10 |
|---|---|---|---|---|---|---|---|---|---|---|---|
|  | EPDM* | A-1 100 | A-1 100 | A-1 100 | A-1 100 | A-1 100 | A-C1 100 | A-C1 100 | A-C1 100 | A-C2 100 | A-C2 100 |
| Pre-addition softener | Mineral oil type softener* | 10 | 10 | 10 |  |  | 10 | 10 | 10 | 10 | 1.0 |
|  | Liquid EPR* |  |  |  | 10 |  |  |  |  |  |  |
|  | Metallocene liquid EPR* |  |  |  |  | 10 |  |  |  |  |  |
| Polyolefin resin | PP* | 20 | 20 | 20 | 20 | 20 | 20 | 20 | 20 | 20 | 20 |
|  | Solvent in alloying | absent | present | absent | absent | absent | absent | present | absent | absent | absent |
| Preparation of vulcanized rubber | FEF carbon black* | 165 | 165 | 165 | 165 | 165 | 165 | 165 | 165 | 165 | 165 |
|  | Post-addition softener* | 82 mineral oil | 82 mineral oil | 82 mineral oil | 82 mineral oil | 82 mineral oil | 82 mineral oil | 82 mineral oil | 82 mineral oil | 82 mineral oil | 82 mineral oil |
|  | Blowing agent | — | — | present | — | — | — | — | present | — | present |
| Properties of EPDM | Pmax/Pmin | 1.4 | 1.4 | 1.4 | 1.4 | 1.4 | 2.6 | 2.6 | 2.6 | 1.9 | 1.9 |
| Properties of rubber composition | Mean particle diameter of PP | 1.5 | 1.2 | 1.5 | 1.3 | 1 | 2.5 | 2.2 | 2.5 | 2 | 2 |
| Properties of unvulcanized rubber | Filler dispersibility index | 83 | 84 | 83 | 88 | 90 | 73 | 73 | 73 | 78 | 78 |
|  | Evaluation of gel-like substance | BB | BB | BB | AA | AA | DD | DD | DD | CC | CC |
| Properties of vulcanized rubber | Specific gravity | 1.21 | 1.21 | 1.03 | 1.21 | 1.22 | 1.21 | 1.21 | 1.03 | 1.21 | 1.03 |
|  | Hardness | 85 | 86 | 73 | 86 | 88 | 78 | 78 | 65 | 81 | 70 |
|  | TB (MPa) | 10.6 | 11 | 6.9 | 11.6 | 12.9 | 9.1 | 9.5 | 6.4 | 10.1 | 6.4 |
|  | EB (%) | 390 | 396 | 330 | 400 | 410 | 320 | 320 | 270 | 360 | 310 |
|  | CS (70° C. × 22 h) (%) | 35 | 33 | 22 | 31 | 29 | 40 | 38 | 26 | 37 | 23 |
|  | Shape memory ratio (%) | 89 | 90 | 83 | 90 | 92 | 81 | 83 | 76 | 82 | 80 |
|  | Shape recovery ratio (%) | 97 | 97 | 89 | 98 | 98 | 93 | 94 | 83 | 96 | 86 |
|  | Water absorption (%) | — | — | 25 | — | — | — | — | 21 | — | 22 |

*The unit of each value is "part(s) by weight".

TABLE 1-4

|  |  | Ex. 1-11 | Ex. 1-12 | Ex. 1-13 | Ex. 1-14 | Comp. Ex. 1-11 | Comp. Ex. 1-12 | Comp. Ex. 1-13 | Comp. Ex. 1-14 |
|---|---|---|---|---|---|---|---|---|---|
|  | EPDM 1 | C-1 | C-1 | C-1 | C-1 | C-C | C-C | C-C | C-C |
|  | EPDM 2 | D-1 | D-1 | D-1 | D-1 | D-C | D-C | D-C | D-C |
|  | EPDM 1* | 50 | 50 | 50 | 50 | 50 | 50 | 50 | 50 |
|  | EPDM 2* | 50 | 50 | 50 | 50 | 50 | 50 | 50 | 50 |
| Pre-addition softener | Mineral oil type softener* | 10 | 10 |  |  | 10 | 10 |  |  |
|  | Liquid EPR-1* |  | 5 |  |  |  | 5 |  |  |
|  | Liquid EPR-2* |  |  | 5 |  |  |  | 5 |  |
|  | Liquid EPR-3* |  | 5 |  |  |  | 5 |  |  |
|  | Liquid EPR-4* |  |  | 5 |  |  |  | 5 |  |
| Polyolefin resin | PE-1* | 10 | 10 | 10 | 10 | 10 | 10 | 10 | 10 |
|  | PE-2* |  |  |  |  |  |  |  |  |
|  | Solvent in alloying | absent | present | absent | absent | absent | present | absent | absent |
| Preparation of crosslinked rubber | Mold release agent (Mold With IMRI) | 5 | ← | ← | ← | ← | ← | ← | ← |
|  | Clay (Iceberg Clay) | 60 | ← | ← | ← | ← | ← | ← | ← |
|  | SRF carbon black (Shiest S)* | 30 | ← | ← | ← | ← | ← | ← | ← |
|  | Post-addition softener* | 17 mineral oil (PW-380) | ← | ← | ← | ← | ← | ← | ← |
|  | Amine type anti-aging agent (Noclac CD) | 1 | — | — | — | — | — | — | — |
|  | Organic peroxide | 7 | ← | ← | ← | ← | ← | ← | ← |
|  | Crosslinking assistant | 2 | ← | ← | ← | ← | ← | ← | ← |
| Properties of crosslinked rubber | Hardness | 58 | 58 | 58 | 58 | 58 | 58 | 58 | 58 |
|  | Modulus at 200% (MPa) | 3.4 | 3.4 | 3.5 | 3.5 | 3.1 | 3.2 | 3.3 | 3.3 |
|  | Modulus at 300% (MPa) | 4.8 | 4.9 | 4.9 | 5 | 4.6 | 4.6 | 4.7 | 4.7 |
|  | TB (MPa) | 13.1 | 13.2 | 13.3 | 13.5 | 12.8 | 12.9 | 13 | 13 |
|  | EB (%) | 680 | 680 | 700 | 700 | 650 | 660 | 660 | 670 |
|  | CS (100° C. × 22 h) (%) | 14 | 13 | 13 | 11 | 16 | 16 | 15 | 15 |
|  | Heat aging resistance (160° C., 72 hours) |  |  |  |  |  |  |  |  |
|  | Retention of tensile strength after aging (%) | 76 | 78 | 78 | 80 | 72 | 74 | 74 | 75 |
|  | Retention of tensile elongation after aging (%) | 58 | 59 | 61 | 62 | 54 | 55 | 55 | 57 |

TABLE 1-4-continued

|  |  | Ex. 1-11 | Ex. 1-12 | Ex. 1-13 | Ex. 1-14 | Comp. Ex. 1-11 | Comp. Ex. 1-12 | Comp. Ex. 1-13 | Comp. Ex. 1-14 |
|---|---|---|---|---|---|---|---|---|---|
|  | Change of hardness (JIS K 6257) | +1 | +1 | +1 | +1 | +2 | +2 | +2 | +1 |
|  | Fogging resistance (160° C., 24 hours) |  |  |  |  |  |  |  |  |
|  | Haze value (%) (after allowed to cool for 1 hr) | 10 | 10 | 9 | 9 | 11 | 11 | 10 | 10 |

Organic peroxide: Kayahexa AD-40 (trademark), available from Nippon oil & Fats Co., Ltd.
Crosslinking assistant: Acryester ED (trademark), available from Seiko Chemical Co., Ltd.
←: The arrow means the same numerical value as that described on the left side.
In Table 1-4, the unit of each value is "part(s) by weight".

TABLE 1-5

|  |  | Ex. 1-15 | Ex. 1-16 | Ex. 1-17 | Ex. 1-18 | Comp. Ex. 1-15 | Comp. Ex. 1-16 | Comp. Ex. 1-17 | Comp. Ex. 1-18 |
|---|---|---|---|---|---|---|---|---|---|
|  | EPDM* | B-1 100 | B-1 100 | B-1 100 | B-1 100 | B-C 100 | B-C 100 | B-C 100 | B-C 100 |
| Pre-addition softener | Mineral oil type softener* | 10 | 10 |  |  | 10 | 10 |  |  |
|  | Liquid EPR-1* |  |  | 10 |  |  |  | 10 |  |
|  | Liquid EPR-2* |  |  |  | 10 |  |  |  | 10 |
| Polyolefin resin | PE-1* | 10 | 10 | 10 | 10 | 10 | 10 | 10 | 10 |
|  | PE-2* |  |  |  |  |  |  |  |  |
|  | Solvent in alloying | absent | present | absent | absent | absent | present | absent | absent |
| Preparation of crosslinked rubber | Zinc white | 5 | ← | ← | ← | ← | ← | ← | ← |
|  | Stearic acid | 1 | ← | ← | ← | ← | ← | ← | ← |
|  | FEF carbon black* | 90 | ← | ← | ← | ← | ← | ← | ← |
|  | Post-addition softener* | 40 mineral | ← ← | ← ← | ← ← | ← ← | ← ← | ← ← | ← ← |
|  | Blowing agent | — | — | — | — | — | — | — | — |
|  | Organic peroxide | 8 | ← | ← | ← | ← | ← | ← | ← |
|  | Crosslinking assistant | 3 | ← | ← | ← | ← | ← | ← | ← |
| Properties of crosslinked rubber | Hardness | 79 | 79 | 79 | 79 | 79 | 79 | 79 | 79 |
|  | TB (MPa) | 113 | 115 | 119 | 121 | 108 | 110 | 112 | 114 |
|  | EB (%) | 290 | 300 | 300 | 310 | 280 | 280 | 290 | 290 |
|  | CS (60° C. × 22 h) (%) | 8 | 7 | 6 | 6 | 10 | 10 | 9 | 9 |
|  | CS (160° C. × 22 h) (%) | 15 | 14 | 14 | 12 | 17 | 16 | 16 | 16 |

Organic peroxide: Perhexa 25B-40 (trademark), available from Nippon Oil & Fats Co., Ltd.
Crosslinking assistant: Hicross M (trademark), available from Seiko Chemical Co., Ltd.
←: The arrow means the same numerical value as that described on the left side.
In Table 1-5, the unit of each value is "part(s) by weight".

TABLE 1-6

|  |  | Ex. 1-19 | Ex. 1-20 | Ex. 1-21 | Ex. 1-22 | Comp. Ex. 1-19 | Comp. Ex. 1-20 | Comp. Ex. 1-21 | Comp. Ex. 1-22 |
|---|---|---|---|---|---|---|---|---|---|
|  | EPDM | E-1 | E-1 | E-1 | E-1 | E-C | E-C | E-C | E-C |
|  | EPDM* | 100 | 100 | 100 | 100 | 100 | 100 | 100 | 100 |
| Pre-addition softener | Mineral oil type softener* | 10 | 10 |  |  | 10 | 10 |  |  |
|  | Liquid EPR-3* |  |  | 10 |  |  |  | 10 |  |
|  | Liquid EPR-4* |  |  |  | 10 |  |  |  | 10 |
| Polyolefin resin | PE-1* | 10 | 10 | 10 | 10 | 10 | 10 | 10 | 10 |
|  | PE-2* |  |  |  |  |  |  |  |  |
|  | Solvent in alloying | absent | present | absent | absent | absent | present | absent | absent |
| Preparation of vulcanized rubber | Three kinds of zinc oxides | 5 | ← | ← | ← | ← | ← | ← | ← |
|  | Stearic acid | 1 | ← | ← | ← | ← | ← | ← | ← |
|  | MAF carbon black (Shiest 116)* | 70 | ← | ← | ← | ← | ← | ← | ← |
|  | Surface-treated calcium carbonate (Novelite TT) | 60 | ← | ← | ← | ← | ← | ← | ← |
|  | Post-addition softener* | 50 naphthenic oil (Sunsen 4240) | ← ← | ← ← | ← ← | ← ← | ← ← | ← ← | ← ← |

TABLE 1-6-continued

| | | Ex. 1-19 | Ex. 1-20 | Ex. 1-21 | Ex. 1-22 | Comp. Ex. 1-19 | Comp. Ex. 1-20 | Comp. Ex. 1-21 | Comp. Ex. 1-22 |
|---|---|---|---|---|---|---|---|---|---|
| | Vulcanization accelerator MBT | 0.5 | ← | ← | ← | ← | ← | ← | ← |
| | Vulcanization accelerator TMTD | 1 | ← | ← | ← | ← | ← | ← | ← |
| | Sulfur | 1.5 | | | | | | | |
| Properties of unvulcanized rubber | Mooney viscosity ML(1 + 4)100° C. (JIS K 6300) | 41 | 41 | 41 | 42 | 42 | 41 | 41 | 41 |
| | Scorch time t5 (121° C.) (min) (JIS K 6300) | 39 | 40 | 38 | 39 | 39 | 40 | 38 | 39 |
| | Vulcanization index ?t (121° C.) (min) (JIS K 6300) | 7.6 | 7.5 | 7.4 | 7.6 | 7.6 | 7.4 | 7.5 | 7.4 |
| | ODR tc(90) (170° C.) (min) (JIS K 6300) | 7.4 | 7.6 | 7.4 | 7.5 | 7.5 | 7.5 | 7.6 | 7.6 |
| Properties of vulcanized rubber | Hardness | 63 | 63 | 63 | 63 | 63 | 63 | 63 | 63 |
| | Modulus at 300% (MPa) | 7.8 | 7.9 | 8 | 8.2 | 7.4 | 7.5 | 7.5 | 7.7 |
| | TB (MPa) | 14.3 | 14.4 | 14.5 | 14.6 | 13.9 | 14 | 14 | 14.2 |
| | EB (%) | 590 | 590 | 610 | 620 | 510 | 530 | 560 | 580 |
| | Tensile strength (N/mm) (JIS K 6252) | 34 | 35 | 35 | 36 | 30 | 31 | 32 | 32 |
| | Elongation set (%) (JIS K 6262) | 6 | 6 | 5 | 5 | 8 | 8 | 7 | 7 |
| | Heat aging resistance (80° C., 168 hours) | | | | | | | | |
| | Retention of modulus at 300% (%) (JIS K 6257) | 120 | 118 | 118 | 115 | 129 | 127 | 127 | 125 |
| | Retention of tensile strength after aging (%) | 104 | 103 | 103 | 102 | 106 | 106 | 106 | 105 |
| | Retention of tensile elongation after aging (%) | 93 | 94 | 94 | 95 | 89 | 90 | 92 | 92 |

←: The arrow means the same numerical value as that described on the left side.
In Table 1-6, the unit of each value is "part(s) by weight".

TABLE 1-7

| | | Ex. 1-23 | Ex. 1-24 | Ex. 1-25 | Ex. 1-26 | Comp. Ex. 1-23 | Comp. Ex. 1-24 | Comp. Ex. 1-25 | Comp. Ex. 1-26 |
|---|---|---|---|---|---|---|---|---|---|
| | EPDM 1 | C-1 | C-1 | C-1 | C-1 | C-C | C-C | C-C | C-C |
| | EPDM 2 | G-1 | G-1 | G-1 | G-1 | G-C | G-C | G-C | G-C |
| | EPDM 1* | 50 | 50 | 50 | 50 | 50 | 50 | 50 | 50 |
| | EPDM 2* | 50 | 50 | 50 | 50 | 50 | 50 | 50 | 50 |
| Pre-addition softener | Mineral oil type softener* | 10 | 10 | | | 10 | 10 | | |
| | Liquid EPR-1* | | | 10 | | | | 10 | |
| | Liquid EPR-2* | | | | 10 | | | | 10 |
| Polyolefin resin | PE-1* | 10 | 10 | 10 | 10 | 10 | 10 | 10 | 10 |
| | PE-2* | | | | | | | | |
| | Solvent in alloying | absent | present | absent | absent | absent | present | absent | absent |
| Preparation of crosslinked rubber | Three kinds of zinc oxides | 5 | | | | | | | |
| | Stearic acid | 1 | ← | ← | ← | ← | ← | ← | ← |
| | Clay (Samson Clay) | 80 | ← | ← | ← | ← | ← | ← | ← |
| | FEF carbon black (Asahi #35) | 0 | ← | ← | ← | ← | ← | ← | ← |
| | Post-addition softener* | 20 paraffinic oil (PW-380) | ← | ← | ← | ← | ← | ← | ← |
| | Activator (Acting SL) | 1 | ← | ← | ← | ← | ← | ← | ← |
| | Anti-aging agent (Noclac MB) | 1 | ← | ← | ← | ← | ← | ← | ← |
| | Anti-aging agent (Noclac 224) | 0.5 | ← | ← | ← | ← | ← | ← | ← |
| | Crosslinking agent (organic peroxide, Kayacumyl D-40) | 7.5 | ← | ← | ← | ← | ← | ← | ← |
| | Crosslinking assistant (Hicross M) | 2.5 | ← | ← | ← | ← | ← | ← | ← |
| Properties of uncrosslinked rubber | ODR tc(90) (180° C.) (min) (JIS K 6300) | 5.2 | 5.1 | 5.1 | 5.1 | 5.2 | 5.1 | 5.2 | 5.1 |
| Properties of | Hardness | 52 | 51 | 51 | 51 | 51 | 52 | 51 | 51 |

TABLE 1-7-continued

|  |  | Ex. 1-23 | Ex. 1-24 | Ex. 1-25 | Ex. 1-26 | Comp. Ex. 1-23 | Comp. Ex. 1-24 | Comp. Ex. 1-25 | Comp. Ex. 1-26 |
|---|---|---|---|---|---|---|---|---|---|
| crosslinked rubber (press molding conditions: 190° C.- 7 min, CS- 15 min) | Modulus at 200% (MPa) | 2.5 | 2.6 | 2.6 | 2.6 | 2.1 | 2.1 | 2.2 | 2.3 |
|  | Modulus at 300% (MPa) | 2.9 | 2.9 | 3.1 | 3.1 | 2.6 | 2.6 | 2.7 | 2.7 |
|  | TB (MPa) | 10.4 | 10.5 | 11 | 11 | 9.8 | 9.9 | 10.1 | 10.1 |
|  | EB (%) | 660 | 670 | 670 | 670 | 600 | 610 | 610 | 620 |
|  | CS (150° C. × 22 hr) (%) (JIS K 6262) | 16 | 15 | 15 | 15 | 19 | 19 | 19 | 18 |
|  | Heat aging resistance (150° C., 70 hours) |  |  |  |  |  |  |  |  |
|  | Retention of tensile strength after aging (%) | 93 | 94 | 94 | 96 | 87 | 88 | 88 | 89 |
|  | Retention of tensile elongation after aging (%) | 94 | 94 | 95 | 95 | 91 | 91 | 92 | 92 |
|  | Change of hardness (JIS K 6257) | +5 | +4 | +4 | +4 | +6 | +6 | +6 | +5 |
|  | Brake oil aging resistance (150° C., 70 hours) (DOT3 equivalent product) |  |  |  |  |  |  |  |  |
|  | Retention of tensile strength after aging (%) | 95 | 96 | 96 | 96 | 95 | 95 | 95 | 95 |
|  | Retention of elongation after ageing (%) | 100 | 100 | 100 | 100 | 100 | 100 | 100 | 100 |
|  | Change of hardness | −5 | −4 | −4 | −4 | −6 | −6 | −5 | −5 |
|  | Change of volume (%) | −3 | −3 | −3 | −3 | −4 | −4 | −4 | −3 |
|  | Change of weight (%) | −2 | −2 | −2 | −2 | −2 | −2 | −2 | −2 |

←: The arrow means the same numerical value as that described on the left side.
In Table 1-7, the unit of each value is "part(s) by weight".

TABLE 1-8

|  |  | Ex. 1-27 | Ex. 1-28 | Ex. 1-29 | Ex. 1-30 | Comp. Ex. 1-27 | Comp. Ex. 1-28 | Comp. Ex. 1-29 | Comp. Ex. 1-30 |
|---|---|---|---|---|---|---|---|---|---|
|  | EPDM 1 | H-1 | H-1 | H-1 | H-1 | H-C | H-C | H-C | H-C |
|  | EPDM 2 | I-1 | I-1 | I-1 | I-1 | I-C | I-C | I-C | I-C |
|  | EPDM 1* | 50 | 50 | 50 | 50 | 50 | 50 | 50 | 50 |
|  | EPDM 2* | 50 | 50 | 50 | 50 | 50 | 50 | 50 | 50 |
| Pre-addition softener | Mineral oil type softener* | 30 | 30 |  |  | 30 | 30 |  |  |
|  | Liquid EPR-1* |  |  | 15 |  |  |  | 15 |  |
|  | Liquid EPR-2* |  |  |  | 15 |  |  |  | 15 |
|  | Liquid EPR-3* |  |  | 15 |  |  |  | 15 |  |
|  | Liquid EPR-4* |  |  |  | 15 |  |  |  | 15 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | Two kinds of zinc oxides | 5 | ← | ← | ← | ← | ← | ← | ← |
|  | Stearic acid | 1 | ← | ← | ← | ← | ← | ← | ← |
|  | SRF carbon black (Show Black IP-200) | 68 | ← | ← | ← | ← | ← | ← | ← |
|  | Post-addition softener* | 100 paraffinic oil (PW-90) | ← | ← | ← | ← | ← | ← | ← |
|  | Vulcanization accelerator CMBT (Sanceler HM) | 0.8 | ← | ← | ← | ← | ← | ← | ← |
|  | Vulcanization accelerator CBS (Sanceler CM) | 0.5 | ← | ← | ← | ← | ← | ← | ← |
|  | Vulcanization accelerator ZnBDC (Sanceler BZ) | 1 | ← | ← | ← | ← | ← | ← | ← |
|  | Vulcanization accelerator DPTT (Sanceler TRA) | 0.5 | ← | ← | ← | ← | ← | ← | ← |
|  | Vulcanization accelerator TMTD (Sanceler TT) | 0.3 | ← | ← | ← | ← | ← | ← | ← |
|  | Sulfur | 0.2 | ← | ← | ← | ← | ← | ← | ← |
| Properties of unvulcanized rubber | Mooney viscosity ML (1 + 4) 100° C. (JIS K 6300) | 28 | 28 | 27 | 28 | 28 | 27 | 28 | 28 |
|  | Minimum Mooney viscosity Vm (125° C.) (JIS K 6300) | 15 | 15 | 16 | 15 | 15 | 14 | 16 | 15 |
|  | Scorch time t5 (121° C.) (min) (JIS K 6300) | 20.3 | 20.3 | 20.1 | 20.2 | 20.3 | 20.1 | 20.4 | 20.2 |

TABLE 1-8-continued

|  |  | Ex. 1-27 | Ex. 1-28 | Ex. 1-29 | Ex. 1-30 | Comp. Ex. 1-27 | Comp. Ex. 1-28 | Comp. Ex. 1-29 | Comp. Ex. 1-30 |
|---|---|---|---|---|---|---|---|---|---|
|  | Vulcanization index Δt (121° C.) (min) (JIS K 6300) | 13.7 | 13.7 | 13.6 | 13.7 | 13.6 | 13.7 | 13.7 | 13.6 |
|  | ODR tc (90) (180° C.) (min) (JIS K 6300) | 3.2 | 3.19 | 3.18 | 3.18 | 3.29 | 3.29 | 3.28 | 3.28 |
| Properties of vulcanized rubber (press molding conditions: 180° C.-5 min) | Specific gravity | 0.987 | 0.988 | 0.989 | 0.987 | 0.989 | 0.987 | 0.988 | 0.989 |
|  | Hardness | 40 | 40 | 40 | 40 | 40 | 41 | 40 | 40 |
|  | Modulus at 100% (MPa) | 0.85 | 0.85 | 0.86 | 0.87 | 0.72 | 0.73 | 0.73 | 0.75 |
|  | Modulus at 200% (MPa) | 1.2 | 1.23 | 1.23 | 1.25 | 1.18 | 1.18 | 1.18 | 1.19 |
|  | Modulus at 300% (MPa) | 2 | 2 | 2.02 | 2.02 | 1.82 | 1.83 | 1.83 | 1.85 |
|  | TB (MPa) | 12.7 | 12.8 | 13 | 13.1 | 13.4 | 11.4 | 11.7 | 11.8 |
|  | EB (%) | 1010 | 1020 | 1060 | 1080 | 960 | 960 | 970 | 970 |
|  | Heat aging resistance (120° C., 70 hours) |  |  |  |  |  |  |  |  |
|  | Retention of tensile strength after aging (%) | −9 | −8 | −8 | −7 | −11 | −11 | −10 | −10 |
|  | Change of tensile elongation after aging (%) | −16 | −16 | −15 | −15 | −21 | −21 | −20 | −19 |
|  | Change of hardness (JIS K 6257) | +3 | +2 | +2 | +2 | +3 | +3 | +3 | +2 |
|  | High-temperature properties (in atmosphere of air at 140° C.) |  |  |  |  |  |  |  |  |
|  | Tensile strength (MPa) | 1.88 | 1.9 | 1.9 | 1.92 | 1.86 | 1.86 | 1.86 | 1.87 |
|  | Elongation (%) | 380 | 380 | 390 | 390 | 370 | 370 | 380 | 380 |
|  | Electrical properties |  |  |  |  |  |  |  |  |
|  | Volume resistivity (Ω · cm) | 1.80E+14 | 1.60E+14 | 1.80E+14 | 1.70E+14 | 1.60E+14 | 1.70E+14 | 1.90E+14 | 1.50E+14 |

←: The arrow means the same numerical value as that described on the left side.
In Table 1-8, the unit of each value is "part(s) by weight".

TABLE 1-9

|  |  | Ex. 1-31 | Ex. 1-32 | Ex. 1-33 | Ex. 1-34 | Comp. Ex. 1-31 | Comp. Ex. 1-32 | Comp. Ex. 1-33 | Comp. Ex. 1-34 |
|---|---|---|---|---|---|---|---|---|---|
|  | EPDM 1 | J-1 | J-1 | J-1 | J-1 | J-C | J-C | J-C | J-C |
|  | EPDM 1* | 100 | 100 | 100 | 100 | 100 | 100 | 100 | 100 |
| Pre-addition softener | Mineral oil type softener* | 10 | 10 |  |  | 10 | 10 |  |  |
|  | Liquid EPR-1* |  |  | 10 |  |  |  | 10 |  |
|  | Liquid EPR-2* |  |  |  | 10 |  |  |  | 10 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | Two kinds of zinc oxides | 5 | ← | ← | ← | ← | ← | ← | ← |
|  | Stearic acid | 1 | ← | ← | ← | ← | ← | ← | ← |
|  | SRF carbon black (Shiest S) | 105 | ← | ← | ← | ← | ← | ← | ← |
|  | Post-addition softener* paraffinic oil (PW-90) | 10 | ← | ← | ← | ← | ← | ← | ← |
|  | Vulcanization accelerator MDB | 1.5 | ← | ← | ← | ← | ← | ← | ← |
|  | Vulcanization accelerator MBT | 0.5 | ← | ← | ← | ← | ← | ← | ← |
|  | Vulcanization accelerator ZnBDC | 0.3 | ← | ← | ← | ← | ← | ← | ← |
|  | Sulfur | 0.8 | ← | ← | ← | ← | ← | ← | ← |
|  | Calcium oxide (Vesta #PP) | 4 | ← | ← | ← | ← | ← | ← | ← |
| Properties of unvulcanized rubber | Minimum Mooney viscosity Vm (145° C.) (JIS K 6300) | 30 | 31 | 29 | 30 | 30 | 30 | 30 | 29 |
|  | Scorch time t5 (145° C.) (min) (JIS K 6300) | 3.8 | 3.7 | 3.7 | 3.9 | 3.9 | 3.9 | 3.9 | 3.7 |
|  | Vulcanization index Δ$_t$ (145° C.) (min) (JIS K 6300) | 1.2 | 1.2 | 1.3 | 1.2 | 1.2 | 1.1 | 1.2 | 1.2 |
|  | ODR tc(90) (180° C.) (min) (JIS K 6300) | 3 | 3 | 3 | 3 | 3 | 3 | 3 | 3 |
| Properties of vulcanized rubber (press molding conditions: 180° C.-5 min) | Hardness | 80 | 81 | 80 | 81 | 81 | 81 | 81 | 80 |
|  | Modulus at 200% (MPa) | 7.2 | 7.4 | 7.4 | 7.5 | 6.8 | 6.8 | 6.9 | 7 |
|  | TB (MPa) | 12 | 12.4 | 12.5 | 12.7 | 11.5 | 11.5 | 11.7 | 11.8 |
|  | EB (%) | 350 | 370 | 370 | 380 | 343 | 345 | 345 | 350 |
|  | CS (70° C. × 22 hr) (%) | 15 | 15 | 14 | 14 | 17 | 17 | 17 | 16 |

←: The arrow means the same numerical value as that described on the left side.
In Table 1-9, the unit of each value is "part(s) by weight".

TABLE 1-10

|  |  | Ex. 1-35 | Ex. 1-36 | Ex. 1-37 | Ex. 1-38 | Comp. Ex. 1-35 | Comp. Ex. 1-36 | Comp. Ex. 1-37 | Comp. Ex. 1-38 |
|---|---|---|---|---|---|---|---|---|---|
|  | EPDM 1 | J-1 | J-1 | J-1 | J-1 | J-C | J-C | J-C | J-C |
|  | EPDM 1* | 100 | 100 | 100 | 100 | 100 | 100 | 100 | 100 |
| Pre-addition softener | Mineral oil type softener* | 20 | 20 |  |  | 20 | 20 |  |  |
|  | Liquid EPR-1* |  |  | 20 |  |  |  | 20 |  |
|  | Liquid EPR-2* |  |  |  | 20 |  |  |  | 20 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | "N330" carbon black (trade name, available from Asahi Carbon Co., Ltd.) | 45 | ← | ← | ← | ← | ← | ← | ← |
|  | zinc oxide | 3 | ← | ← | ← | ← | ← | ← | ← |
|  | Stearic acid | 1 | ← | ← | ← | ← | ← | ← | ← |
|  | Sulfur | 1.75 | ← | ← | ← | ← | ← | ← | ← |
|  | Vulcanization accelerator N-cyclohexylbenzothiazyl-2-sulfenamide | 1 | ← | ← | ← | ← | ← | ← | ← |
| Properties of vulcanized rubber (press molding conditions: 160° C.-11 min) | TB (MPa) | 13.8 | 14 | 14 | 14.2 | 13 | 13.1 | 13.7 | 13.7 |
|  | EB (%) | 340 | 350 | 360 | 360 | 280 | 290 | 290 | 300 |
|  | Heat aging resistance (100° C., 70 minutes) Retention of tensile strength after aging (%) | 93 | 94 | 95 | 95 | 85 | 86 | 86 | 88 |
|  | Retention of tensile elongation after aging (%) | 88 | 88 | 88 | 89 | 84 | 85 | 85 | 86 |
|  | Flex test (number of flex times) | $10^5<$ | $10^5<$ | $10^5<$ | $10^5<$ | $10^5<$ | $10^5<$ | $10^5<$ | $10^5<$ |

←: The arrow means the same numerical value as that described on the left side.
In Table 1-10, the unit of each value is "part(s) by weight".

TABLE 1-11

|  |  | Ex. 1-39 | Ex. 1-40 | Ex. 1-41 | Ex. 1-42 | Comp. Ex. 1-39 | Comp. Ex. 1-40 | Comp. Ex. 1-41 | Comp. Ex. 1-42 |
|---|---|---|---|---|---|---|---|---|---|
|  | EPDM 1 | H-1 | H-1 | H-1 | H-1 | H-C | H-C | H-C | H-C |
|  | EPDM 1* | 100 | 100 | 100 | 100 | 100 | 100 | 100 | 100 |
| Pre-addition softener | Mineral oil type softener* | 20 | 20 |  |  | 20 | 20 |  |  |
|  | Liquid EPR-1* |  |  | 20 |  |  |  | 20 |  |
|  | Liquid EPR-2* |  |  |  | 20 |  |  |  | 20 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | Butyl rubber (available from JSR Corporation, Butyl 268) | 70 | ← | ← | ← | ← | ← | ← | ← |
|  | Carbon black (available from Asahi Carbon Co., Ltd., Asahi #55) | 55 | ← | ← | ← | ← | ← | ← | ← |
|  | Zinc oxide | 3 | ← | ← | ← | ← | ← | ← | ← |
|  | Stearic acid | 1 | ← | ← | ← | ← | ← | ← | ← |
|  | Sulfur | 1.5 | ← | ← | ← | ← | ← | ← | ← |
|  | Vulcanization acceleretor tetramethylthiuram disulfide | 1 | ← | ← | ← | ← | ← | ← | ← |
|  | Vulcanization accelerator 2-mercaptobenzothiazole | 0.5 | ← | ← | ← | ← | ← | ← | ← |
| Properties of vulcanized rubber (press molding conditions: 160° C.-20 min) | TB (MPa) | 12.5 | 12.6 | 12.7 | 12.8 | 10.8 | 11.2 | 11.4 | 11.5 |
|  | EB (%) | 620 | 630 | 640 | 670 | 560 | 570 | 570 | 580 |
|  | Heat aging resistance (100° C., 70 minutes) Retention of tensile strength after aging (%) | 88 | 88 | 90 | 91 | 81 | 82 | 82 | 83 |
|  | Retention of tensile elongation after aging (%) | 84 | 84 | 85 | 90 | 77 | 78 | 79 | 79 |
|  | Gas permeability (cm$^3$ · mm/m$^3$ · 24 hr · atm) | 67 | 67 | 66 | 66 | 230 | 220 | 220 | 210 |

←: The arrow means the same numerical value as that described on the left side.
In Table 1-11, the unit of each value is "part(s) by weight".

TABLE 1-12

|  |  | Ex. 1-43 | Ex. 1-44 | Ex. 1-45 | Ex. 1-46 | Comp. Ex. 1-43 | Comp. Ex. 1-44 | Comp. Ex. 1-45 | Comp. Ex. 1-46 |
|---|---|---|---|---|---|---|---|---|---|
| Pre-addition softener | EPDM 1 | H-1 | H-1 | H-1 | H-1 | H-C | H-C | H-C | H-C |
|  | EPDM 1* | 100 | 100 | 100 | 100 | 100 | 100 | 100 | 100 |
|  | Mineral oil type softener* | 10 | 10 |  |  | 10 | 10 |  |  |
|  | Liquid EPR-1* |  |  | 10 |  |  |  | 10 |  |
|  | Liquid EPR-2* |  |  |  | 10 |  |  |  | 10 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | "Asahi 70" HAF carbon black (trade name, available from Asahi Carbon Co., Ltd.) | 45 | ← | ← | ← | ← | ← | ← | ← |
|  | Zinc oxide | 5 | ← | ← | ← | ← | ← | ← | ← |
|  | Stearic acid | 1 | ← | ← | ← | ← | ← | ← | ← |
|  | Sulfur | 0.5 | ← | ← | ← | ← | ← | ← | ← |
|  | Vulcanization accelerator tetramethylthiuram disulfide | 0.5 | ← | ← | ← | ← | ← | ← | ← |
|  | Vulcanization accelerator 2-mercaptobenzothiazole | 0.5 | ← | ← | ← | ← | ← | ← | ← |
| Properties of vulcanized rubber (press molding conditions: 160° C.-20 min) | TB (MPa) | 13.6 | 13.7 | 13.7 | 14 | 12 | 12.2 | 12.3 | 12.5 |
|  | EB (%) | 540 | 540 | 550 | 560 | 430 | 440 | 460 | 460 |
|  | Heat aging resistance (100° C., 70 minutes) |  |  |  |  |  |  |  |  |
|  | Retention of tensile strength after aging (%) | 96 | 97 | 97 | 98 | 92 | 93 | 93 | 95 |
|  | Retention of tensile elongation after aging (%) | 83 | 85 | 86 | 87 | 78 | 78 | 78 | 79 |
|  | Flex test (number of flex times) | $10^5<$ | $10^5<$ | $10^5<$ | $10^5<$ | $10^5<$ | $10^5<$ | $10^5<$ | $10^5<$ |

←: The arrow means the same numerical value as that described on the left side.
In Table 1-12, the unit of each value is "part(s) by weight".

TABLE 1-13

|  |  | Ex. 1-47 | Ex. 1-48 | Ex. 1-49 | Ex. 1-50 | Comp. Ex. 1-47 | Comp. Ex. 1-48 | Comp. Ex. 1-49 | Comp. Ex. 1-50 |
|---|---|---|---|---|---|---|---|---|---|
| Pre-addition softener | EPDM 1 | H-1 | H-1 | H-1 | H-1 | H-C | H-C | H-C | H-C |
|  | EPDM 1* | 100 | 100 | 100 | 100 | 100 | 100 | 100 | 100 |
|  | Mineral oil type softener* | 10 | 10 |  |  | 10 | 10 |  |  |
|  | Liquid EPR-1* |  |  | 10 |  |  |  | 10 |  |
|  | Liquid EPR-2* |  |  |  | 10 |  |  |  | 10 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | "Asahi 70" HAF carbon black (trade name, available from Asahi Carbon Co., Ltd.) | 45 | ← | ← | ← | ← | ← | ← | ← |
|  | "Sunsen 4240" naphthenic oil (trade name, available from Japan Sun oil Company, Ltd.) | 10 | ← | ← | ← | ← | ← | ← | ← |
|  | Zinc oxide | 5 | ← | ← | ← | ← | ← | ← | ← |
|  | Stearic acid | 1 | ← | ← | ← | ← | ← | ← | ← |
|  | Sulfur | 0.5 | ← | ← | ← | ← | ← | ← | ← |
|  | Vulcanization accelerator tetramethylthiuram disulfide | 0.5 | ← | ← | ← | ← | ← | ← | ← |
|  | Vulcanization accelerator 2-mercaptobenzothiazole | 0.5 | ← | ← | ← | ← | ← | ← | ← |
| Properties of vulcanized rubber (press molding conditions: 160° C.-20 min) | TB (MPa) | 13.6 | 13.7 | 13.7 | 14 | 12 | 12.2 | 12.3 | 12.5 |
|  | EB (%) | 540 | 540 | 550 | 560 | 430 | 440 | 460 | 460 |
|  | Heat aging resistance (100° C., 70 minutes) |  |  |  |  |  |  |  |  |
|  | Retention of tensile strength after aging (%) | 96 | 97 | 97 | 98 | 92 | 93 | 93 | 95 |
|  | Retention of tensile elongation after aging (%) | 83 | 85 | 86 | 87 | 78 | 78 | 78 | 79 |
|  | Flex test (number of flex times) | $10^5<$ | $10^5<$ | $10^5<$ | $10^5<$ | $10^5<$ | $10^5<$ | $10^5<$ | $10^5<$ |

←: The arrow means the same numerical value as that described on the left side.
In Table 1-13, the unit of each value is "part(s) by weight".

TABLE 1-14

|  |  | Ex. 1-51 | Ex. 1-52 | Ex. 1-53 | Ex. 1-54 | Comp. Ex. 1-51 | Comp. Ex. 1-52 | Comp. Ex. 1-53 | Comp. Ex. 1-54 |
|---|---|---|---|---|---|---|---|---|---|
|  | EPDM 1 | I-1 | I-1 | I-1 | I-1 | I-C | I-C | I-C | I-C |
|  | EPDM 1* | 100 | 100 | 100 | 100 | 100 | 100 | 100 | 100 |
| Pre-addition softener | Mineral oil type softener* | 40 | 40 |  |  | 40 | 40 |  |  |
|  | Liquid EPR-3* |  |  | 40 |  |  |  | 40 |  |
|  | Liquid EPR-4* |  |  |  | 40 |  |  |  | 40 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | "N550" carbon black (trade name, available from Asahi Carbon Co., Ltd.) | 55 | ← | ← | ← | ← | ← | ← | ← |
|  | "Diana Process Oil PW-380" paraffinic oil (trade name, available from Idemitsu Kosan Co., Ltd.) | 40 | ← | ← | ← | ← | ← | ← | ← |
|  | Zinc oxide | 5 | ← | ← | ← | ← | ← | ← | ← |
|  | Stearic acid | 1 | ← | ← | ← | ← | ← | ← | ← |
|  | Sulfur | 0.5 | ← | ← | ← | ← | ← | ← | ← |
|  | Tetramethylthiuram disulfide | 0.75 | ← | ← | ← | ← | ← | ← | ← |
|  | Vulcanization accelerator 2-mercaptobenzothiazole | 3 | ← | ← | ← | ← | ← | ← | ← |
|  | Vulcanization accelerator zinc dibutyldithiocarbamate | 5 | ← | ← | ← | ← | ← | ← | ← |
| Properties of vulcanized rubber | TB (MPa) | 20.5 | 20.8 | 21 | 21.5 | 17.0 | 17.2 | 17.7 | 17.9 |
|  | EB (%) | 520 | 520 | 520 | 540 | 480 | 490 | 490 | 500 |
|  | Heat aging resistance (100° C., 70 minutes) |  |  |  |  |  |  |  |  |
|  | Retention of tensile strength after aging (%) | 96 | 96 | 97 | 97 | 92 | 92 | 93 | 95 |
|  | Retention of tensile elongation after aging (%) | 94 | 94 | 95 | 65 | 89 | 90 | 91 | 91 |
|  | Volatile loss (wt %) | 0.5 | 0.4 | 0.4 | 0.3 | 2.9 | 2.8 | 2.6 | 2.6 |
|  | Fogging (mg) | 0.8 | 0.7 | 0.5 | 0.5 | 3.8 | 3.7 | 3.5 | 3.5 |

←: The arrow means the same numerical value as that described on the left side.
In Table 1-14, the unit of each value is "part(s) by weight".

TABLE 1-15

|  |  | Ex. 1-55 | Ex. 1-56 | Ex. 1-57 | Ex. 1-58 | Comp. Ex. 1-55 | Comp. Ex. 1-56 | Comp. Ex. 1-57 | Comp. Ex. 1-58 |
|---|---|---|---|---|---|---|---|---|---|
|  | EPDM 1 | A-1 | A-1 | A-1 | A-1 | A-C1 | A-C1 | A-C1 | A-C1 |
|  | EPDM 1* | 100 | 100 | 100 | 100 | 100 | 100 | 100 | 100 |
| Pre-addition softener | Mineral oil type softener* | 10 | 10 |  |  | 10 | 10 |  |  |
|  | Liquid EPR-1* |  |  | 10 |  |  |  | 10 |  |
|  | Liquid EPR-2* |  |  |  | 10 |  |  |  | 10 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of crosslinked rubber | Mistron Vapor Talc | 95 | ← | ← | ← | ← | ← | ← | ← |
|  | "Diana Process Oil PW-380" paraffinic oil (trade name, available from Idemitsu Kosan Co., Ltd.) | 10 | ← | ← | ← | ← | ← | ← | ← |
|  | Zinc oxide | 5 | ← | ← | ← | ← | ← | ← | ← |
|  | Stearic acid | 1 | ← | ← | ← | ← | ← | ← | ← |
|  | Organic peroxide dicumyl peroxide | 6.8 | ← | ← | ← | ← | ← | ← | ← |
|  | Crosslinking assistant p-(p-dibenzoylquinone)dioxime | 3.5 | ← | ← | ← | ← | ← | ← | ← |
| Properties of crosslinked rubber (press molding conditions: 160° C.-20 min) | TB (MPa) | 7.4 | 7.5 | 7.7 | 7.8 | 6.6 | 6.7 | 6.9 | 7 |
|  | EB (%) | 630 | 640 | 650 | 650 | 560 | 580 | 580 | 590 |
|  | Heat aging resistance (100° C., 70 minutes) |  |  |  |  |  |  |  |  |
|  | Retention of tensile strength after aging (%) | 83 | 83 | 84 | 86 | 72 | 72 | 72 | 74 |
|  | Retention of tensile elongation after aging (%) | 82 | 83 | 83 | 84 | 72 | 72 | 73 | 73 |
|  | Cold flex test t5 (° C.) | −46 | −47 | −46 | −46 | −46 | −47 | −46 | −46 |

←: The arrow means the same numerical value as that described on the left side.
In Table 1-15, the unit of each value is "part(s) by weight".

TABLE 1-16

|  |  | Ex. 1-59 | Ex. 1-60 | Ex. 1-61 | Ex. 1-62 | Comp. Ex. 1-59 | Comp. Ex. 1-60 | Comp. Ex. 1-61 | Comp. Ex. 1-62 |
|---|---|---|---|---|---|---|---|---|---|
|  | EPDM 1 | H-1 | H-1 | H-1 | H-1 | H-C | H-C | H-C | H-C |
|  | EPDM 1* | 100 | 100 | 100 | 100 | 100 | 100 | 100 | 100 |
| Pre-addition softener | Mineral oil type softener* | 10 | 10 |  |  | 10 | 10 |  |  |
|  | Liquid EPR-1* |  |  | 10 |  |  |  | 10 |  |
|  | Liquid EPR-2* |  |  |  | 10 |  |  |  | 10 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | Carbon black (available from Asahi Carbon Co., Ltd., Asahi #60G) | 145 | ← | ← | ← | ← | ← | ← | ← |
|  | "Diana Process Oil PW-380" paraffinic oil (trade name, available from Idemitsu Kosan Co., Ltd.) | 57 | ← | ← | ← | ← | ← | ← | ← |
|  | Zinc oxide | 5 | ← | ← | ← | ← | ← | ← | ← |
|  | Stearic acid | 1 | ← | ← | ← | ← | ← | ← | ← |
|  | Sulfur | 1.5 | ← | ← | ← | ← | ← | ← | ← |
|  | Vulcanization accelerator tetramethylthiuram disulfide | 1 | ← | ← | ← | ← | ← | ← | ← |
|  | Vulcanization accelerator 2-mercaptobenzothiazole | 0.5 | ← | ← | ← | ← | ← | ← | ← |
|  | Vulcanization accelerator zinc dibutyldithiocarbamate | 1.5 | ← | ← | ← | ← | ← | ← | ← |
| Properties of vulcanized rubber (press molding conditions: 160° C.-21 min) | TB (MPa) | 11.6 | 11.7 | 11.9 | 12.2 | 10.5 | 10.6 | 10.8 | 11.1 |
|  | EB (%) | 320 | 340 | 340 | 350 | 290 | 300 | 320 | 320 |
|  | Heat aging resistance (100° C., 70 minutes) |  |  |  |  |  |  |  |  |
|  | Retention of tensile strength after aging (%) | 75 | 76 | 78 | 78 | 64 | 65 | 67 | 68 |
|  | Retention of tensile elongation after aging (%) | 74 | 74 | 74 | 75 | 60 | 61 | 61 | 61 |

←: The arrow means the same numerical value as that described on the left side.
In Table 1-16, the unit of each value is "part(s) by weight".

TABLE 1-17

|  |  | Ex. 1-63 | Ex. 1-64 | Ex. 1-65 | Ex. 1-66 | Comp. Ex. 1-63 | Comp. Ex. 1-64 | Comp. Ex. 1-65 | Comp. Ex. 1-66 |
|---|---|---|---|---|---|---|---|---|---|
|  | EPDM 1 | K-1 | K-1 | K-1 | K-1 | K-C | K-C | K-C | K-C |
|  | EPDM 1* | 100 | 100 | 100 | 100 | 100 | 100 | 100 | 100 |
| Pre-addition softener | Mineral oil type softener* | 20 | 20 |  |  | 20 | 20 |  |  |
|  | Liquid EPR-1* |  |  | 20 |  |  |  | 20 |  |
|  | Liquid EPR-2* |  |  |  | 20 |  |  |  | 20 |
| Polyolefin resin | PE-1* | 5 | 5 | 5 | 5 | 5 | 5 | 5 | 5 |
|  | PE-2* |  |  |  |  |  |  |  |  |
|  | Solvent in alloying | absent | present | absent | absent | absent | present | absent | absent |
| Preparation of vulcanized rubber | Carbon black (available from Asahi Carbon Co., Ltd., Asahi #50HG) | 85 | ← | ← | ← | ← | ← | ← | ← |
|  | "Diana Process Oil PW-380" paraffinic oil (trade name, available from Idemitsu Kosan Co., Ltd.) | 50 | ← | ← | ← | ← | ← | ← | ← |
|  | Zinc oxide | 5 | ← | ← | ← | ← | ← | ← | ← |
|  | Stearic acid | 1 | ← | ← | ← | ← | ← | ← | ← |
|  | PEG #4000 | 1 | ← | ← | ← | ← | ← | ← | ← |
|  | Vesta 200 | 4 | ← | ← | ← | ← | ← | ← | ← |
|  | Sulfur | 1.5 | ← | ← | ← | ← | ← | ← | ← |
|  | Vulcanization accelerator 2-mercaptobenzothiazole | 1 | ← | ← | ← | ← | ← | ← | ← |
|  | Vulcanization accelerator N-cyclohexyl-2-benzothiazyl sulfenamide | 1 | ← | ← | ← | ← | ← | ← | ← |
|  | Vulcanization accelerator diethylthiourea | 1 | ← | ← | ← | ← | ← | ← | ← |
|  | Vulcanization accelerator tetrakis(2-ethylhexyl)thiuram disulfide | 0.5 | ← | ← | ← | ← | ← | ← | ← |
|  | Vulcanization accelerator p,p'-oxybis(benzenesulfonylhydrazide) | 4 | ← | ← | ← | ← | ← | ← | ← |
| Properties of vulcanized rubber | TB (MPa) | 2.7 | 2.8 | 2.8 | 2.9 | 2 | 2.2 | 2.2 | 2.4 |
|  | EB (%) | 230 | 240 | 250 | 250 | 190 | 200 | 210 | 210 |
|  | Heat aging resistance (100° C., 70 minutes) |  |  |  |  |  |  |  |  |

TABLE 1-17-continued

|  | Ex. 1-63 | Ex. 1-64 | Ex. 1-65 | Ex. 1-66 | Comp. Ex. 1-63 | Comp. Ex. 1-64 | Comp. Ex. 1-65 | Comp. Ex. 1-66 |
|---|---|---|---|---|---|---|---|---|
| Retention of tensile strength after aging (%) | 82 | 84 | 85 | 86 | 75 | 76 | 78 | 78 |
| Retention of tensile elongation after aging (%) | 69 | 72 | 72 | 75 | 62 | 63 | 64 | 64 |
| Specific gravity | 0.6 | 0.6 | 0.6 | 0.6 | 0.6 | 0.6 | 0.6 | 1.6 |
| Water absorption (wt %) | 1.3 | 1.3 | 1.3 | 1.3 | 1.1 | 1.2 | 1.2 | 1.2 |
| Compression set (%) | 28 | 27 | 26 | 24 | 32 | 31 | 31 | 30 |

←: The arrow means the same numerical value as that described on the left side.
In Table 1-17, the unit of each value is "part(s) by weight".

EXAMPLES II

Excellent effects of the present invention (2) are described with reference to the following Examples II, but it should be construed that the present invention (2) is in no way limited to those examples. Methods to evaluate properties in the examples and the comparative examples are as follows.

Number-Average Molecular Weight (Mn)

Number-average molecular weight (Mn) was measured by VPO method (vapor pressure osmometry method).

Intrinsic Viscosity

Intrinsic viscosity [η] was measured by the use of a fully automatic intrinsic viscometer (manufactured by Rigo Co., Ltd.) under the conditions of a temperature of 135° C. and a measuring solvent of decalin.

B Value and Composition

B value was determined by the following formula (I) using molar fractions of monomers and a fraction of dyad sequence of ethylene/α-olefin of 3 to 20 carbon atoms.

$$B \text{ value} = ([EX]+2[Y])/\{2[E] \times ([X]+[Y])\} \quad (I)$$

In the formula (I), [E], [X] and [Y] are molar fractions of ethylene, an α-olefin of 3 to 20 carbon atoms and a non-conjugated polyene, respectively, and [EX] is a fraction of dyad sequence of ethylene/α-olefin of 3 to 20 carbon atoms.

When the ethylene/C3-C20 α-olefin/non-conjugated polyene copolymer is an ethylene/propylene/ENB copolymer represented by the following formula (III) or an ethylene/propylene/VNB copolymer represented by the following formula (IV), the B value and composition can be determined in the following manner. When the ethylene/C3-C20 α-olefin/non-conjugated polyene copolymer is an ethylene/propylene/ENB/VNB copolymer, the B value and composition can be determined by treating ENB and VNB as one kind of a non-conjugated polyene (ENB).

First, the following 9 kinds of NMR integral values were determined. The NMR integral value was obtained by measuring a $^{13}$C-NMR spectrum by the use of an ECX400P type nuclear magnetic resonance device (manufactured by JEOL Ltd.) under the conditions of a measuring temperature of 120° C., a measuring solvent of orthodichlorobenzene/deuterated benzene (4/1) and a number of integration times of 8000.

(1) αβ, (2) αγ+αβ, (3) βγ, (4) βγ, (5) γδ, (6) δδ, (7) 3E, (8) 3Z, (9) αα+1Z+5E+5Z+6E+6Z

α, β, γ and δ indicate that the methylene signal noted is away from the methine carbon (branch) by 1 bond, 2 bonds, 3 bonds and 4 bonds, respectively. A symbol consisting of a numeral and an English character in the above (7) to (9) represents a carbon derived from ENB, and the numeral represents a position in the following formula (III) and the following formula (IV), and the English characters E and Z represent E form and Z form, respectively.

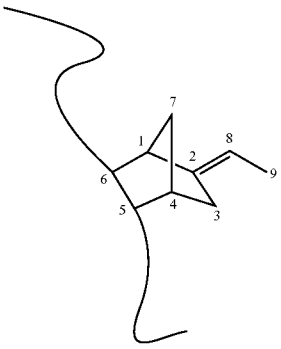

(III)

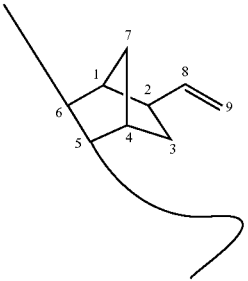

(IV)

The above (2) indicates the total of plural peaks of 37 to 39 ppm, the above (6) indicates a numerical value obtained by subtracting peaks of γγ and γδ from the total of plural peaks of 29 to 31 ppm, and the above (9) adopts the total of plural peaks of 44 to 48 ppm.

αα is calculated as follows.

$$\alpha\alpha = \alpha\alpha+1Z+5E+5Z+6E+6Z-2\times 3E-3\times 3Z = (9)-2\times(7)-3\times(8)$$

The dyad sequence fraction is calculated as follows.

$$PP(\text{propylene/propylene sequence}) = \alpha\alpha + \alpha\beta/4$$

$$PE(\text{propylene/ethylene sequence}) = \alpha\gamma + \alpha\delta + \alpha\beta/2$$

$$EE(\text{ethylene/ethylene sequence}) = (\beta\delta+\delta\delta)/2 + (\gamma\delta+\beta\gamma)/4$$

$$NE(ENB/\text{ethylene sequence}) + NP(ENB/\text{propylene sequence}) + NN(ENB/ENB \text{ sequence}) = (3E+3Z)\times 2$$

Therefore, composition can be calculated as follows.

$$[E](\text{ethylene molar fraction}) = (EE+PE/2+3E+3Z)/(PP+PE+EE+3E+3Z)$$

[X](α-olefin molar fraction)=(PP+PE/2)/(PP+PE+EE+3E+3Z)

[Y](non-conjugated polyene molar fraction)=(3E+3Z)/(PP+PE+EE+3E+3Z)

The dyad sequence fraction [EX] is calculated as follows.

[EX]=PE/(PP+PE+EE+3E+3Z)

From the above, the B value can be calculated as follows.

$$B\ value=([EX]+2[Y])/\{2[E]\times([X]+[Y])\} \quad (I)$$

The B value and the dyad fraction can be determined with reference to Seger, M. R. and Maciel, G. E., *Anal. Chem.* 2004, 76, 5734-5747.

Ethylene Distribution Parameter p

In 10 ml of cyclohexane which was an eluent, 0.02 g of an ethylene/α-olefin/non-conjugated polyene copolymer was dissolved, then the solution was filtered through a filter of 0.45 μm, and GPC-offline-FTIR measurement was carried out.

The measurement was carried out using cyclohexane as an eluent under the conditions of a flow rate of 1.0 ml/min and a temperature of 60° C., and in this measurement, a gel permeation chromatograph Alliance GPC2000 type (manufactured by Waters corporation) was used as an apparatus, two of Gel GMHHR-H manufactured by Tosoh Corporation were used as columns, a differential refractometer RI-8020 manufactured by Tosoh Corporation was used as a detector, and LC-Transform series 300 manufactured by Lab Connection Inc. was used as a FTIR device.

Calculation of a molecular weight was carried out in terms of polyisobutylene, and the detector and the FTIR measuring device were connected in parallel to the pipes at the exits of the columns so that the flow rates would become almost equal to each other. When the maximum peak intensity in the range of 721±20 cm$^{-1}$ in a chart obtained as a result of the FTIR measurement is represented by A721 cm$^{-1}$ and the maximum peak intensity in the range of 4320±20 cm$^{-1}$ in the chart is represented by A4320 cm$^{-1}$, the ethylene distribution parameter P is represented by:

$$P=A721\ cm^{-1}/A4320\ cm^{-1}$$

However, the maximum peak intensity in the range of 721±20 cm$^{-1}$ was considered an intensity from a base line that links a minimum point in the range of 782±20 cm$^{-1}$ with a minimum point in the range of 690±20 cm$^{-1}$, and likewise, the maximum peak intensity in the range of 4320±20 cm$^{-1}$ was considered an intensity from a base line that links a minimum point in the range of 4480±20 cm$^{-1}$ with a minimum point in the range of 3500±20 cm$^{-1}$.

Haze Value (Internal Haze (%))

Haze of a specimen having a thickness of 1 mm was measured by the use of a digital haze meter "NDH-20D" manufactured by Nippon Denshoku Industries Co., Ltd.

Change of Hardness, Change of Volume, Change of Weight

After a specimen was immersed in brake oil (DOT3 equivalent product) at 150° C. for 70 hours or subjected to aging test at a given temperature for a given time in accordance with JIS K6258, change of hardness, change of volume and change of weight were measured.

Volume Resistivity

Volume resistivity was evaluated in accordance with ASTM D 257.

Flex Test

Flex test was carried out by the use of a de Mattia testing machine in accordance with JIS K 6301, and the number of flex times at which the length of a crack became 15 mm was measured.

Gas Permeability Test

A vulcanized sheet was subjected to gas permeability test using a differential pressure gas permeability testing machine (manufactured by Toyo Seiki Seisaku-sho, Ltd.) and using 100% oxygen as a testing gas (permeation gas) under the conditions of a temperature of 23° C. and a humidity of 0% in accordance with ASTM D 1434, to measure gas permeability of the sheet.

Volatile Loss (% by Weight)

Volatile loss of a crosslinked product was determined in the following manner. Using a thermobalance, the crosslinked product was heated from room temperature to 300° C. at a heating rate of 100° C./min in nitrogen and maintained at 300° C. for 20 minutes, and a loss in weight was determined from the TGA (thermogravimetric analysis) curve. The loss in weight is expressed in "% by weight".

Fogging (mg)

Fogging of a crosslinked product was tested in the following manner. The crosslinked product was molded to obtain a rubber molded product in the form of a disc having a diameter of 80 mm and a thickness of 2 mm, and the rubber molded product was used as a sample. The sample was placed in a beaker shown in FIG. 2, and on the beaker, an aluminum foil and a cooling plate were placed (FIG. 3). Then, the beaker was immersed in an oil bath in such a manner that the upper part (60 mm) of the beaker came out from the liquid level, followed by heating at 110° C. After 20 hours, the weight of the sample precipitated on the aluminum foil was measured, and it was regarded as a quantity of fogging.

Modulus

Tensile test was carried out under the conditions of a measuring temperature of 23° C. and a stress rate of 500 mm/min in accordance with JIS K 6301, and a modulus at 100% elongation (M100), a modulus at 200% elongation (M200) and a modulus at 300% elongation (M300) were measured.

Aging Test

Heat aging test of 100° C.×70 hr was carried out by a normal oven method of JIS K6257, and retentions of properties after aging, that is, retention of tensile strength after aging (%), retention of tensile elongation after aging (%), etc. were determined.

Tackiness

Tackiness of a crosslinked product was evaluated in the following manner. After a sheet having a thickness of 2 mm prepared in the example was treated in an air oven under the conditions of 150° C. for 168 hours, surface tackiness of the sheet was observed.

Tensile Creep Value

A specimen was punched from a sheet having a thickness of 2 mm prepared in the example. In this test, a dynamic viscoelasticity device (ARES manufactured by TA INSTRUMENTS) and control software (Orchestrator Version 7.1.2.3 manufactured by TA INSTRUMENTS) were used. A specimen of JIS K 6273 having a shape shown in FIG. 2, which had been punched from the press molded sheet, was used, and the specimen was set on the device using torsion rectangular geometry. As the load in the tensile direction, axial force was set at −480±5 g (constant in this range), and the test was started from 22° C.±1° C., and the temperature was raised at a temperature rise rate of 2° C./min. During the course of heating, the length of the parallel portion at 25° C. and the length of the parallel portion at 80° C. were measured, and a tensile creep value was calculated from the following formula.

$$\text{Tensile creep value (\%)}=(L80-L25)/L0\times100$$

wherein L80 is a length (unit: mm) of the parallel portion at 80° C., L25 is a length (unit: mm) of the parallel portion at 25° C., and L0 is an initial length (unit: mm) of the parallel portion.

Shrinkage Ratio

An unvulcanized hose prepared in the example was cut to give a hose having a length of 15 cm, and it was heated at 200° C. for 10 minutes to obtain a crosslinked product. The length of the crosslinked product was measured, and a shrinkage ratio was calculated.

Shrinkage ratio (%)=(15−$L$)/15×100 wherein L is a length (unit: mm) of the crosslinked product.

Specific Gravity

Dirt on the surface of a sponge crosslinked product of 20 mm×20 mm obtained by punching was wiped off with an alcohol. Then, specific gravity of the crosslinked product was measured by an automatic specific gravimeter (manufactured by Toyo Seiki Seisaku-sho, Ltd., M-1 type) in an atmosphere of 25° C.

Water Absorption

Dirt on the surface of a sponge crosslinked product of 20 mm×20 mm obtained by punching was wiped off with an alcohol. Thereafter, the crosslinked product was placed at the position of 50 mm below the surface of the water, then the pressure was reduced to 125 mmHg, and the crosslinked product was held for 3 minutes. Then, this specimen was returned in the atmosphere, and after the lapse of 3 minutes, the weight of the specimen having absorbed water was measured, and water absorption (Wa) was calculated from the aforementioned formula.

Compression Set

Using a specimen having been subjected to heat aging at 70° C. for 200 hours, a compression set was measured in accordance with JIS K 6262 (1993).

Cold Flex Test

Cold flex test was carried out by the use of a Gehman cold flex tester in accordance with JIS K 6261 (1993), and t5 (° C.), freezing temperature, etc. were measured.

Tensile Strength at Break, Tensile Elongation at Break

An vulcanized molded product (III) was subjected to a tensile test under the conditions of a measuring temperature of 23° C. and a stress rate of 500 mm/min in accordance with JIS K6251, and a tensile strength at break (TB) and a tensile elongation at break (EB) were measured.

Compression Set (CS)

A sample was withdrawn from a vulcanized molded product (III) in accordance with the points of JIS K6250 6.5, and a compression set of the sample was measured after treatment of 70° C.×22 hr and after treatment of 90° C.×72 hr in accordance with JIS K6262 (1997).

Polymerization Examples to Prepare Component (A) and Component (C)

A 300-liter SUS reactor equipped with a stirrer was used, and to the reactor were continuously fed hexane at a rate of 27.0 kg/hr, ethylene at a rate of 5.1 kg/hr, propylene at a rate of 3.4 kg/hr, 5-ethylidene-2-norbornene (ENB) at a rate of 1.2 kg/hr, hydrogen at a rate of 15 N liter/hr, [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium as a main catalyst at a rate of 0.07 mmol/hr, $(C_6H_5)_3CB(C_6F_5)_4$ as a cocatalyst at a rate of 0.28 mmol/hr and TIBA as an organoaluminum compound at a rate of 1.8 mmol/hr (such a combination of the main catalyst, the cocatalyst and the organoaluminum compound being also referred to as "catalyst A" hereinafter), with maintaining the temperature at 80° C. and adjusting the liquid level to 100 liters, whereby a polymerization solution of a terpolymer (component (A)-1) of ethylene, propylene and 5-ethylidene-2-norbornene was obtained. The main catalyst was synthesized in accordance with the process described in International Publication No. 98/49212 Pamphlet. The resulting polymerization solution was subjected to flash drying to obtain a component (A)-1. Properties of the component (A)-1 are set forth together in Table 2-1.

Components (A)-2, (A)-3, (A)-6 and (A)-7 and components (C)-1 and (C)-2 were prepared in the same manner as in the preparation of the component (A)-1 in accordance with the raw material feed conditions described in Table 2-1. Properties of the resulting copolymers are set forth together in Table 2-1.

Components (A)-4, (A)-5, (A)-8, (A)-9 and (A)-10 and components (C)-3 to (C)-7 were prepared using rac-dimethylsilylene-bis{1-(2-methyl-4-phenylindenyl)}zirconium dichloride as a main catalyst (such a combination of the main catalyst, the cocatalyst and the organoaluminum compound being also referred to as "catalyst B" hereinafter) instead of the main catalyst [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium of the catalyst (A) and in accordance with the raw material feed conditions described in Table 2-1. Properties of the resulting copolymers are set forth together in Table 2-1.

TABLE 2-1

| | Conditions | | | | | | | | | |
|---|---|---|---|---|---|---|---|---|---|---|
| | Hexane kg/h | Ethylene kg/h | Propylene kg/h | $H_2$ NL/h | ENB kg/h | VNB kg/h | Main catalyst mmol/h | Cocatalyst mmol/h | TIBA mmol/h | Yield kg/h |
| (Catalyst A) | | | | | | | | | | |
| Component (A)-1 | 27.0 | 5.1 | 3.4 | 15 | 1.2 | — | 0.07 | 0.28 | 1.8 | 6.0 |
| Component (A)-2 | 26.8 | 4.6 | 4.0 | 19 | 1.2 | — | 0.07 | 0.28 | 1.8 | 6.0 |
| Component (A)-3 | 24.8 | 3.7 | 5.0 | 11 | 3.0 | 0.1 | 0.15 | 0.60 | 1.8 | 6.0 |
| Component (A)-6 | 26.8 | 4.1 | 4.8 | 19 | 1.2 | — | 0.07 | 0.28 | 1.8 | 6.0 |
| Component (A)-7 | 26.8 | 5.2 | 3.4 | 19 | 1.1 | — | 0.07 | 0.28 | 1.8 | 6.0 |
| Component (C)-1 | 52.8 | 12.0 | 6.5 | 1300 | — | — | 0.06 | 0.24 | 2.0 | 14.5 |

TABLE 2-1-continued

| | | | | | | | | | | |
|---|---|---|---|---|---|---|---|---|---|---|
| Component (C)-2 (Catalyst B) | 52.0 | 12.0 | 7.7 | 1600 | — | — | 0.09 | 0.36 | 2.0 | 15.2 |
| Component (A)-4 | 27.0 | 5.1 | 3.4 | 15 | 1.2 | — | 0.07 | 0.28 | 1.8 | 5.6 |
| Component (A)-5 | 26.8 | 4.6 | 4.0 | 19 | 1.2 | — | 0.07 | 0.28 | 1.8 | 5.6 |
| Component (A)-8 | 26.8 | 4.1 | 4.8 | 19 | 1.2 | — | 0.07 | 0.28 | 1.8 | 6.0 |
| Component (A)-9 | 26.8 | 5.2 | 3.4 | 19 | 1.1 | — | 0.07 | 0.28 | 1.8 | 6.0 |
| Component (A)-10 | 24.8 | 3.7 | 5.0 | 11 | 3.0 | 0.1 | 0.15 | 0.60 | 1.8 | 6.0 |
| Component (C)-3 | 52.8 | 12.0 | 6.5 | 1300 | — | — | 0.06 | 0.24 | 2.0 | 14.3 |
| Component (C)-4 | 52.0 | 12.0 | 9.2 | 1700 | — | — | 0.1 | 0.40 | 2.0 | 15.5 |
| Component (C)-5 | 52.0 | 12.0 | 9.0 | 1650 | — | — | 0.1 | 0.40 | 2.0 | 15.3 |
| Component (C)-6 | 52.0 | 12.0 | 9.0 | 1600 | — | — | 0.1 | 0.40 | 2.0 | 15.4 |
| Component (C)-7 | 52.0 | 12.0 | 7.7 | 1600 | — | — | 0.09 | 0.36 | 2.0 | 15.1 |

| | Copolymer properties | | | | | | | |
|---|---|---|---|---|---|---|---|---|
| | Ethylene mol % | Propylene mol % | ENB mol % | VNB mol % | [η] dl/g | Number-average molecular weight — | Pmax/Pmin — | B value — |
| (Catalyst A) | | | | | | | | |
| Component (A)-1 | 74.8 | 23.8 | 1.4 | — | 3.35 | — | 1.4 | 1.00 |
| Component (A)-2 | 67.8 | 30.6 | 1.4 | — | 2.71 | — | 1.4 | 0.98 |
| Component (A)-3 | 56.3 | 40.0 | 3.6 | 0.1 | 3.28 | — | 1.3 | 0.97 |
| Component (A)-6 | 60.1 | 39.9 | 1.4 | — | 2.71 | — | 1.4 | 0.98 |
| Component (A)-7 | 75.7 | 24.3 | 1.3 | — | 2.72 | — | 1.4 | 0.98 |
| Component (C)-1 | 70.0 | 30.0 | — | — | 0.20 | 3015 | 1.3 | 0.97 |
| Component (C)-2 | 63.0 | 37.0 | — | — | 0.20 | 3100 | 1.2 | 0.96 |
| (Catalyst B) | | | | | | | | |
| Component (A)-4 | 74.5 | 23.8 | 1.4 | — | 3.36 | — | 2.0 | 1.11 |
| Component (A)-5 | 68.0 | 30.6 | 1.3 | — | 2.69 | — | 2.1 | 1.10 |
| Component (A)-8 | 60.1 | 39.9 | 1.4 | — | 2.71 | — | 2.1 | 1.10 |
| Component (A)-9 | 75.7 | 24.3 | 1.3 | — | 2.72 | — | 2.1 | 1.10 |
| Component (A)-10 | 56.3 | 40.0 | 3.6 | 0.1 | 3.28 | — | 2.1 | 1.07 |
| Component (C)-3 | 71.0 | 29.0 | — | — | 0.20 | 2995 | 2.2 | 1.07 |
| Component (C)-4 | 53.0 | 47.0 | — | — | 0.06 | 750 | 2.2 | 1.08 |
| Component (C)-5 | 55.0 | 45.0 | — | — | 0.08 | 1020 | 2.1 | 1.07 |
| Component (C)-6 | 55.0 | 45.0 | — | — | 0.09 | 1430 | 2.2 | 1.10 |
| Component (C)-7 | 63.2 | 36.8 | — | — | 0.19 | 3050 | 2.3 | 1.08 |

Preparation Examples of ethylene/α-olefin/non-conjugated polyene copolymers (A) are described below.

Preparation Example 2-1

Preparation of EPDM (A-1)

A 300-liter SUS reactor equipped with a stirrer was used, and to the reactor were continuously fed hexane at a rate of 26.8 kg/hr, ethylene (C2) at a rate of 4.6 kg/hr, propylene (C3) at a rate of 4.0 kg/hr, 5-ethylidene-2-norbornene (ENB) at a rate of 1.2 kg/hr, hydrogen at a rate of 19 N liter/hr, [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium as a main catalyst at a rate of 0.07 mmol/hr, $(C_6H_5)_3CB(C_6F_5)_4$ as a cocatalyst at a rate of 0.28 mmol/hr and TIBA as an organoaluminum compound at a rate of 1.8 mmol/hr, with maintaining the temperature at 80° C. and adjusting the liquid level to 100 liters, whereby a polymerization solution of a terpolymer (EPDM A-1) of ethylene, propylene and 5-ethylidene-2-norbornene was obtained.

The polymerization pressure was 2.1 MPa (gauge pressure).

The resulting polymerization solution was subjected to removal of solvent by flash drying to obtain EPDM A-1. Properties of the resulting polymer are set forth together in Table 2-2.

The above-mentioned [N-(1,1-dimethylethyl)-1,1-dimethyl-1-[(1,2,3,3A,8A-η)-1,5,6,7-tetrahydro-2-methyl-S-indacene-1-yl]silaneaminate(2-)-κN][(1,2,3,4-η)-1,3-pentadiene]-titanium was synthesized in accordance with the process described in National Publication of International Patent No. 522398/2001.

Preparation Example 2-2

Preparation of EPDM (A-C1)

EPDM A-C1 was obtained in the same manner as in the preparation of the ethylene/α-olefin/non-conjugated polyene copolymer (A-1), except that $VO(OEt)Cl_2$ was used as a main catalyst, TIBA was not used, and feed rates of the raw materials and the catalysts were changed to those shown in Table 2-2.

Preparation Example 2-3

Preparation of EPDM (A-C2)

EPDM A-C2 was obtained in the same manner as in the preparation of the ethylene/α-olefin/non-conjugated polyene copolymer (A-1), except that rac-dimethylsilylene-bis{1-(2-methyl-4-phenylindenyl)}zirconium dichloride was used as a main catalyst, and feed rates of the raw materials and the catalysts were changed to those shown in Table 2-2.

The copolymers (A-C1) and (A-C2) were copolymers which did not satisfy Pmax/Pmin≦1.4 that is a requirement of the copolymer (A) for use in the present invention (2), and they were used in the comparative examples.

Preparation Example 2-4

Preparation of EPDM (B-1, C-1, E-1 and I-1)

EPDM B-1, C-1, E-1 and I-1 were prepared in the same manner as in the preparation of the copolymer A-1 under the conditions shown in Table 2-2.

Preparation Example 2-5

Preparation of EPDM (B-C, E-C and I-C)

Under the conditions shown in Table 2-2, EPDM B-C, E-C and I-C were prepared in the same manner as in the preparation of the copolymer A-C1.

Preparation Example 2-6

Preparation of Liquid EPR

Liquid EPR was obtained in the same manner as in the preparation of the ethylene/α-olefin/non-conjugated polyene copolymer (A-1), except that $VO(OEt)Cl_2$ was used as a main catalyst, $Al(Et)_{1.5}Cl_{1.5}$ was used as a cocatalyst, and feed rates of the raw materials and the catalysts were changed to those shown in Table 2-2.

TABLE 2-2

| | | | Conditions | | | | | | | |
|---|---|---|---|---|---|---|---|---|---|---|
| | B value | Hexane kg/h | C2 kg/h | C3 kg/h | HZ NL/h | ENB kg/h | VNB kg/h | Main catalyst mmol/h | Cocatalyst mmol/h | TIBA mmol/h |
| EPDM A-1 | 0.98 | 26.8 | 4.6 | 4.0 | 19 | 1.2 | — | 0.07 | 0.28 | 1.8 |
| EPDM A-C1 | 1.10 | 39.6 | 3.3 | 9.2 | 5 | 0.3 | — | 45 | 315 | — |
| EPDM A-C2 | | 26.8 | 4.6 | 4.0 | 19 | 1.2 | — | 0.07 | 0.28 | 1.8 |
| EPDM B-1 | 0.98 | 26.8 | 3.9 | 5.4 | 37 | 1.8 | — | 0.07 | 0.28 | 1.8 |
| EPDM B-C | 1.17 | 39.6 | 3.2 | 9.4 | 11 | 0.6 | — | 45 | 315 | — |
| EPDM C-1 | 0.99 | 26.8 | 3.9 | 5.4 | 44 | 1.1 | — | 0.07 | 0.28 | 1.8 |
| EPDM C-C | 1.16 | 39.6 | 3.3 | 9.6 | 13 | 0.3 | — | 45 | 315 | — |
| EPDM E-1 | 0.99 | 26.8 | 5.2 | 3.4 | 19 | 1.1 | — | 0.07 | 0.28 | 1.8 |
| EPDM E-C | 1.10 | 39.6 | 3.7 | 6.9 | 10 | 0.3 | — | 45 | 315 | — |
| EPDM I-1 | 1.00 | 27.0 | 5.1 | 3.4 | 15 | 1.2 | — | 0.07 | 0.28 | 1.8 |
| EPDM I-C | 1.11 | 39.6 | 3.7 | 6.6 | 6 | 0.3 | — | 45 | 315 | — |
| Liquid EPR-1 | 0.94 | 76.8 | 8.6 | 17.7 | 420 | — | — | 58 | 405 | — |

| | Polymer properties | | | | | | | |
|---|---|---|---|---|---|---|---|---|
| | Yield kg/h | C2 mol % | C3 mol % | ENB mol % | VNB mol % | [η] dl/g | Molecular weight Mn | Pmax/Pmin — |
| EPDM A-1 | 6.0 | 67.8 | 30.8 | 1.4 | — | 2.71 | 120000 | 1.4 |
| EPDM A-C1 | 4.2 | 68.0 | 30.3 | 1.2 | — | 2.8 | 130000 | 2.6 |
| EPDM A-C2 | 6.0 | 68.0 | 30.7 | 1.3 | — | 2.69 | 120000 | 1.9 |

TABLE 2-2-continued

| | | | | | | | | |
|---|---|---|---|---|---|---|---|---|
| EPDM B-1 | 6.0 | 56.8 | 41.1 | 2.1 | — | 1.9 | 60000 | 1.4 |
| EPDM B-C | 4.2 | 66.6 | 31.1 | 2.3 | — | 1.9 | 60000 | 2.6 |
| EPDM C-1 | 6.0 | 57.2 | 41.5 | 1.3 | — | 1.98 | 50000 | 1.4 |
| EPDM C-C | 4.2 | 67.2 | 31.5 | 1.3 | — | 1.98 | 50000 | 2.6 |
| EPDM E-1 | 6.0 | 72.2 | 26.6 | 1.3 | — | 2.13 | 68400 | 1.3 |
| EPDM E-C | 4.2 | 76.2 | 22.6 | 1.3 | — | 2.13 | 68400 | 2.4 |
| EPDM I-1 | 6.0 | 74.8 | 23.8 | 1.4 | — | 3.35 | 110000 | 1.3 |
| EPDM I-C | 4.2 | 77.0 | 21.7 | 1.3 | — | 3.34 | 108000 | 2.4 |
| Liquid EPR-1 | 10.6 | 63.2 | 36.8 | — | — | 0.19 | 2600 | — |

Example 2-1

In a hexane solvent, 100 parts by weight of the component (A)-1 as the component (A) and 40 parts by weight of the component (C)-1 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

140 Parts by weight of this oil-extended rubber were kneaded with 100 parts by weight of "Diana Process Oil PW-380" (trade name, available from Idemitsu Kosan Co., Ltd.) and 80 parts by weight of carbon black "Shiest HAF" (trade name, available from Tokai Carbon Co., Ltd.) as a reinforcing agent by means of a 4.3-liter Banbury mixer at 150° C. for 2 minutes. Then, the resulting kneadate was blended with 5 parts by weight of zinc oxide as a vulcanization accelerator, 1 part by weight of stearic acid as a processing aid, 1.5 parts by weight of sulfur as a vulcanizing agent, 1.0 part by weight of tetramethylthiuram disulfide as a vulcanization accelerator and 0.5 part by weight of 2-mercaptobenzothiazole as a vulcanization accelerator, and the blend was roll-milled by 8-inch open rolls (temperatures of front and back rolls: 50° C., rotational speed of front roll: 14 rpm, rotational speed of back roll: 16 rpm) and kneaded by a 2-liter Banbury mixer at 150° C. to obtain a rubber composition (also referred to as a "compounded rubber" hereinafter). The compounded rubber was molded into a sheet having a thickness of 2 mm by means of a 100 t press molding machine, and simultaneously with molding, heating was carried out at 170° C. for 20 minutes to obtain a crosslinked product. Property values of the crosslinked product thus obtained are set forth in Table 2-3.

Examples 2-2 to 2-4

A crosslinked product was prepared in the same manner as in Example 2-1, except that in the preparation of the oil extended rubber, "Diana Process Oil PW-100" (trade name, available from Idemitsu Kosan Co., Ltd.) was further added as the component (D), and the amounts of the component (C) and the component (D) added were changed to those shown in Table 2-3. Property values of the crosslinked product are set forth in Table 2-3.

Comparative Example 2-1

A crosslinked product was prepared in the same manner as in Example 2-1, except that the component (A)-4 was used as the component (A). Property values of the crosslinked product are set forth in Table 2-3.

Comparative Examples 2-2 to 2-4

A crosslinked product was prepared in the same manner as in Comparative Example 2-1, except that in the preparation of the oil extended rubber, "Diana Process Oil PW-100" (trade name, available from Idemitsu Kosan Co., Ltd.) was further added as the component (D), and the amounts of the component (C) and the component (D) added were changed to those shown in Table 2-3. Property values of the crosslinked product are set forth in Table 2-3.

Comparative Example 2-5

A crosslinked product was prepared in the same manner as in Example 2-1, except that the component (C)-3 was used as the component (C). Property values of the crosslinked product are set forth in Table 2-3.

Comparative Examples 2-6 to 2-8

A crosslinked product was prepared in the same manner as in Examples 2-2 to 2-4, except that the component (C)-3 was used as the component (C). Property values of the crosslinked product are set forth in Table 2-3.

Comparative Example 2-9

A crosslinked product was prepared in the same manner as in Comparative Example 2-5, except that the component (A)-4 was used as the component (A). Property values of the crosslinked product are set forth in Table 2-3.

Comparative Examples 2-10 to 2-12

A crosslinked product was prepared in the same manner as in Comparative Examples 2-6 to 2-8, except that the component (A)-4 was used as the component (A). Property values of the crosslinked product are set forth in Table 2-3.

Comparative Examples 2-13 and 2-14

A crosslinked product was prepared in the same manner as in Comparative Example 2-9, except that the component (C) was not used, and "Diana Process Oil PW-100" (trade name, available from Idemitsu Kosan Co., Ltd.) and "Diana Process Oil PW-380" (trade name, available from Idemitsu Kosan Co., Ltd.) were each added in an amount of 40 parts by weight. Property values of the crosslinked product are set forth in Table 2-3.

Comparative Example 2-15

A crosslinked product was prepared in the same manner as in Comparative Example 2-9, except that the component (C)-4 was used as the component (C). Property values of the crosslinked product are set forth in Table 2-3.

Comparative Example 2-16

A crosslinked product was prepared in the same manner as in Comparative Example 2-9, except that the component (C)-5 was used as the component (C). Property values of the crosslinked product are set forth in Table 2-3.

Comparative Example 2-17

A crosslinked product was prepared in the same manner as in Comparative Example 2-9, except that the component (C)-6 was used as the component (C). Property values of the crosslinked product are set forth in Table 2-3.

TABLE 2-3

|  |  | Examples | | | | Comparative Examples | | | | | | | |
|---|---|---|---|---|---|---|---|---|---|---|---|---|---|
|  |  | 2-1 | 2-2 | 2-3 | 2-4 | 2-1 | 2-2 | 2-3 | 2-4 | 2-5 | 2-6 | 2-7 | 2-8 |
| Composition of oil-extended rubber | Component (A) | component (A)-1 | | | | component (A)-4 | | | | component (A)-1 | | | |
|  | Component (C) | component (C)-1 | | | | component (C)-1 | | | | component (C)-3 | | | |
|  | Component (D) | — | PW-100 | PW-100 | PW-100 | — | PW-100 | PW-100 | PW-100 | — | PW-100 | PW-100 | PW-100 |
|  | Component (A) (phr) | 100 | 100 | 100 | 100 | 100 | 100 | 100 | 100 | 100 | 100 | 100 | 100 |
|  | Component (C) (phr) | 40 | 30 | 20 | 10 | 40 | 30 | 20 | 10 | 40 | 30 | 20 | 10 |
|  | Component (D) (phr) | — | 10 | 20 | 30 | — | 10 | 20 | 30 | — | 10 | 20 | 30 |
| Properties of crosslinked product | Tensile strength (MPa) | 21.0 | 20.5 | 20.0 | 19.5 | 18.5 | 18.5 | 17.8 | 17.4 | 18.7 | 18.0 | 17.2 | 17.1 |
|  | Elongation (%) | 500 | 510 | 510 | 520 | 470 | 450 | 460 | 450 | 440 | 450 | 440 | 460 |
|  | Retention of tensile strength after aging (%) | 97 | 96 | 95 | 93 | 89 | 84 | 80 | 78 | 88 | 84 | 80 | 76 |
|  | Retention of elongation after aging (%) | 96 | 96 | 94 | 91 | 89 | 88 | 80 | 74 | 86 | 82 | 82 | 74 |
|  | Volatile loss (wt %) | 0.4 | 0.9 | 1.7 | 3.1 | 2.0 | 2.9 | 3.8 | 4.2 | 1.8 | 3.0 | 4.0 | 4.1 |
|  | Quantity of fogging (mg) | 0.8 | 1.4 | 1.8 | 2.1 | 3.7 | 3.3 | 3.1 | 3.0 | 4.0 | 3.8 | 3.8 | 3.5 |
|  | Tackiness | none | none | none | none | slightly observed | slightly observed | slightly observed | none | slightly observed | slightly observed | slightly observed | none |

|  |  | Comparative Examples | | | | | | | | |
|---|---|---|---|---|---|---|---|---|---|---|
|  |  | 2-9 | 2-10 | 2-11 | 2-12 | 2-13 | 2-14 | 2-15 | 2-16 | 2-17 |
| Composition of oil-extended rubber | Component (A) | component (A)-4 | | | | | | | | |
|  | Component (C) | component (C)-3 | | | | — | — | component (C)-4 | component (C)-5 | component (C)-6 |
|  | Component (D) | — | PW-100 | PW-100 | PW-100 | PW-100 | PW-380 | — | — | — |
|  | Component (A) (phr) | 100 | 100 | 100 | 100 | 100 | 100 | 100 | 100 | 100 |
|  | Component (C) (phr) | 40 | 30 | 20 | 10 | — | — | 40 | 40 | 40 |
|  | Component (D) (phr) | — | 10 | 20 | 30 | 40 | 40 | — | — | — |
| Properties of crosslinked product | Tensile strength (MPa) | 19.1 | 18.7 | 18.0 | 17.6 | 17.1 | 17.2 | 18.0 | 18.6 | 19.3 |
|  | Elongation (%) | 430 | 440 | 450 | 450 | 460 | 430 | 450 | 470 | 440 |
|  | Retention of tensile strength after aging (%) | 90 | 87 | 82 | 78 | 75 | 82 | 88 | 90 | 90 |
|  | Retention of elongation after aging (%) | 90 | 85 | 80 | 75 | 75 | 80 | 84 | 87 | 89 |
|  | Volatile loss (wt %) | 1.2 | 2.1 | 3.0 | 4.2 | 4.7 | 2.5 | 2.0 | 1.7 | 1.3 |
|  | Quantity of fogging (mg) | 3.0 | 2.9 | 2.9 | 3.0 | 2.9 | 2.3 | 6.3 | 4.8 | 3.0 |
|  | Tackiness | none | none | none | none | none | none | observed | observed | observed |

Examples 2-5 and 2-6

A crosslinked product was prepared in the same manner as in Example 2-1, except that the component (A)-2 was used as the component (A) and the component (C)-2 was used as the component (C) to prepare the oil-extended rubber in the total amount of 120 parts by weight or 110 parts by weight. Property values of the crosslinked product are set forth in Table 2-4.

Example 2-7

A crosslinked product was prepared in the same manner as in Example 2-5, except that the component (A)-3 was used as the component (A). Property values of the crosslinked product are set forth in Table 2-4.

Comparative Example 2-18

A crosslinked product was prepared in the same manner as in Example 2-5, except that the component (C)-7 was used as the component (C). Property values of the crosslinked product are set forth in Table 2-4.

Comparative Example 2-19

A crosslinked product was prepared in the same manner as in Example 2-5, except that the component (A)-5 was used as the component (A). Property values of the crosslinked product are set forth in Table 2-4.

Comparative Example 2-20

A crosslinked product was prepared in the same manner as in Comparative Example 2-19, except that the component (C)-7 was used as the component (C). Property values of the crosslinked product are set forth in Table 2-4.

Comparative Example 2-21

A crosslinked product was prepared in the same manner as in Comparative Example 2-19, except that the component (C) was not used, and 10 parts by weight of "Diana Process Oil PW-380" (trade name, available from Idemitsu Kosan Co., Ltd.) were further added as the component (D). Property values of the crosslinked product are set forth in Table 2-4.

Comparative Example 2-22

A crosslinked product was prepared in the same manner as in Example 2-6, except that the component (C)-7 was used as the component (C). Property values of the crosslinked product are set forth in Table 2-4.

Comparative Example 2-23

A crosslinked product was prepared in the same manner as in Example 2-6, except that the component (A)-5 was used as the component (A). Property values of the crosslinked product are set forth in Table 2-4.

Comparative Example 2-24

A crosslinked product was prepared in the same manner as in Comparative Example 2-23, except that the component (C)-7 was used as the component (C). Property values of the crosslinked product are set forth in Table 2-4.

Comparative Example 2-25

A crosslinked product was prepared in the same manner as in Comparative Example 2-23, except that the component (C) was not used, and 10 parts by weight of "Diana Process Oil PW-380" (trade name, available from Idemitsu Kosan Co., Ltd.) were further added as the component (D). Property values of the crosslinked product are set forth in Table 2-4.

Comparative Example 2-26

A crosslinked product was prepared in the same manner as in Example 2-7, except that the component (C)-7 was used as the component (C). Property values of the crosslinked product are set forth in Table 2-4.

Comparative Example 2-27

A crosslinked product was prepared in the same manner as in Example 2-7, except that the component (A)-5 was used as the component (A). Property values of the crosslinked product are set forth in Table 2-4.

Comparative Example 2-28

A crosslinked product was prepared in the same manner as in Comparative Example 2-27, except that the component (C)-7 was used as the component (C). Property values of the crosslinked product are set forth in Table 2-4.

Comparative Example 2-29

A crosslinked product was prepared in the same manner as in Comparative Example 2-27, except that the component (C) was not used, and 20 parts by weight of "Diana Process Oil PW-380" (trade name, available from Idemitsu Kosan Co., Ltd.) were further added as the component (D). Property values of the crosslinked product are set forth in Table 2-4.

TABLE 2-4

|  |  | Example | Comparative Examples | | | | Example | Comparative Examples | |
|---|---|---|---|---|---|---|---|---|---|
|  |  | 2-5 | 2-18 | 2-19 | 2-20 | 2-21 | 2-6 | 2-22 | 2-23 |
| Composition of oil-extended rubber | Component (A) | component (A)-2 | component (A)-2 | component (A)-5 | component (A)-5 |  | component (A)-2 | component (A)-2 | component (A)-5 |
|  | Component (C) | component (C)-2 | component (C)-7 | component (C)-2 | component (C)-7 | — | component (C)-2 | component (C)-7 | component (C)-2 |
|  | Component (D) | — | — | — | — | PW-380 | — | — | — |
|  | Component (A) (phr) | 100 | 100 | 100 | 100 | 100 | 100 | 100 | 100 |
|  | Component (C) (phr) | 20 | 20 | 20 | 20 | — | 10 | 10 | 10 |
|  | Component (D) (phr) | — | — | — | — | 20 | — | — | — |

TABLE 2-4-continued

| Properties of crosslinked product | Tensile strength (MPa) | 16.5 | 14.3 | 14.8 | 15.7 | 14.2 | 16.1 | 13.8 | 14.1 |
|---|---|---|---|---|---|---|---|---|---|
| | Elongation (%) | 440 | 410 | 410 | 430 | 420 | 470 | 410 | 420 |
| | Retention of tensile strength after aging (%) | 90 | 81 | 82 | 87 | 82 | 83 | 78 | 79 |
| | Retention of elongation after aging (%) | 88 | 82 | 80 | 86 | 79 | 82 | 79 | 80 |
| | Volatile loss (wt %) | 1.3 | 2.3 | 2.2 | 1.7 | 2.5 | 2.1 | 3.2 | 3.2 |
| | Quantity of fogging (mg) | 0.5 | 2.0 | 1.9 | 1.5 | 1.2 | 0.2 | 1.8 | 1.7 |
| | Tackiness | none | slightly observed | slightly observed | none | none | none | slightly observed | slightly observed |

| | | Comparative Examples | | Example | Comparative Examples | | | |
|---|---|---|---|---|---|---|---|---|
| | | 2-24 | 2-25 | 2-7 | 2-26 | 2-27 | 2-28 | 2-29 |
| Composition of oil-extended rubber | Component (A) | component (A)-5 | | component (A)-3 | component (A)-3 | component (A)-5 | | |
| | Component (C) | component (C)-7 | — | component (C)-2 | component (C)-7 | component (C)-2 | component (C)-7 | — |
| | Component (D) | — | PW-380 | — | — | — | — | PW-380 |
| | Component (A) (phr) | 100 | 100 | 100 | 100 | 100 | 100 | 100 |
| | Component (C) (phr) | 10 | — | 20 | 20 | 20 | 20 | — |
| | Component (D) (phr) | — | 10 | — | — | — | — | 20 |
| Properties of crosslinked product | Tensile strength (MPa) | 15.1 | 14.5 | 15.2 | 11.0 | 11.7 | 13.8 | 12.1 |
| | Elongation (%) | 440 | 400 | 450 | 390 | 370 | 400 | 380 |
| | Retention of tensile strength after aging (%) | 82 | 81 | 70 | 68 | 67 | 69 | 65 |
| | Retention of elongation after aging (%) | 79 | 79 | 60 | 57 | 55 | 59 | 52 |
| | Volatile loss (wt %) | 2.4 | 2.7 | 1.7 | 3.1 | 3.0 | 2.0 | 3.0 |
| | Quantity of fogging (mg) | 1.4 | 1.1 | 0.4 | 1.7 | 1.7 | 1.5 | 1.2 |
| | Tackiness | none | none | none | slightly observed | slightly observed | none | none |

Example 2-8

Using the component (A)-6 as the component (A) and using the component (C)-2 as the component (C), an oil-extended rubber was prepared in the total amount of 110 parts by weight. 110 Parts by weight of this oil-extended rubber was kneaded with 45 parts by weight of "Diana Process Oil PS-430" (trade name, available from Idemitsu Kosan Co., Ltd.), 125 parts by weight of carbon black "Shiest FEF" (trade name, available from Tokai Carbon Co., Ltd.) as a reinforcing agent and 30 parts by weight of light calcium carbonate "Whiten SB" (trade name, available from Shiraishi Calcium Kaisha, Ltd.) as an inorganic filler by means of a 4.3-liter Banbury mixer at 150° C. for 2 minutes. Then, the kneadate, 5 parts by weight of zinc oxide as a vulcanization accelerator, 1 part by weight of stearic acid as a processing aid, 0.3 part by weight of sulfur as a vulcanizing agent, and 0.5 part by weight of tetramethylthiuram disulfide, 1.5 parts by weight of zinc di-n-butyldithiocarbamate, 0.5 part by weight of 2-mercaptoimidazoline, 0.5 part by weight of N-cyclohexyl-2-benzothiazyl sulfenamide and 1.5 parts by weight of morpholine disulfide as vulcanization accelerators were roll-milled by 8-inch open rolls (temperatures of front and back rolls: 50° C., rotational speed of front roll: 14 rpm, rotational speed of back roll: 16 rpm) to obtain a compounded rubber. Then, a crosslinked product was prepared in the same manner as in Example 2-6, except that the compounded rubber was extruded into an unvulcanized hose having an outer diameter of 18 mm and an inner diameter of 13.5 mm by the use of a 50 mm extruder (vented) under the conditions of head/cylinder 1/cylinder 2/screw temperatures of 80° C./70° C./60° C./50° C. and a screw rotational speed of 10 rpm. Property values of the crosslinked product are set forth in Table 2-5.

Example 2-9

A crosslinked product was prepared in the same manner as in Examples 2-2 to 2-4, except that an oil-extended rubber was prepared in the total amount of 120 parts by weight by the use of the component (A)-7 as the component (A), the component (C)-1 as the component (C) and "Diana Process Oil PW-100" (trade name, available from Idemitsu Kosan Co., Ltd.) as the component (D), 120 parts by weight of this oil-extended rubber was compounded with 35 parts by weight of "Diana Process Oil PS-430" (trade name, available from Idemitsu Kosan Co., Ltd.), 125 parts by weight of carbon black "Shiest FEF" (trade name, available from Tokai Carbon Co., Ltd.) as a reinforcing agent, 30 parts by weight of light calcium carbonate "Whiten SB" (trade name, available from Shiraishi Calcium Kaisha, Ltd.) as an inorganic filler, 5 parts by weight of zinc oxide as a vulcanization accelerator, 1 part by weight of stearic acid as a processing aid, 0.3 part by weight of sulfur as a vulcanizing agent, 0.3 part by weight of tetramethylthiuram disulfide, 1.5 parts by weight of zinc di-n-butyldithiocarbamate, 0.5 part by weight of 2-mercaptoimidazoline, 0.5 part by weight of N-cyclohexyl-2-benzothiazyl sulfenamide and 1.5 parts by weight of morpholine disulfide as vulcanization accelerators, and the resulting compounded rubber was extruded into an unvulcanized hose having an outer diameter of 18 mm and an inner diameter of 13.5 mm by the use of a 50 mm extruder (vented) under the conditions of head/cylinder 1/cylinder 2/screw temperatures of 80° C./70° C./60° C./50° C. and a screw rotational speed of 10 rpm. Property values of the crosslinked product are set forth in Table 2-5.

Example 2-10

A crosslinked product was prepared in the same manner as in Example 2-8, except that the preparation of an oil-extended rubber using the component (A) and the component (C) was not carried out, and the component (A) and the component (C) were directly used in the preparation of a compounded rubber. Property values of the crosslinked product are set forth in Table 2-5.

Example 2-11

A crosslinked product was prepared in the same manner as in Example 2-9, except that the preparation of an oil-extended rubber using the component (A) and the component (C) was not carried out, and the component (A) and the component (C) were directly used in the preparation of a compounded rubber. Property values of the crosslinked product are set forth in Table 2-5.

Comparative Example 2-30

A crosslinked product was prepared in the same manner as in Example 2-6, except that an oil-extended rubber was prepared in the total amount of 110 parts by weight by the use of the component (A)-8 as the component (A) and the component (C)-7 as the component (C), 110 parts by weight of this oil-extended rubber was compounded with 45 parts by weight of "Diana Process Oil PS-430" (trade name, available from Idemitsu Kosan Co., Ltd.), 125 parts by weight of carbon black "Shiest FEF" (trade name, available from Tokai Carbon Co., Ltd.) as a reinforcing agent, 30 parts by weight of light calcium carbonate "Whiten SB" (trade name, available from Shiraishi Calcium Kaisha, Ltd.) as an inorganic filler, 5 parts by weight of zinc oxide as a vulcanization accelerator, 1 part by weight of stearic acid as a processing aid, 0.3 part by weight of sulfur as a vulcanizing agent, and 0.5 part by weight of tetramethylthiuram disulfide, 1.5 parts by weight of zinc di-n-butyldithiocarbamate, 0.5 part by weight of 2-mercaptoimidazoline, 0.5 part by weight of N-cyclohexyl-2-benzothiazyl sulfenamide and 1.5 parts by weight of morpholine disulfide as vulcanization accelerators, and the resulting compounded rubber was extruded into an unvulcanized hose having an outer diameter of 18 mm and an inner diameter of 13.5 mm by the use of a 50 mm extruder (vented) under the conditions of head/cylinder 1/cylinder 2/screw temperatures of 80° C./70° C./60° C./50° C. and a screw rotational speed of 10 rpm. Property values of the crosslinked product are set forth in Table 2-5.

Comparative Example 2-31

A crosslinked product was prepared in the same manner as in Examples 2-2 to 2-4, except that an oil-extended rubber was prepared in the total amount of 120 parts by weight by the use of the component (A)-9 as the component (A), the component (C)-3 as the component (C) and "Diana Process Oil PW-100" (trade name, available from Idemitsu Kosan Co., Ltd.) as the component (D), 120 parts by weight of this oil-extended rubber was compounded with 35 parts by weight of "Diana Process Oil PS-430" (trade name, available from Idemitsu Kosan Co., Ltd.), 125 parts by weight of carbon black "Shiest FEF" (trade name, available from Tokai Carbon Co., Ltd.) as a reinforcing agent, 30 parts by weight of light calcium carbonate "Whiten SB" (trade name, available from Shiraishi Calcium Kaisha, Ltd.) as an inorganic filler, 5 parts by weight of zinc oxide as a vulcanization accelerator, 1 part by weight of stearic acid as a processing aid, 0.3 part by weight of sulfur as a vulcanizing agent, and 0.5 part by weight of tetramethylthiuram disulfide, 1.5 parts by weight of zinc di-n-butyldithiocarbamate, 0.5 part by weight of 2-mercaptoimidazoline, 0.5 part by weight of N-cyclohexyl-2-benzothiazyl sulfenamide and 1.5 parts by weight of morpholine disulfide as vulcanization accelerators, and the resulting compounded rubber was extruded into an unvulcanized hose having an outer diameter of 18 mm and an inner diameter of 13.5 mm by the use of a 50 mm extruder (vented) under the conditions of head/cylinder 1/cylinder 2/screw temperatures of 80° C./70° C./60° C./50° C. and a screw rotational speed of 10 rpm. Property values of the crosslinked product are set forth in Table 2-5.

Comparative Example 2-32

A crosslinked product was prepared in the same manner as in Comparative Example 2-30, except that the preparation of an oil-extended rubber using the component (A) and the component (C) was not carried out, and the component (A) and the component (C) were directly used in the preparation of a compounded rubber. Property values of the crosslinked product are set forth in Table 2-5.

Comparative Example 2-33

A crosslinked product was prepared in the same manner as in Comparative Example 2-31, except that the preparation of an oil-extended rubber using the component (A) and the component (C) was not carried out, and the component (A) and the component (C) were directly used in the preparation of a compounded rubber. Property values of the crosslinked product are set forth in Table 2-5.

Example 2-12

Sealing Material

Using an organic peroxide as a crosslinking agent instead of sulfur, using a crosslinking assistant instead of the vulcanization accelerator and under the compounding conditions shown in Table 2-6, a crosslinked product for sealing material was prepared in the same manner as in Example 2-1.

Comparative Example 2-34

Sealing Material

Using an organic peroxide as a crosslinking agent instead of sulfur, using a crosslinking assistant instead of the vulcanization accelerator and under the compounding conditions shown in Table 2-6, a crosslinked product for sealing material was prepared in the same manner as in Example 2-1.

TABLE 2-5

|  |  | Examples | | | | Comparative Examples | | | |
| --- | --- | --- | --- | --- | --- | --- | --- | --- | --- |
|  |  | 2-8 | 2-9 | 2-10 | 2-11 | 2-30 | 2-31 | 2-32 | 2-33 |
| Composition of oil-extended rubber | Component (A) | component (A)-6 | component (A)-7 | component (A)-6 | component (A)-7 | component (A)-8 | component (A)-9 | component (A)-8 | component (A)-9 |
|  | Component (C) | component (C)-2 | component (C)-1 | component (C)-2 | component (C)-1 | component (C)-7 | component (C)-3 | component (C)-7 | component (C)-3 |
|  | Component (D) | — | PW-100 | — | PW-100 | — | PW-100 | — | PW-100 |
|  | Component (A) (phr) | 100 | 100 | 100 | 100 | 100 | 100 | 100 | 100 |
|  | Component (C) (phr) | 10 | 6 | 10 | 6 | 10 | 6 | 10 | 6 |
|  | Component (D) (phr) | — | 14 | — | 14 | — | 14 | — | 14 |
| Properties of crosslinked product | Tensile strength (MPa) | 11.2 | 14.8 | 11.0 | 14.2 | 10.8 | 13.3 | 10.2 | 12.8 |
|  | Elongation (%) | 490 | 440 | 480 | 430 | 470 | 420 | 460 | 410 |
|  | Tensile creep value | 2.3 | 2.2 | 2.4 | 2.3 | 2.7 | 2.6 | 2.8 | 2.7 |
|  | Shrinkage ratio | 2.1 | 2.0 | 2.3 | 2.2 | 4.1 | 4.0 | 4.3 | 4.2 |

In Table 2-5, the unit of each value of the components (A) to (C) is "part(s) by weight".

TABLE 2-6

|  |  | Ex. 2-12 | Comp. Ex. 2-34 |
| --- | --- | --- | --- |
| EPDM | EPDM 1 | C-1 | C-C |
|  | EPDM 1 (phr) | 100 | 100 |
| Pre-addition softener | Liquid EPR-1 (phr) | 10 | 10 |
| Preparation of vulcanized rubber | Mold release agent (Mold With IMRI) | 5 | 5 |
|  | Clay (Iceberg Clay) | 60 | 60 |
|  | SRF carbon black (Shiest S)* | 40 | 40 |
|  | Post-addition softener (phr) | 10 mineral oil (PW-380) | 10 mineral oil (PW-380) |
|  | Amine type anti-aging agent (Noclac CD) | 1 | 1 |
|  | Organic peroxide | 7 | 7 |
|  | Crosslinking assistant | 2 | 2 |
| Properties of vulcanized rubber | TB (MPa) | 13.5 | 12.8 |
|  | EB (%) | 670 | 650 |
|  | Retention of tensile strength after aging (%) | 86 | 82 |
|  | Retention of tensile elongation after aging (%) | 81 | 80 |
|  | CS (100° C. × 22 hr) (%) | 15 | 16 |

Organic peroxide: Kayahexa AD-40 (trademark), available from Nippon Oil & Fats Co., Ltd.
Crosslinking assistant: Acryester ED (trademark), available from Seiko Chemical Co., Ltd
In Table 2-6, the contents of EPDM, the pre-addition softener and the components in the vulcanized rubber are each expressed in "part(s) by weight".

Example 2-13

Seal Article (Packing)

Using an organic peroxide as a crosslinking agent instead of sulfur, using a crosslinking assistant instead of the vulcanization accelerator and under the compounding conditions shown in Table 2-7, a crosslinked product for seal article was prepared in the same manner as in Example 2-1.

Comparative Example 2-35

Seal Article (Packing)

Using an organic peroxide as a crosslinking agent instead of sulfur, using a crosslinking assistant instead of the vulcanization accelerator and under the compounding conditions shown in Table 2-7, a crosslinked product for seal article was prepared in the same manner as in Example 2-1.

TABLE 2-7

|  |  | Ex. 2-13 | Comp. Ex. 2-35 |
| --- | --- | --- | --- |
|  | EPDM* | B-1 | B-C |
|  |  | 100 | 100 |
| Pre-addition softener | Liquid EPR-1* | 10 | 10 |
| Preparation of vulcanized rubber | Zinc white | 5 | 5 |
|  | Stearic acid | 1 | 1 |
|  | FEF carbon black* | 100 | 100 |
|  | Post-addition softener* | 30 mineral oil | 30 mineral oil |
|  | Blowing agent | — | — |
|  | Organic peroxide | 8 | 8 |
|  | Crosslinking assistant | 3 | 3 |
| Properties of | TB (MPa) | 113 | 101 |
|  | EB (%) | 290 | 270 |

TABLE 2-7-continued

|  |  | Ex. 2-13 | Comp. Ex. 2-35 |
|---|---|---|---|
| vulcanized rubber | Retention of tensile strength after aging (%) | 82 | 77 |
|  | Retention of tensile elongation after aging (%) | 78 | 74 |
|  | CS (60° C. × 22 hr) (%) | 8 | 11 |

Organic peroxide: Kayahexa AD-40 (trademark), available from Nippon Oil & Fats Co., Ltd.
Crosslinking assistant: Hicross M (trademark), available from Seiko Chemical Co., Ltd.
In Table 2-7, the contents of EPDM, the pre-addition softener and the components in the vulcanized rubber are each expressed in "part(s) by weight".

Example 2-14

Sheet

Using an organic peroxide as a crosslinking agent instead of sulfur, using a crosslinking assistant instead of the vulcanization accelerator and under the compounding conditions shown in Table 2-8, a crosslinked product for sheet was prepared in the same manner as in Example 2-1.

Comparative Example 2-36

Sheet

Using an organic peroxide as a crosslinking agent instead of sulfur, using a crosslinking assistant instead of the vulcanization accelerator and under the compounding conditions shown in Table 2-8, a crosslinked product for sheet was prepared in the same manner as in Example 2-1.

TABLE 2-8

|  |  | Ex. 2-14 | Comp. Ex. 2-36 |
|---|---|---|---|
|  | EPDM | E-1 | E-C |
|  | EPDM* | 100 | 100 |
| Pre-addition softener | Liquid EPR-1* | 10 | 10 |
| Preparation of vulcanized rubber | Three kinds of zinc oxides | 5 | 5 |
|  | Stearic acid | 1 | 1 |
|  | MFR carbon black (Shiest 116)* | 80 | 80 |
|  | Surface-treated calcium carbonate (Novelite TT) | 60 | 60 |
|  | Post-addition softener* | 40 naphthenic oil (Sunsen 4240) | 40 naphthenic oil (Sunsen 4240) |
|  | Vulcanization accelerator MBT | 0.5 | 0.5 |
|  | Vulcanization accelerator TMTD | 1 | 1 |
|  | Sulfur | 1.5 | 1.5 |
| Properties of vulcanized rubber | TB (MPa) | 14.3 | 13.9 |
|  | EB (%) | 590 | 510 |
|  | Retention of tensile strength after aging (%) | 90 | 85 |
|  | Retention of tensile elongation after aging (%) | 87 | 82 |
|  | Elongation set (%) (JIS K6262) | 6 | 8 |

Example 2-15

Using Kayacumyl D-40 as a crosslinking agent instead of sulfur, using a crosslinking assistant instead of the vulcanization accelerator and under the compounding conditions shown in Table 2-9, a crosslinked product for brake boot was prepared in the same manner as in Example 2-1.

Comparative Example 2-37

Brake Boot

Using Kayacumyl D-40 as a crosslinking agent instead of sulfur, using a crosslinking assistant instead of the vulcanization accelerator and under the compounding conditions shown in Table 2-9, a crosslinked product for brake boot was prepared in the same manner as in Example 2-1.

TABLE 2-9

|  |  | Ex. 2-15 | Comp. Ex. 2-37 |
|---|---|---|---|
|  | EPDM 1 | C-1 | C-C |
|  | EPDM 1* | 100 | 100 |
| Pre-addition softener | Liquid EPR-1* | 10 | 10 |
| Preparation of vulcanized rubber | Three kinds of zinc oxides | 5 | 5 |
|  | Stearic acid | 1 | 1 |
|  | Clay (Samson Clay) | 80 | 80 |
|  | FEF carbon black (Asahi #35) | 10 | 10 |
|  | Post-addition softener* | 10 paraffinic oil (PW-380) | 10 paraffinic oil (PW-380) |
|  | Activator (Acting SL) | 1 | 1 |
|  | Anti-aging agent (Noclac MB) | 1 | 1 |
|  | Anti-aging agent (Noclac 224) | 0.5 | 0.5 |
|  | Crosslinking agent (Kayacumyl D-40) | 7.5 | 7.5 |
|  | Crosslinking assistant (Hicross M) | 2.5 | 2.5 |
| Properties of vulcanized rubber | TB (MPa) | 12 | 9.8 |
|  | EB (%) | 610 | 600 |
|  | Retention of tensile strength after aging (%) | 88 | 83 |
|  | Retention of tensile elongation after aging (%) | 85 | 82 |
|  | CS (150° C. × 22 hr) (%) (JIS K 6262) | 16 | 19 |

Example 2-16

Lightweight Grommet

Under the compounding conditions shown in Table 2-10, a crosslinked product for lightweight grommet was prepared in the same manner as in Example 2-1.

Comparative Example 2-38

Lightweight Grommet

Under the compounding conditions shown in Table 2-10, a crosslinked product for lightweight grommet was prepared in the same manner as in Example 2-1.

TABLE 2-10

|  |  | Ex. 2-16 | Comp. Ex. 2-38 |
|---|---|---|---|
| Pre-addition Preparation of vulcanized rubber | EPDM 1 | A-1 | A-C1 |
|  | EPDM 1* | 100 | 100 |
|  | Liquid EPR-1* | 10 | 10 |
|  | Two kinds of zinc oxides | 5 | 5 |
|  | Stearic acid | 1 | 1 |
|  | SRF carbon black (Showblack IP-200) | 70 | 70 |
|  | Post-addition softener* | 90 paraffinic oil (PW-90) | 90 paraffinic oil (PW-90) |
|  | Vulcanization accelerator CMBT (Sanceler HM) | 0.8 | 0.8 |
|  | Vulcanization accelerator CBS (Sanceler CM) | 0.5 | 0.5 |
|  | Vulcanization accelerator ZnBDC (Sanceler BZ) | 1 | 1 |
|  | Vulcanization accelerator DPTT (Sanceler TRA) | 0.5 | 0.5 |
|  | Vulcanization accelerator TMTD (Sanceler TT) | 0.3 | 0.3 |
|  | Sulfur | 0.2 | 0.2 |
| Properties of vulcanized rubber | TB (MPa) | 12.3 | 11.4 |
|  | EB (%) | 980 | 960 |
|  | Retention of tensile strength (%) | 92 | 89 |
|  | Retention of tensile elongation after aging (%) | 84 | 79 |
|  | Volume resistivity ($\Omega \cdot cm$) | 1.55E+14 | 1.60E+14 |

Example 2-17

Corner Joint

Under the compounding conditions shown in Table 2-11, a crosslinked product for corner joint was prepared in the same manner as in Example 2-1.

Comparative Example 2-39

Corner Joint

Under the compounding conditions shown in Table 2-11, a crosslinked product for corner joint was prepared in the same manner as in Example 2-1.

TABLE 2-11

|  |  | Ex. 2-17 | Comp. Ex. 2-39 |
|---|---|---|---|
| Pre-addition softener Preparation of vulcanized rubber | EPDM 1 | I-1 | I-C |
|  | EPDM 1* | 100 | 100 |
|  | Liquid EPR-1* | 10 | 10 |
|  | Two kinds of zinc oxides | 5 | 5 |
|  | Stearic acid | 1 | 1 |
|  | SRF carbon black (Shiest S) | 110 | 110 |
|  | Post-addition softener* | 10 paraffinic oil (PW-90) | 10 paraffinic oil (PW-90) |
|  | Vulcanization accelerator MDB | 1.5 | 1.5 |
|  | Vulcanization accelerator MBT | 0.5 | 0.5 |
|  | Vulcanization accelerator ZnBDC | 0.3 | 0.3 |
|  | Sulfur | 0.8 | 0.8 |
| Properties of vulcanized | TB (MPa) | 12.2 | 11.5 |
|  | EB (%) | 357 | 343 |

TABLE 2-11-continued

|  |  | Ex. 2-17 | Comp. Ex. 2-39 |
|---|---|---|---|
| rubber | Retention of tensile strength after aging (%) | 86 | 78 |
|  | Retention of tensile elongation after aging (%) | 83 | 76 |
|  | CS (70° C. × 22 hr) (%) | 15 | 17 |

Example 2-18

Tire Sidewall

In a hexane solvent, 100 parts by weight of the component (A)-7 as the component (A) and 20 parts by weight of the component (C)-1 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

120 Parts by weight of this oil-extended rubber were kneaded with 50 parts by weight of carbon black "N330" (trade name, available from Asahi Carbon Co., Ltd.) as a reinforcing agent, 3 parts by weight of zinc oxide as a vulcanization accelerator and 1 part by weight of stearic acid as a processing aid by means of a 4.3-liter Banbury mixer at 150° C. Then, the resulting kneadate, 1.75 parts by weight of sulfur as a vulcanizing agent and 1.0 part by weight of N-cyclohexy-lbenzothiazyl-2-sulfenamide as a vulcanization accelerator were roll-milled by 8-inch open rolls (roll temperature: 50° C.) to obtain a rubber composition (also referred to as a "compounded rubber" hereinafter). The compounded rubber was molded into a sheet having a thickness of 2 mm by means of a press molding machine, and simultaneously with molding, heating was carried out at 160° C. for 10 minutes to obtain a crosslinked product. Property values of the thus obtained crosslinked product for tire sidewall are set forth in Table 2-12.

Comparative Example 2-40

A crosslinked product was obtained in the same manner as in Example 2-18, except that the component (A)-10 was used as the component (A), and the component (C)-3 was used as the component (C). Property values of the thus obtained crosslinked product for tire sidewall are set forth in Table 2-12.

TABLE 2-12

| Test Items | Ex. 2-18 | Comp. Ex. 2-40 |
|---|---|---|
| TB (MPa) | 13.8 | 13.3 |
| EB (%) | 310 | 300 |
| Retention of tensile strength after aging (%) | 93 | 89 |
| Retention of tensile elongation after aging (%) | 88 | 86 |
| Flex test (number of flex times) | $10^5<$ | $10^5<$ |

Example 2-19

Tire Tube

In a hexane solvent, 100 parts by weight of the component (A)-6 as the component (A) and 10 parts by weight of the component (C)-2 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

110 Parts by weight of this oil-extended rubber was kneaded with 70 parts by weight of a butyl rubber (available from JSR Corporation, Butyl 268) as a blended rubber, 60 parts by weight of carbon black (available from Asahi Carbon Co., Ltd., Asahi #55) as a reinforcing agent, 3 parts by weight of zinc oxide as a vulcanization accelerator and 1 part by weight of stearic acid as a processing aid by means of a 4.3-liter Banbury mixer at 150° C. Then, the resulting kneadate, 1.5 parts by weight of sulfur as a vulcanizing agent, and 1 part by weight of tetramethylthiuram disulfide and 0.5 part by weight of 2-mercaptobenzothiazole as vulcanization accelerators were roll-milled by 8-inch open rolls (roll temperature: 50° C.) to obtain a rubber composition (also referred to as a "compounded rubber" hereinafter). The compounded rubber was molded into a sheet having a thickness of 2 mm by means of a press molding machine, and simultaneously with molding, heating was carried out at 160° C. for 20 minutes to obtain a crosslinked product. Property values of the thus obtained crosslinked product for tire tube are set forth in Table 2-13.

Comparative Example 2-41

A crosslinked product was obtained in the same manner as in Example 2-19, except that the component (A)-9 was used as the component (A), and the component (C)-7 was used as the component (C). Property values of the thus obtained crosslinked product for tire tube are set forth in Table 2-13.

TABLE 2-13

| Test Items | Ex. 2-19 | Comp. Ex. 2-41 |
| --- | --- | --- |
| TB (MPa) | 12.5 | 11 |
| EB (%) | 620 | 590 |
| Retention of tensile strength after aging (%) | 88 | 82 |
| Retention of tensile elongation after aging (%) | 84 | 79 |
| Gas permeability (cm$^3$ · mm/m$^3$ · 24 hr · atm) | 67 | 213 |

Example 2-20

Rubber Belt

In a hexane solvent, 100 parts by weight of the component (A)-6 as the component (A) and 10 parts by weight of the component (C)-2 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

110 Parts by weight of this oil-extended rubber were kneaded with 50 parts by weight of HAF carbon black "Asahi 70" (trade name, available from Asahi Carbon Co., Ltd.) as a reinforcing agent, 10 parts by weight of naphthenic oil "Sunsen 4240" (trade name, available from Japan Sun oil Company, Ltd.) as an extender, 5 parts by weight of zinc oxide as a vulcanization accelerator and 1 part by weight of stearic acid as a processing aid by means of a 4.3-liter Banbury mixer at 150° C. Then, the resulting kneadate, 0.5 part by weight of sulfur as a vulcanizing agent, and 0.5 part by weight of 2-mercaptobenzothiazole and 0.5 part by weight of tetramethylthiuram disulfide as vulcanization accelerators were roll-milled by 8-inch open rolls (roll temperature: 50° C.) to obtain a rubber composition (also referred to as a "compounded rubber" hereinafter). The compounded rubber was molded into a sheet having a thickness of 2 mm by means of a press molding machine, and simultaneously with molding, heating was carried out at 160° C. for 20 minutes to obtain a crosslinked product. Property values of the thus obtained crosslinked product for rubber belt are set forth in Table 2-14.

Comparative Example 2-42

A crosslinked product was obtained in the same manner as in Example 2-20, except that the component (A)-9 was used as the component (A), and the component (C)-7 was used as the component (C). Property values of the thus obtained crosslinked product for rubber belt are set forth in Table 2-14.

TABLE 2-14

| Test Items | Ex. 2-20 | Comp. Ex. 2-42 |
| --- | --- | --- |
| TB (MPa) | 13.6 | 12.5 |
| EB (%) | 540 | 450 |
| Retention of tensile strength after aging (%) | 96 | 94 |
| Retention of tensile elongation after aging (%) | 83 | 80 |
| Flex test (number of flex times) | $10^5<$ | $10^5<$ |

Example 2-21

Rubber Roll

In a hexane solvent, 100 parts by weight of the component (A)-6 as the component (A) and 10 parts by weight of the component (C)-2 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

110 Parts by weight of this oil-extended rubber were kneaded with 50 parts by weight of HAF carbon black "Asahi 70" (trade name, available from Asahi Carbon Co., Ltd.) as a reinforcing agent, 10 parts by weight of naphthenic oil "Sunsen 4240" (trade name, available from Japan Sun oil Company, Ltd.) as an extender, 5 parts by weight of zinc oxide as a vulcanization accelerator and 1 part by weight of stearic acid as a processing aid by means of a 4.3-liter Banbury mixer at 150° C. Then, the resulting kneadate, 0.5 part by weight of sulfur as a vulcanizing agent, and 0.5 part by weight of 2-mercaptobenzothiazole and 0.5 part by weight of tetramethylthiuram disulfide as vulcanization accelerators were roll-milled by 8-inch open rolls (roll temperature: 50° C.) to obtain a rubber composition (also referred to as a "compounded rubber" hereinafter). The compounded rubber was molded into a sheet having a thickness of 2 mm by means of a press molding machine, and simultaneously with molding, heating was carried out at 160° C. for 20 minutes to obtain a crosslinked product. Property values of the thus obtained crosslinked product for rubber roll are set forth in Table 2-15.

Comparative Example 2-43

A crosslinked product was obtained in the same manner as in Example 2-21, except that the component (A)-9 was used as the component (A), and the component (C)-7 was used as the component (C). Property values of the thus obtained crosslinked product for rubber roll are set forth in Table 2-15.

TABLE 2-15

| Test Items | Ex. 2-21 | Comp. Ex. 2-43 |
|---|---|---|
| TB (MPa) | 13.6 | 12.5 |
| EB (%) | 540 | 450 |
| Retention of tensile strength after aging (%) | 96 | 94 |
| Retention of tensile elongation after aging (%) | 83 | 80 |
| Flex test (number of flex times) | $10^5<$ | $10^5<$ |

Example 2-22

Rubber Vibration Insulator

In a hexane solvent, 100 parts by weight of the component (A)-1 as the component (A) and 40 parts by weight of the component (C)-1 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

140 Parts by weight of this oil-extended rubber were kneaded with 60 parts by weight of carbon black "N550" (trade name, available from Asahi Carbon Co., Ltd.) as a reinforcing agent, 40 parts by weight of paraffinic oil "Diana Process Oil PW-380" (trade name, available from Idemitsu Kosan Co., Ltd.) as an extender, 5 parts by weight of zinc oxide as a vulcanization accelerator and 1 part by weight of stearic acid as a processing aid by means of a 4.3-liter Banbury mixer at 150° C. Then, the resulting kneadate, 0.5 part by weight of sulfur as a vulcanizing agent, and 3 parts by weight of 2-mercaptobenzothiazole, 0.75 part by weight of tetramethylthiuram disulfide and 1.5 parts by weight of zinc dibutyldithiocarbamate as vulcanization accelerators were roll-milled by 8-inch open rolls (roll temperature: 50° C.) to obtain a rubber composition (also referred to as a "compounded rubber" hereinafter). The compounded rubber was molded into a sheet having a thickness of 2 mm by means of a press molding machine, and simultaneously with molding, heating was carried out at 160° C. for 20 minutes to obtain a crosslinked product. Property values of the thus obtained crosslinked product for rubber vibration insulator are set forth in Table 2-16.

Comparative Example 2-44

A crosslinked product was obtained in the same manner as in Example 2-22, except that the component (A)-4 was used as the component (A), and the component (C)-3 was used as the component (C). Property values of the thus obtained crosslinked product for rubber vibration insulator are set forth in Table 2-16.

TABLE 2-16

| Test Items | Ex. 2-22 | Comp. Ex. 2-44 |
|---|---|---|
| TB (MPa) | 20.5 | 18.0 |
| EB (%) | 520 | 500 |
| Retention of tensile strength after aging (%) | 96 | 93 |
| Retention of tensile elongation after aging (%) | 94 | 91 |
| Volatile loss (wt %) | 0.5 | 2.6 |
| Fogging (mg) | 0.8 | 3.4 |

Example 2-23

(Covered) Electric Wire

In a hexane solvent, 100 parts by weight of the component (A)-2 as the component (A) and 10 parts by weight of the component (C)-1 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

110 Parts by weight of this oil-extended rubber were kneaded with 100 parts by weight of Mistron Vapor Talc as a filler, 10 parts by weight of paraffinic oil "Diana Process Oil PW-380" (trade name, available from Idemitsu Kosan Co., Ltd.) as an extender, 5 parts by weight of zinc oxide as a vulcanization accelerator and 1 part by weight of stearic acid as a processing aid by means of a 4.3-liter Banbury mixer at 150° C. Then, the resulting kneadate, 6.8 parts by weight of dicumyl peroxide and 3.5 parts by weight of p-(p-dibenzoylquinone)dioxime as a vulcanization assistant were roll-milled by 8-inch open rolls (roll temperature: 50° C.) to obtain a rubber composition (also referred to as a "compounded rubber" hereinafter). The compounded rubber was heated at 160° C. for 20 minutes by means of a press molding machine to obtain a crosslinked product. Property values of the thus obtained crosslinked product for covered electric wire are set forth in Table 2-17.

Comparative Example 2-45

A crosslinked product was obtained in the same manner as in Example 2-23, except that the component (A)-5 was used as the component (A), and the component (C)-3 was used as the component (C). Property values of the thus obtained crosslinked product for covered electric wire are set forth in Table 2-17.

TABLE 2-17

| Test Items | Ex. 2-23 | Comp. Ex. 2-45 |
|---|---|---|
| TB (MPa) | 7.4 | 6.9 |
| EB (%) | 630 | 580 |
| Retention of tensile strength after aging (%) | 83 | 76 |
| Retention of tensile elongation after aging (%) | 82 | 75 |
| Cold flex test t5 (° C.) | −46 | −47 |

Example 2-24

Glass Run Channel

In a hexane solvent, 100 parts by weight of the component (A)-6 as the component (A) and 10 parts by weight of the component (C)-1 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

110 Parts by weight of this oil-extended rubber were kneaded with 57 parts by weight of paraffinic oil "Diana Process Oil PW-380" (trade name, available from Idemitsu Kosan Co., Ltd.) as an extender, 150 parts by weight of carbon black "Asahi #60G" (trade name, available from Asahi Carbon Co., Ltd.) as a reinforcing agent, 5 parts by weight of zinc oxide as a vulcanization accelerator and 1 part by weight of stearic acid as a processing aid by means of a 4.3-liter Banbury mixer at 150° C. Then, the resulting kneadate, 1.5 parts by weight of sulfur as a vulcanizing agent, and 0.5 part by weight of 2-mercaptobenzothiazole, 1 part by weight of tetramethylthiuram disulfide and 1.5 parts by weight of zinc dibutyldithiocarbamate as vulcanization accelerators were roll-milled by 8-inch open rolls (roll temperature: 50° C.) to obtain a rubber composition (also referred to as a "compounded rubber" hereinafter). The compounded rubber was heated at 160° C. for 20 minutes by means of a press molding machine to obtain a crosslinked product. Property values of the thus obtained crosslinked product for glass run channel are set forth in Table 2-18.

Comparative Example 2-46

A crosslinked product was obtained in the same manner as in Example 2-24, except that the component (A)-9 was used as the component (A), and the component (C)-3 was used as the component (C). Property values of the thus obtained crosslinked product for glass run channel are set forth in Table 2-18.

TABLE 2-18

| Test Items | Ex. 2-24 | Comp. Ex. 2-46 |
|---|---|---|
| TB (MPa) | 11.6 | 11.1 |
| EB (%) | 320 | 310 |
| Retention of tensile strength after aging (%) | 75 | 66 |
| Retention of tensile elongation after aging (%) | 74 | 62 |

Example 2-25

Weatherstrip Sponge

In a hexane solvent, 100 parts by weight of the component (A)-3 as the component (A) and 20 parts by weight of the component (C)-2 as the component (C) were stirred at 80° C. to obtain a solution containing the component (A) and the component (C). The resulting solution containing the component (A) and the component (C) was subjected to flash drying to obtain a rubber composition (also referred to as an "oil-extended rubber" hereinafter).

120 Parts by weight of this oil-extended rubber were kneaded with 50 parts by weight of paraffinic oil "Diana Process Oil PW-380" (trade name, available from Idemitsu Kosan Co., Ltd.), 90 parts by weight of carbon black "Asahi #50HG" (trade name, available from Asahi Carbon Co., Ltd.) as a reinforcing agent, 5 parts by weight of zinc oxide as a vulcanization accelerator, 1 part by weight of stearic acid as a processing aid, 1 part by weight of PEG#4000 as an activator and 4 parts by weight of Vesta 200 as a defoamer by means of a BB4 type Banbury mixer (manufactured by Kobe Steel, Ltd.) for 3 to 5 minutes. After cooling, the kneadate was wound around 14-inch open rolls (manufactured by Nippon Roll MFG. Co., Ltd.), and 1.5 parts by weight of sulfur as a vulcanizing agent, 1.0 part by weight of 2-mercaptobenzothiazole, 1.0 part by weight of N-cyclohexyl-2-benzothiazyl sulfenamide, 1.0 part by weight of diethylthiourea and 0.5 part by weight of tetrakis(2-ethylhexyl)thiuram disulfide as vulcanization accelerators, and 4 parts by weight of p,p'-oxybis(benzenesulfonylhydazide) as a blowing agent were dispersed to obtain a compounded rubber. The compounded rubber was subjected to vulcanization and foaming by the use of a molding line having a microwave vulcanization bath (UHF bath) and a hot air vulcanization bath (HAV bath) which were connected in series or a molding line in which a microwave vulcanization bath (UHF bath) was not combined. In this case, the extruder head temperature was set at 80° C., the temperature of the UHF bath was set at 200° C., and the power was controlled so that the temperature of the exit of the UHF bath would become 180° C. As the HAV bath, a HAV vulcanization bath of 30 m was used, and the internal temperature of the bath was set at 250° C. Property values of the thus obtained crosslinked product for weatherstrip sponge are set forth in Table 2-19.

Comparative Example 2-47

A crosslinked product was obtained in the same manner as in Example 2-25, except that the component (A)-8 was used as the component (A), and the component (C)-7 was used as the component (C). Property values of the thus obtained crosslinked product for weatherstrip sponge are set forth in Table 2-19.

TABLE 2-19

| Test Items | Ex. 2-25 | Comp. Ex. 2-47 |
|---|---|---|
| TB (MPa) | 2.7 | 2.2 |
| EB (%) | 230 | 200 |
| Retention of tensile strength after aging (%) | 82 | 77 |
| Retention of tensile elongation after aging (%) | 69 | 64 |
| Specific gravity | 0.6 | 0.6 |
| Water absorption (wt %) | 1.3 | 1.1 |
| Compression set (%) | 28 | 31 |

What is claimed is:

1. A rubber composition comprising an ethylene/α-olefin/non-conjugated polyene copolymer (A), and a polyolefin resin (B) and/or an ethylene/C3-C20 α-olefin copolymer (C), wherein
   (1) a maximum value Pmax and a minimum value Pmin of an ethylene distribution parameter P of the ethylene/α-olefin/non-conjugated polyene copolymer (A), as determined by the following measuring method (X), have a relationship of Pmax/Pmin≦1.4,
   measuring method (X): a test sample obtained by dissolving the ethylene/α-olefin/non-conjugated polyene copolymer (A) in cyclohexane is subjected to measurement with GPC-offline-FTIR using cyclohexane as an eluent under the conditions of a flow rate of 1.0 ml/min and a temperature of 60° C., and a peak intensity ratio (A721 cm$^{-1}$/A4320 cm$^{-1}$) of a maximum peak (A721 cm$^{-1}$) of the resulting spectrum in the range of 721±20 cm$^{-1}$ to a maximum peak (A4320 cm$^{-1}$) thereof in the range of 4320±20 cm$^{-1}$ is regarded as an ethylene distribution parameter P, and (2) the B value of the ethylene/C3-C20 α-olefin copolymer (C), which is represented by the following formula (i), is not more than 1.05, $$B \text{ value} = [EX]/(2[E] \times [X]) \tag{i}$$

wherein [E] and [X] are molar fractions of ethylene and the α-olefin of 3 to 20 carbon atoms, respectively, and [EX] is a fraction of dyad sequence of ethylene/α-olefin of 3 to 20 carbon atoms.

2. The rubber composition as claimed in claim 1, wherein the ethylene/α-olefin/non-conjugated polyene copolymer (A) satisfies the following requirements:

(1) the content of constituent units derived from ethylene is in the range of 50 to 90% by mol,
(2) the content of constituent units derived from the non-conjugated polyene is in the range of 0.1 to 5% by mol,
(3) the intrinsic viscosity [η] is in the range of 0.5 to 5.0 dl/g, and
(4) The B value represented by the following formula (ii) is not more than 1.05, $$B \text{ value} = ([EX]+2[Y])/\{2[E] \times ([X]+[Y])\} \tag{ii}$$

wherein [E], [X] and [Y] are molar fractions of ethylene, the α-olefin of 3 to 20 carbon atoms and the non-conjugated polyene, respectively, and [EX] is a fraction of dyad sequence of ethylene/α-olefin of 3 to 20 carbon atoms, and the content of constituent units derived from ethylene in the α-olefin copolymer (C) is in the range of 50 to 90% by mol.

3. The rubber composition as claimed in claim 1 or 2, wherein the ethylene/α-olefin/non-conjugated polyene copolymer (A) and/or the α-olefin copolymer (C) is obtained by polymerization using a catalyst having a structure represented by the following formula (I):

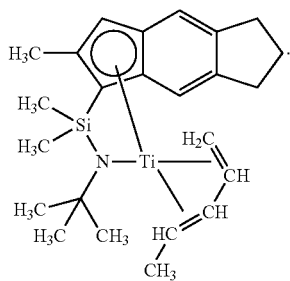

(I)

4. The rubber composition as claimed in claim 1 or 2, which contains the polyolefin resin (B) in an amount of 5 to 100 parts by weight and/or the α-olefin copolymer (C) in an amount of 1 to 50 parts by weight, based on 100 parts by weight of the ethylene/α-olefin/non-conjugated polyene copolymer (A).

5. The rubber composition as claimed in claim 1 or 2, wherein the polyolefin resin (B) contains at least one resin selected from the group consisting of a polyethylene resin, a crystalline ethylene/α-olefin copolymer of ethylene and an α-olefin and a polypropylene resin.

6. The rubber composition as claimed in claim 1 or 2, wherein the constituent units derived from the non-conjugated polyene of the component (A) are constituent units derived from at least one non-conjugated polyene selected from the group consisting of 5-ethylidene-2-norbornene (ENB) and 5-vinyl-2-norbornene (VNB).

7. The rubber composition as claimed in claim 1 or 2, further comprising a reinforcing agent.

8. The rubber composition as claimed in claim 7, wherein the reinforcing agent is carbon black.

9. The rubber composition as claimed in claim 8, wherein the carbon black is contained in an amount of 20 to 200 parts by weight based on 100 parts by weight of the ethylene/α-olefin/non-conjugated polyene copolymer (A).

10. The rubber composition as claimed in claim 1 or 2, which is obtained by alloying the ethylene/α-olefin/non-conjugated polyene copolymer (A) with the polyolefin resin (B) and/or the ethylene/C3-C20 α-olefin copolymer (C) by means of an extruder in the presence of a solvent.

11. The rubber composition as claimed in claim 1 or 2, which is obtained by alloying an ethylene/α-olefin/non-conjugated polyene copolymer composition (A') that is obtained by mixing the ethylene/α-olefin/non-conjugated polyene copolymer (A) with a softener (X), with the polyolefin-resin (B) by means of an extruder.

12. The rubber composition as claimed in claim 11, wherein the softener (X) is at least one softener selected from the group consisting of mineral oil and an ethylene/C3-C20 α-olefin copolymer having a number-average molecular weight in terms of polystyrene, as measured by gel permeation chromatography (GPC), of 2500 to 5000.

13. The rubber composition as claimed in claim 11, wherein the softener (X) is contained in an amount of 0.1 to 120 parts by weight based on 100 parts by weight of the ethylene/α-olefin/non-conjugated polyene copolymer (A).

14. The rubber composition as claimed in claim 1 or 2, further comprising paraffinic oil (D), wherein the paraffinic oil (D) is contained in an amount of 1 to 200 parts by weight based on 100 parts by weight of the ethylene/α-olefin/non-conjugated polyene copolymer (A).

15. An olefin-based thermoplastic elastomer obtained by treating the rubber composition of claim 1 or 2 and a polypropylene-based resin through dynamic crosslinking in the presence of a crosslinking agent.

16. A crosslinked product obtained by crosslinking the rubber composition of claim 1 or 2.

17. A foamed product obtained by crosslinking and foaming the rubber composition of claim 1 or 2.

18. A glass run channel, a weatherstrip sponge, door opening trim or an automobile seal part comprising the crosslinked product of claim 16 or the foamed product of claim 17.

19. A part for automobiles, a part for ships, a part for civil engineering and construction, a medical part, a part for electric/electronic components, a seal article, a sheet, a shoe, a tire sidewall, a tire tube, a covered electric wire, an electrically insulating part, a household rubber article, a part for leisure, a coating material or an adhesive obtained by the use of the rubber composition of claim 1 or 2.

20. A hose which is the hose of claim 19 and has a tensile creep value (change of elongation in heating of the hose from 25° C. to 80° C. at a rate of 2° C./min under a constant load of 0.6 MPa using a viscoelasticity tester) of not more than 2.5%.

21. A hose which is the hose of claim 19 and has a shrinkage ratio (change of length in crosslinking of an unvulcanized hose) of not more than 4.0%.

* * * * *